METHOD AND APPARATUS FOR VERIFYING PUNCHED TAPE

INVENTORS.
RAYMOND A. BARBEAU &
DONALD K. CLOSE
BY
Brumbaugh, Free, Graves & Donohue
their ATTORNEYS.

METHOD AND APPARATUS FOR VERIFYING PUNCHED TAPE

Filed Dec. 16, 1957 30 Sheets-Sheet 2

| | ODD | EVEN | ODD | EVEN | CHECK CODE TOTAL |
|---|---|---|---|---|---|
| MESSAGE---- | G | R | A | Y | |
| CHECK CODE NUMBERS---- | 32 | 04 | 21 | 06 | 63 |

FIG. 3a.

| | ODD | EVEN | ODD | EVEN | CHECK CODE TOTAL |
|---|---|---|---|---|---|
| MESSAGE---- | G | A | R | Y | |
| CHECK CODE NUMBERS---- | 32 | 12 | 40 | 06 | 90 |

FIG. 3b.

| | ODD | EVEN | ODD | EVEN | CHECK CODE TOTAL |
|---|---|---|---|---|---|
| MESSAGE---- | G | R | A | M | |
| CHECK CODE NUMBERS---- | 32 | 04 | 21 | 28 | 85 |

FIG. 3c.

| KEY | EVEN ASSIGN-MENT | ODD ASSIGN-MENT |
|---|---|---|
| 1Q | 01 | 10 |
| 2W | 02 | 20 |
| 3E | 03 | 30 |
| 4R | 04 | 40 |
| 5T | 05 | 50 |
| 6Y | 06 | 60 |
| 7U | 07 | 70 |
| 8I | 08 | 80 |
| 9O | 09 | 90 |
| ØP | 38 | 83 |
| A | 12 | 21 |
| B | 24 | 42 |
| C | 17 | 71 |
| D | 16 | 61 |
| F | 18 | 81 |
| G | 23 | 32 |
| H | 25 | 52 |
| J | 27 | 72 |
| K | 29 | 92 |
| L | 35 | 53 |
| M | 28 | 82 |
| N | 26 | 62 |
| S | 14 | 41 |
| V | 19 | 91 |
| X | 15 | 51 |
| Z | 13 | 31 |
| SPACE | 36 | 63 |
| , | 26 | 62 |
| . | 28 | 82 |
| ; | 19 | 91 |
| TAB | 47 | 74 |
| FIGS. | 45 | 54 |
| LTRS. | 46 | 64 |

FIG. 2.

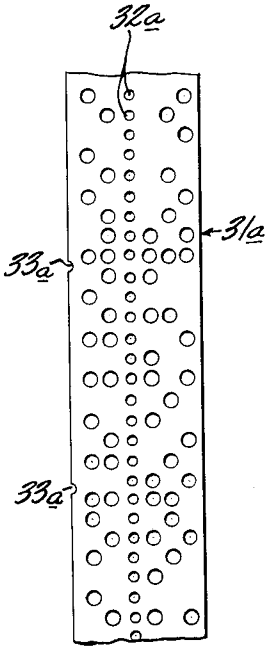

FIG. 4.

INVENTORS.
RAYMOND A. BARBEAU &
DONALD K. CLOSE
BY
Brumbaugh, Free, Graves & Donohue
their ATTORNEYS.

METHOD AND APPARATUS FOR VERIFYING PUNCHED TAPE
Filed Dec. 16, 1957 30 Sheets-Sheet 3
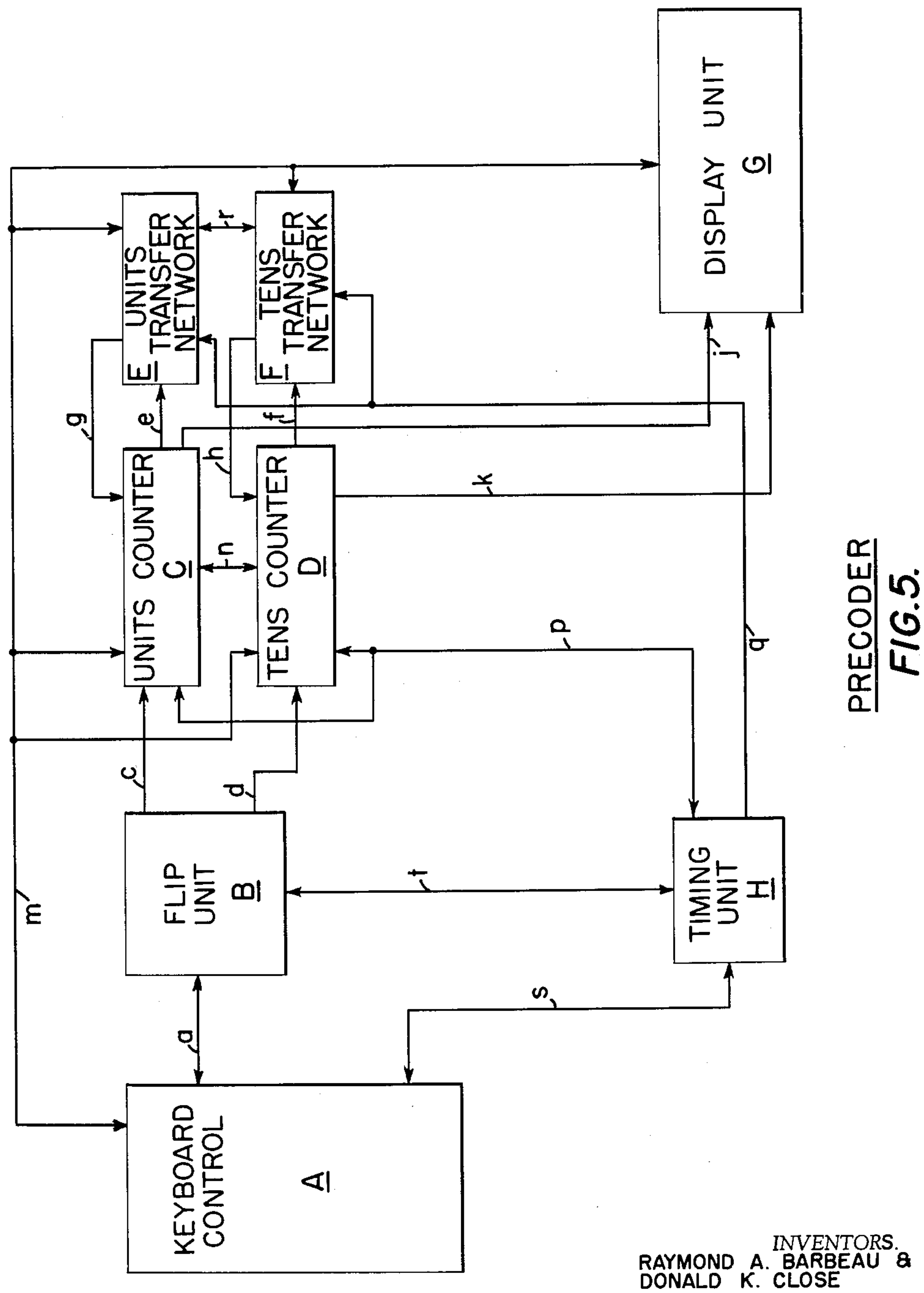
PRECODER FIG.5.
INVENTORS.
RAYMOND A. BARBEAU &
DONALD K. CLOSE
BY
Brumbaugh, Free, Graves & Donohue
their ATTORNEYS.

INVENTORS.
RAYMOND A. BARBEAU &
DONALD K. CLOSE
BY
Brumbaugh, Free, Graves & Donohue
their ATTORNEYS.

INVENTORS.
RAYMOND A. BARBEAU &
DONALD K. CLOSE
BY
Brumbaugh, Free, Graves & Donohue
their ATTORNEYS.

Nov. 20, 1962 R. A. BARBEAU ET AL 3,064,885

METHOD AND APPARATUS FOR VERIFYING PUNCHED TAPE

Filed Dec. 16, 1957 30 Sheets-Sheet 6

UNITS COUNTER-C

INVENTORS.
RAYMOND A. BARBEAU &
DONALD K. CLOSE

BY Brumbaugh, Free, Graves & Donohue their ATTORNEYS.

Nov. 20, 1962 R. A. BARBEAU ETAL 3,064,885

METHOD AND APPARATUS FOR VERIFYING PUNCHED TAPE

Filed Dec. 16, 1957 30 Sheets-Sheet 7

INVENTORS.
RAYMOND A. BARBEAU &
DONALD K. CLOSE
BY
Brumbaugh, Free, Graves & Donohue
their ATTORNEYS.

METHOD AND APPARATUS FOR VERIFYING PUNCHED TAPE

Filed Dec. 16, 1957 30 Sheets-Sheet 8

INVENTORS.
RAYMOND A. BARBEAU &
DONALD K. CLOSE
BY
Brumbaugh, Free, Graves & Donohue
their ATTORNEYS.

Nov. 20, 1962 R. A. BARBEAU ETAL 3,064,885

METHOD AND APPARATUS FOR VERIFYING PUNCHED TAPE

Filed Dec. 16, 1957

30 Sheets-Sheet 9

*INVENTORS.*
RAYMOND A. BARBEAU &
DONALD K. CLOSE

*BY*

Brumbaugh, Free, Graves & Donohue their *ATTORNEYS.*

METHOD AND APPARATUS FOR VERIFYING PUNCHED TAPE

INVENTORS.
RAYMOND A. BARBEAU &
DONALD K. CLOSE
BY
Brumbaugh, Free, Graves & Donohue
their ATTORNEYS.

METHOD AND APPARATUS FOR VERIFYING PUNCHED TAPE

Filed Dec. 16, 1957 30 Sheets-Sheet 11

INVENTORS.
RAYMOND A. BARBEAU &
DONALD K. CLOSE
BY
Brumbaugh, Free, Graves & Donohue
their ATTORNEYS.

INVENTORS.
RAYMOND A. BARBEAU &
DONALD K. CLOSE
BY
Brumbaugh, Free, Graves & Donohue
their ATTORNEYS.

INVENTORS.
RAYMOND A. BARBEAU &
DONALD K. CLOSE
BY Brumbaugh, Free, Graves & Donohue
their ATTORNEYS.

METHOD AND APPARATUS FOR VERIFYING PUNCHED TAPE

INVENTORS.
RAYMOND A. BARBEAU &
DONALD K. CLOSE
BY
Brumbaugh, Free, Graves & Donohue
their ATTORNEYS.

Nov. 20, 1962 R. A. BARBEAU ETAL 3,064,885

METHOD AND APPARATUS FOR VERIFYING PUNCHED TAPE

Filed Dec. 16, 1957 30 Sheets-Sheet 15

INVENTORS.
RAYMOND A. BARBEAU &
DONALD K. CLOSE
BY
Brumbaugh, Free, Graves & Donohue
their ATTORNEYS.

INVENTORS.
RAYMOND A. BARBEAU
DONALD K. CLOSE
BY
Brumbaugh, Free, Graves & Donohue
their ATTORNEYS.

Nov. 20, 1962 R. A. BARBEAU ETAL 3,064,885

METHOD AND APPARATUS FOR VERIFYING PUNCHED TAPE

Filed Dec. 16, 1957 30 Sheets-Sheet 17

INVENTORS.
RAYMOND A. BARBEAU
DONALD K. CLOSE

BY Brumbaugh, Free, Graves & Donohue their ATTORNEYS.

Nov. 20, 1962 R. A. BARBEAU ET AL 3,064,885

METHOD AND APPARATUS FOR VERIFYING PUNCHED TAPE

Filed Dec. 16, 1957 30 Sheets-Sheet 18

INVENTORS.
RAYMOND A. BARBEAU &
DONALD K. CLOSE
BY
Brumbaugh, Free, Graves & Donohue
their ATTORNEYS.

INVENTORS.
RAYMOND A. BARBEAU &
DONALD K. CLOSE
BY
Brumbaugh, Free, Graves & Donohue
their ATTORNEYS.

INVENTORS.
RAYMOND A. BARBEAU &
DONALD K. CLOSE
BY
Brumbaugh, Free, Graves & Donohue
their ATTORNEYS.

INVENTORS.
RAYMOND A. BARBEAU &
DONALD K. CLOSE
BY
Brumbaugh, Free, Graves & Donohue
their ATTORNEYS.

Nov. 20, 1962 R. A. BARBEAU ETAL 3,064,885

METHOD AND APPARATUS FOR VERIFYING PUNCHED TAPE

Filed Dec. 16, 1957 30 Sheets-Sheet 22

INVENTORS.
RAYMOND A. BARBEAU &
DONALD K. CLOSE
BY
Brumbaugh, Free, Graves & Donohue
their ATTORNEYS.

INVENTORS.
RAYMOND A. BARBEAU &
DONALD K. CLOSE
BY
Brumbaugh, Free, Graves & Donohue
their ATTORNEYS.

Nov. 20, 1962 R. A. BARBEAU ETAL 3,064,885

METHOD AND APPARATUS FOR VERIFYING PUNCHED TAPE

Filed Dec. 16, 1957 30 Sheets-Sheet 24

INVENTORS.
RAYMOND A. BARBEAU &
DONALD K. CLOSE
BY
Brumbaugh, Free, Graves & Donohue
their ATTORNEYS.

INVENTORS.
RAYMOND A. BARBEAU &
DONALD K. CLOSE
BY
Brumbaugh, Free, Graves & Donohue
their ATTORNEYS.

Nov. 20, 1962 R. A. BARBEAU ETAL 3,064,885

METHOD AND APPARATUS FOR VERIFYING PUNCHED TAPE

Filed Dec. 16, 1957

30 Sheets-Sheet 26

INVENTORS.
RAYMOND A. BARBEAU &
DONALD K. CLOSE
BY
Brumbaugh, Free, Graves & Donohue
their ATTORNEYS.

METHOD AND APPARATUS FOR VERIFYING PUNCHED TAPE

Filed Dec. 16, 1957

30 Sheets-Sheet 27

INVENTORS.
RAYMOND A. BARBEAU &
DONALD K. CLOSE

BY Brumbaugh, Free, Graves & Donohue their ATTORNEYS.

INVENTORS.
RAYMOND A. BARBEAU &
DONALD K. CLOSE
BY
Brumbaugh, Free, Graves & Donohue
their ATTORNEYS.

Nov. 20, 1962 R. A. BARBEAU ETAL 3,064,885

METHOD AND APPARATUS FOR VERIFYING PUNCHED TAPE

Filed Dec. 16, 1957 30 Sheets-Sheet 29

INVENTORS.
RAYMOND A. BARBEAU &
DONALD K. CLOSE
BY
Brumbaugh, Free, Graves & Donohue
their ATTORNEYS.

INVENTORS.
RAYMOND A. BARBEAU &
DONALD K. CLOSE
BY
Brumbaugh, Free, Graves & Donohue
their ATTORNEYS.

3,064,885

METHOD AND APPARATUS FOR VERIFYING PUNCHED TAPE

Raymond A. Barbeau, Poughkeepsie, and Donald K. Close, Wappingers Falls, N.Y., assignors to International Business Machines Corporation, New York, N.Y., a corporation of New York Filed Dec. 16, 1957, Ser. No. 703,178
24 Claims. (Cl. 235—61.7)

This invention relates to information recording systems and, more particularly, to a system for preparing perforated tape bearing coded information wherein the accuracy of the information recorded is verified at the time it is punched into the tape.

When information is recorded in coded form as, for example, on papertape, it is important to check the accuracy of each information message recorded lest errors in preparing the tape be transferred to documents automatically produced by the tape such, for example, as invoices in a tape-controlled billing system.

Customarily each roll of tape, which may contain information for a hundred or more invoices or messages, is perforated by a tape punch operator who copies a large number of original documents, or source records, and enters the information contained in all the documents into a single tape roll in a sequence of messages. Afterward, the entire roll of tape is checked for accuracy by another operator who compares the group of original documents with the coded tape messages. If a coded message is found to be inaccurate, it is overpunched or otherwise deleted from the roll and the original document which was incorrectly recorded is segregated from the group and returned to the tape punch operator to be recorded again on another tape roll, thus disrupting the sequence of tape messages and the order of the source documents and requiring rerouting of the incorrectly copied document.

Accordingly, it is an object of this invention to provide a system for recording coded information wherein each information message is checked for accuracy at the time the coded record is produced.

Another object of the invention is to provide a system of the above character wherein an error in a recorded message is detected and deleted before the next message is recorded.

A further object of the invention is to provide a new and improved code system wherein each character in a message is assigned a check code number which is a function of its position in the message.

Still another object of the invention is to provide apparatus for generating a check code number of the above type for each character in a message and accumulating a check code total for the entire message.

Yet another object of the invention is to provide tape perforating apparatus for producing a punched record of an information message and simultaneously generating a check code total for each message and comparing it with a predetermined check code total.

These and other objects of the invention are attained by assigning a check code number to each alpha-numerical character, arranging the digits of the number in a predetermined manner according to the location of the character in the message, and combining the check code numbers associated with all of the characters in the message to obtain a check code total. The message is then transcribed on a recording medium while a second check code total is simultaneously accumulated in the same manner. The two totals are then compared and, if they agree, the message has been verified and the next message may be recorded. Disagreement of the totals indicates a discrepancy and the recorded message is checked for accuracy and, if found to be incorrect, is deleted and correctly transcribed immediately afterward.

Apparatus for carrying out the invention in the manner described above includes a precoder having a typewriter keyboard, for example, wherein the message information is entered in the usual manner. Circuits actuated by each typewriter key enter the code number digits into separate digit counters, the digits of each number being arranged according to the position of the corresponding character in the message by a digit transposer, or flip unit. During the typing of each message a check code total which is a function of all the character code numbers and their digit arrangements is accumulated by the counters and at the end of the message this total is presented on a display unit.

Recording of the message on a record medium such as paper tape takes place in an encoder having a similar keyboard and including a tape punch, for example, which enters a punch code in the tape representing each message character. In order to verify the message a flip unit and counters similar to those included in the precoder are utilized to accumulate a second check code total and a comparer determines whether this total agrees with the precoder check code. In addition, an automatic deletion mechanism responsive to the comparer is adapted to cancel out messages incorrectly recorded in the tape.

Further objects and advantages of the invention will be apparent from a reading of the following description in conjunction with the accompanying drawings in which:

FIG. 2 is a table illustrating typical character code assignments utilized in a two digit code system according to the invention;

Figure 6:
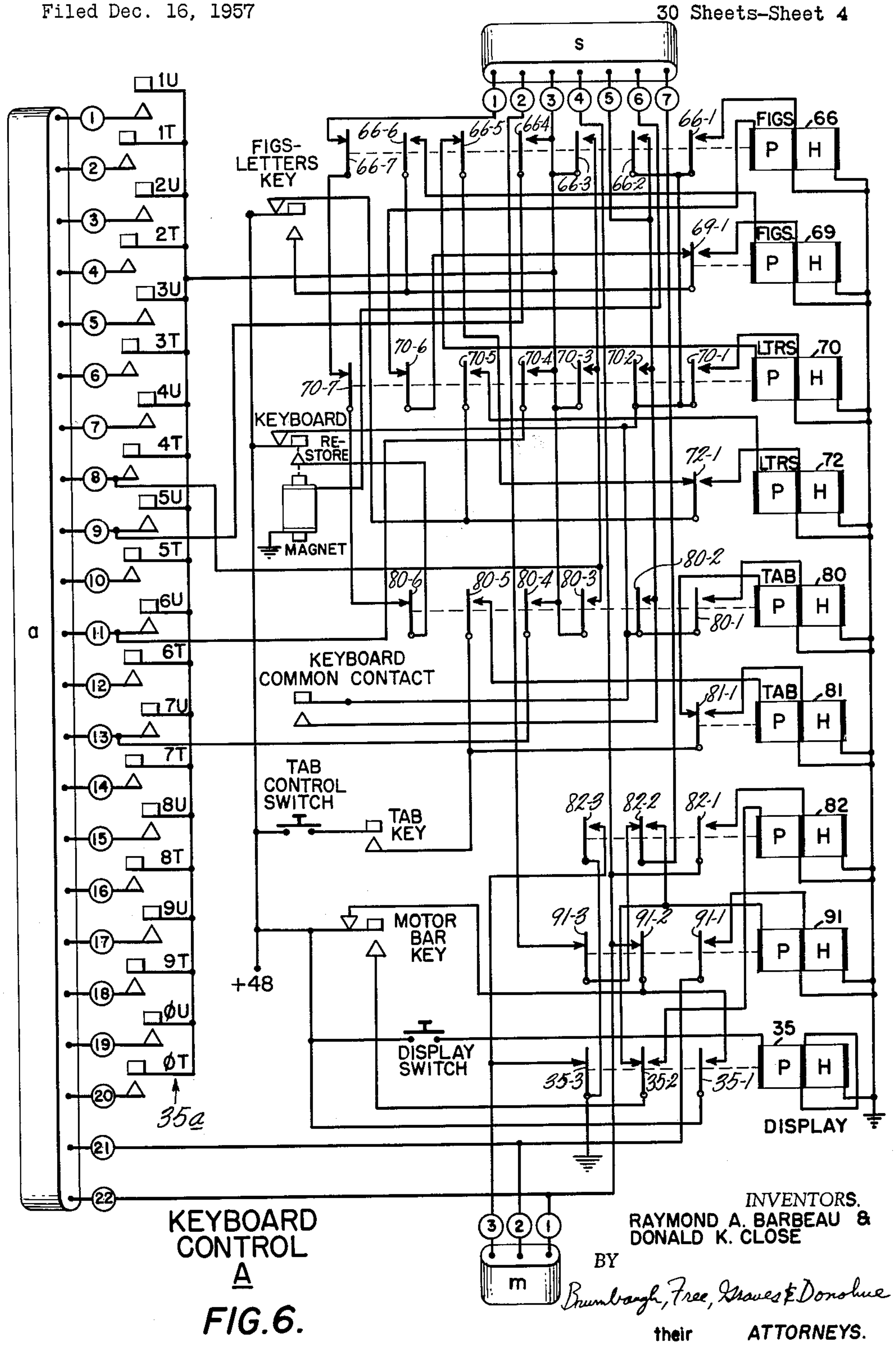
Figure 7:
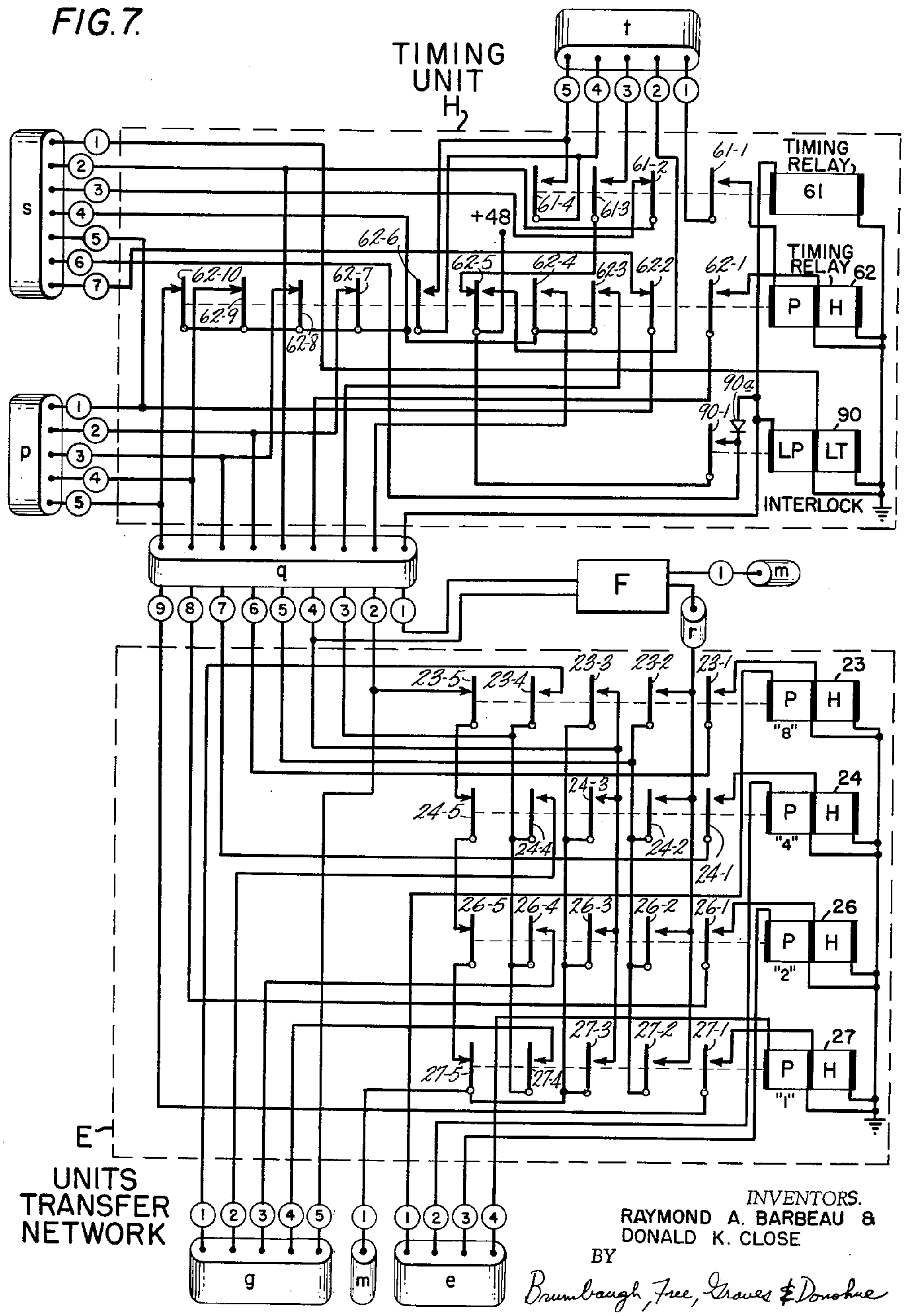
Figure 8:
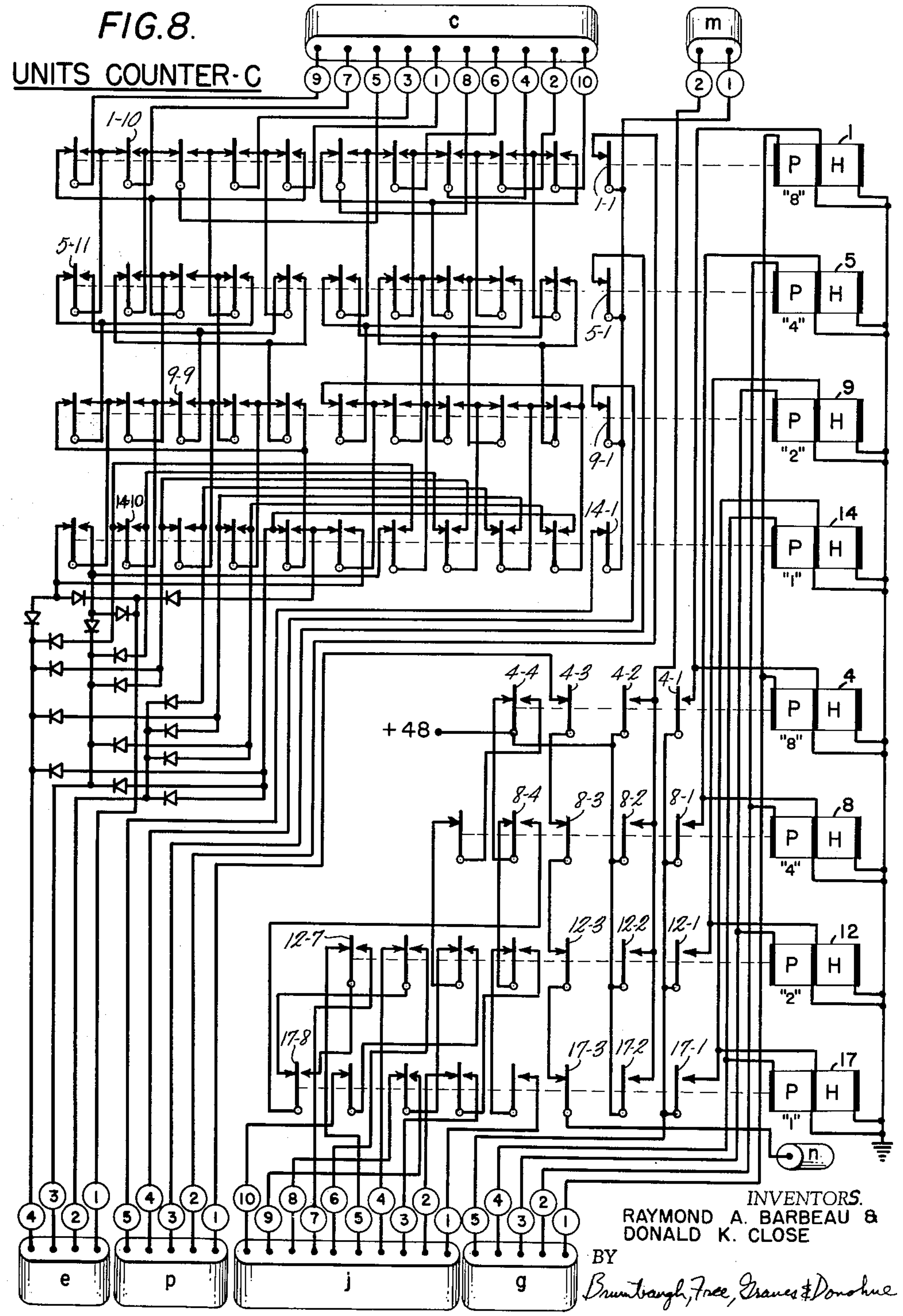
Figure 9:
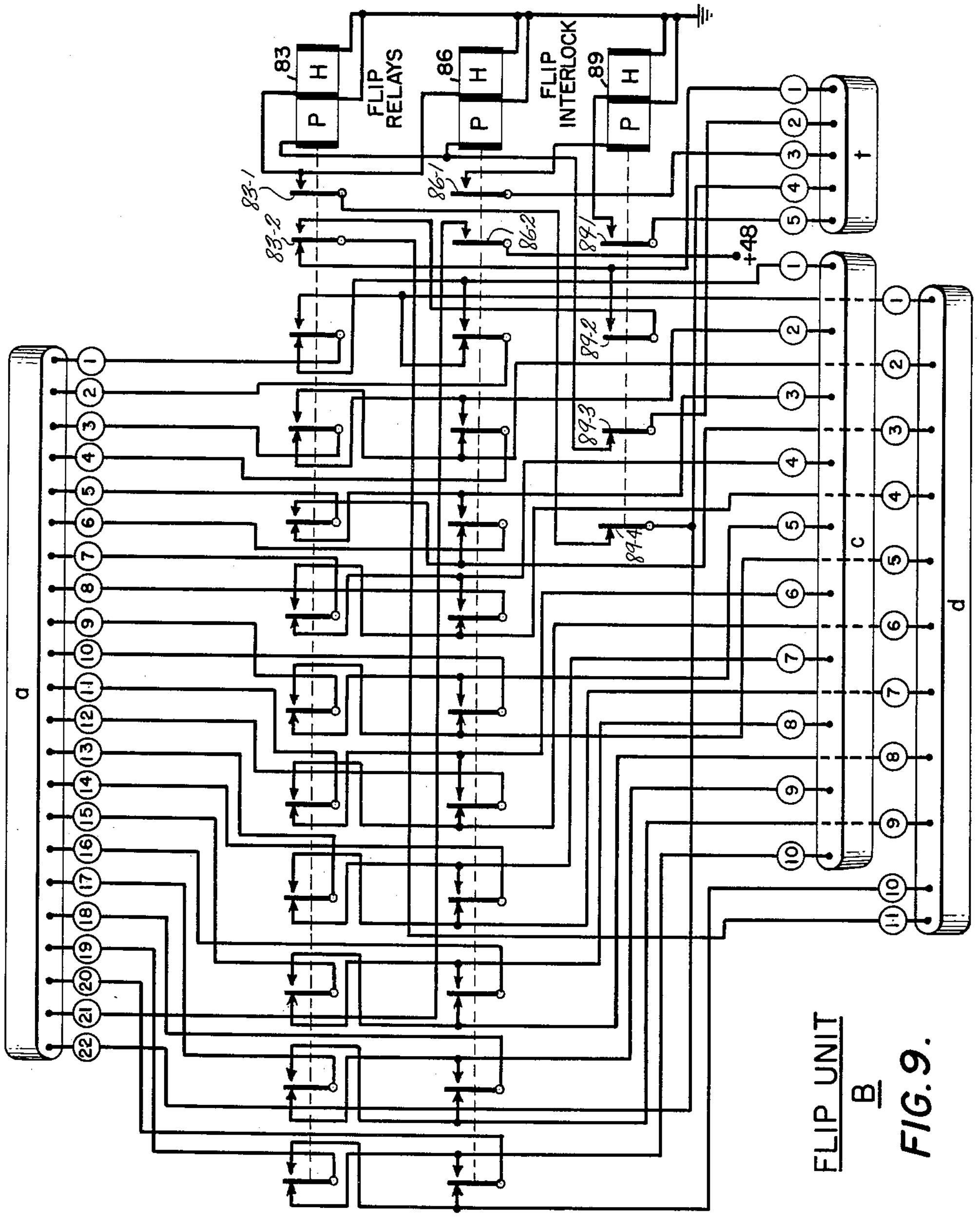
Figure 11:
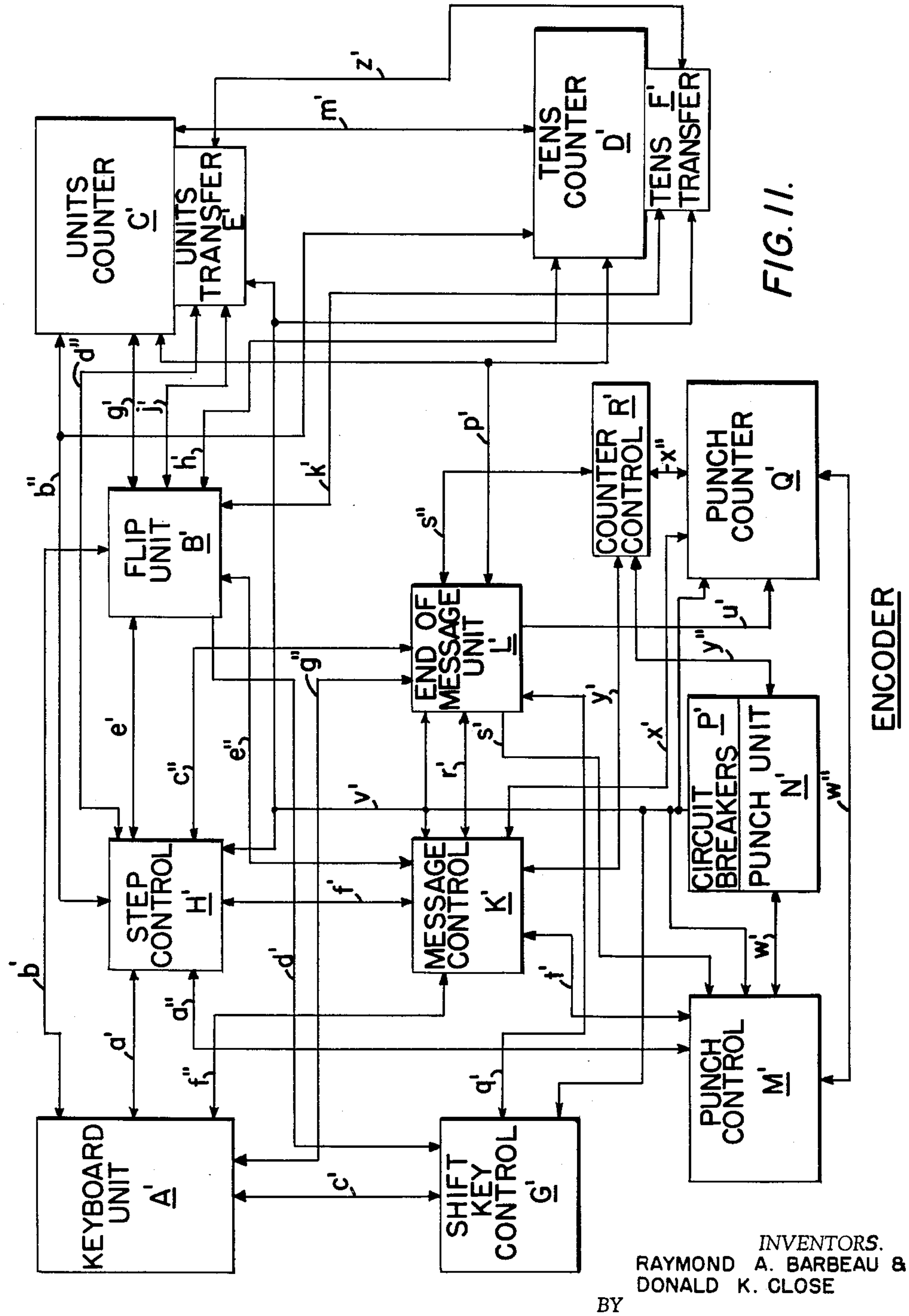
Figure 12:
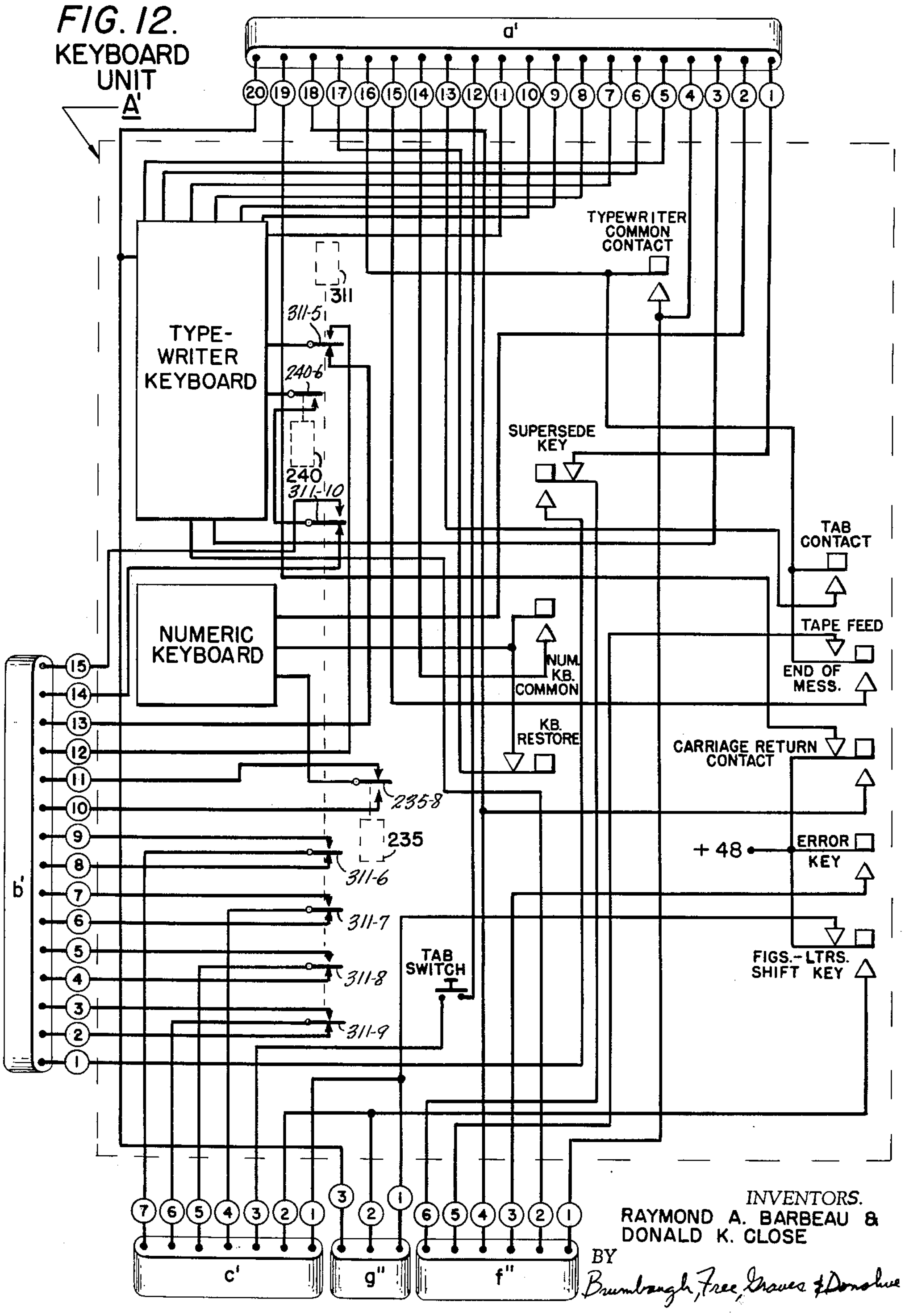
Figure 13A:
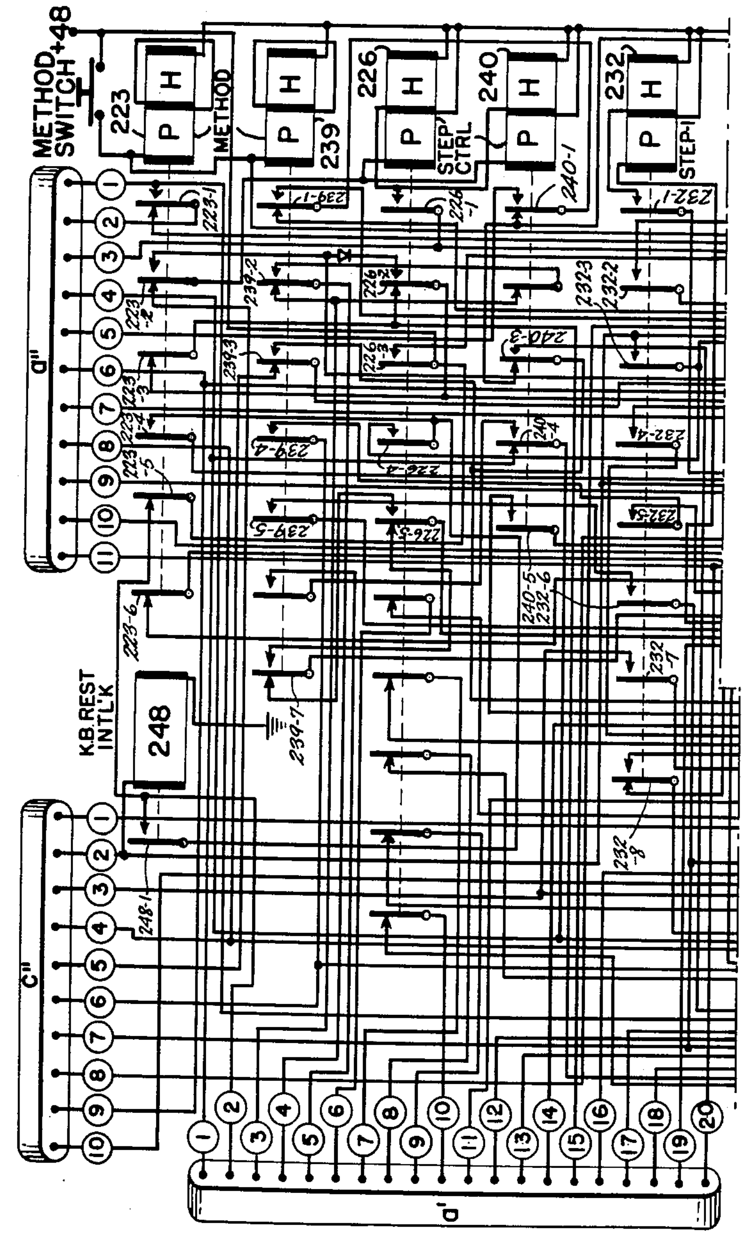
Figure 13:
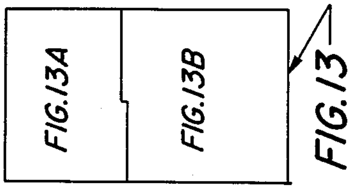
Figure 13B:
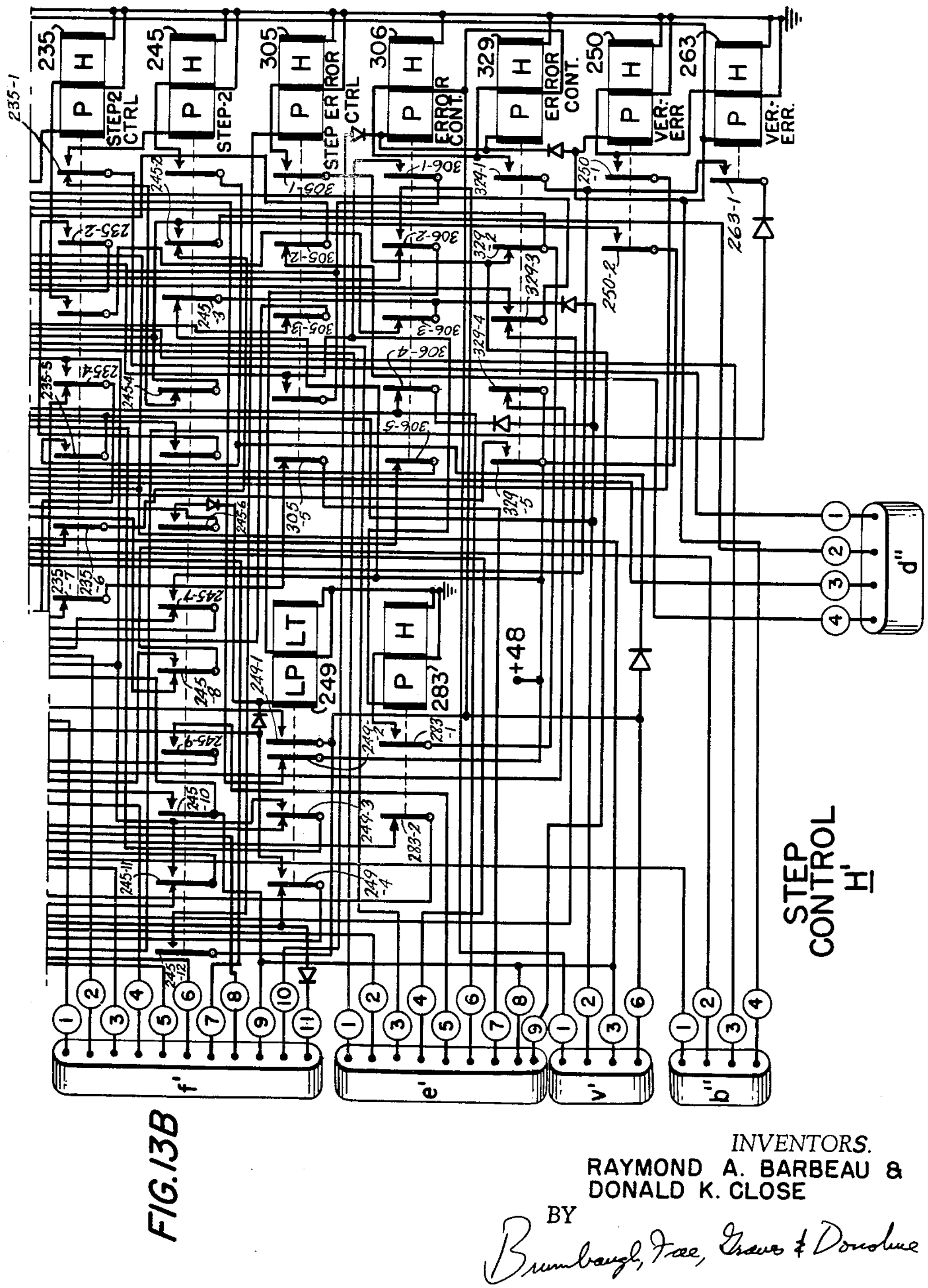
Figure 14B:
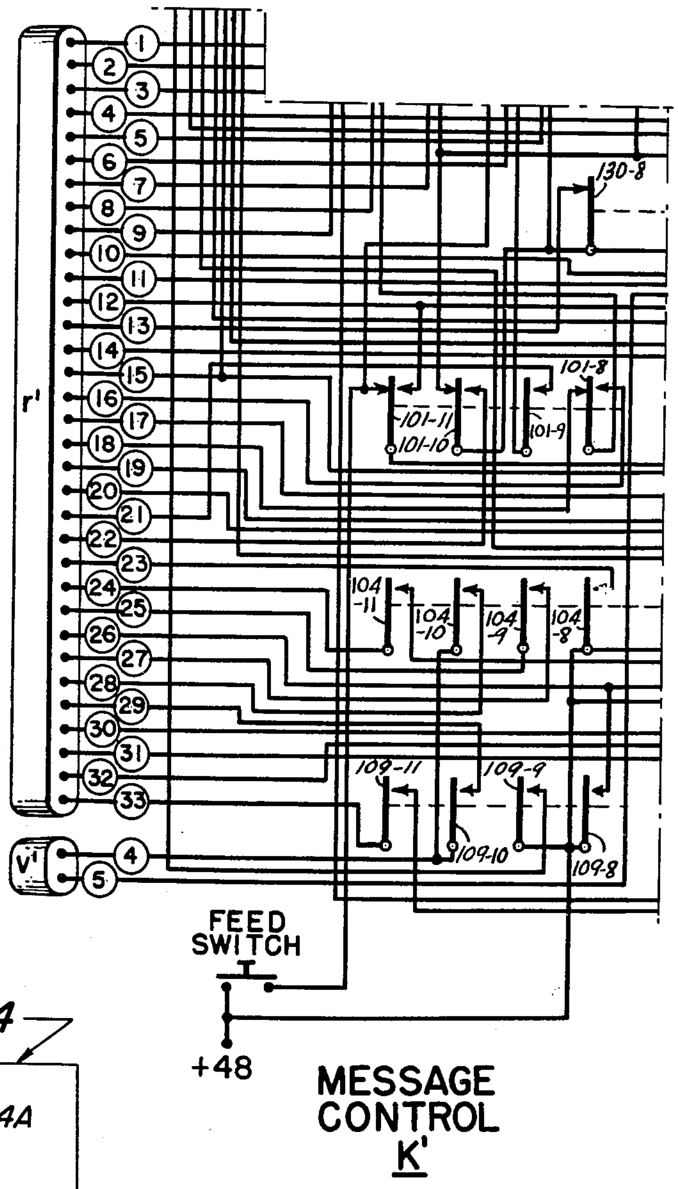
Figure 14:
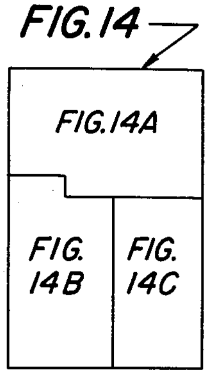
Figure 14A:
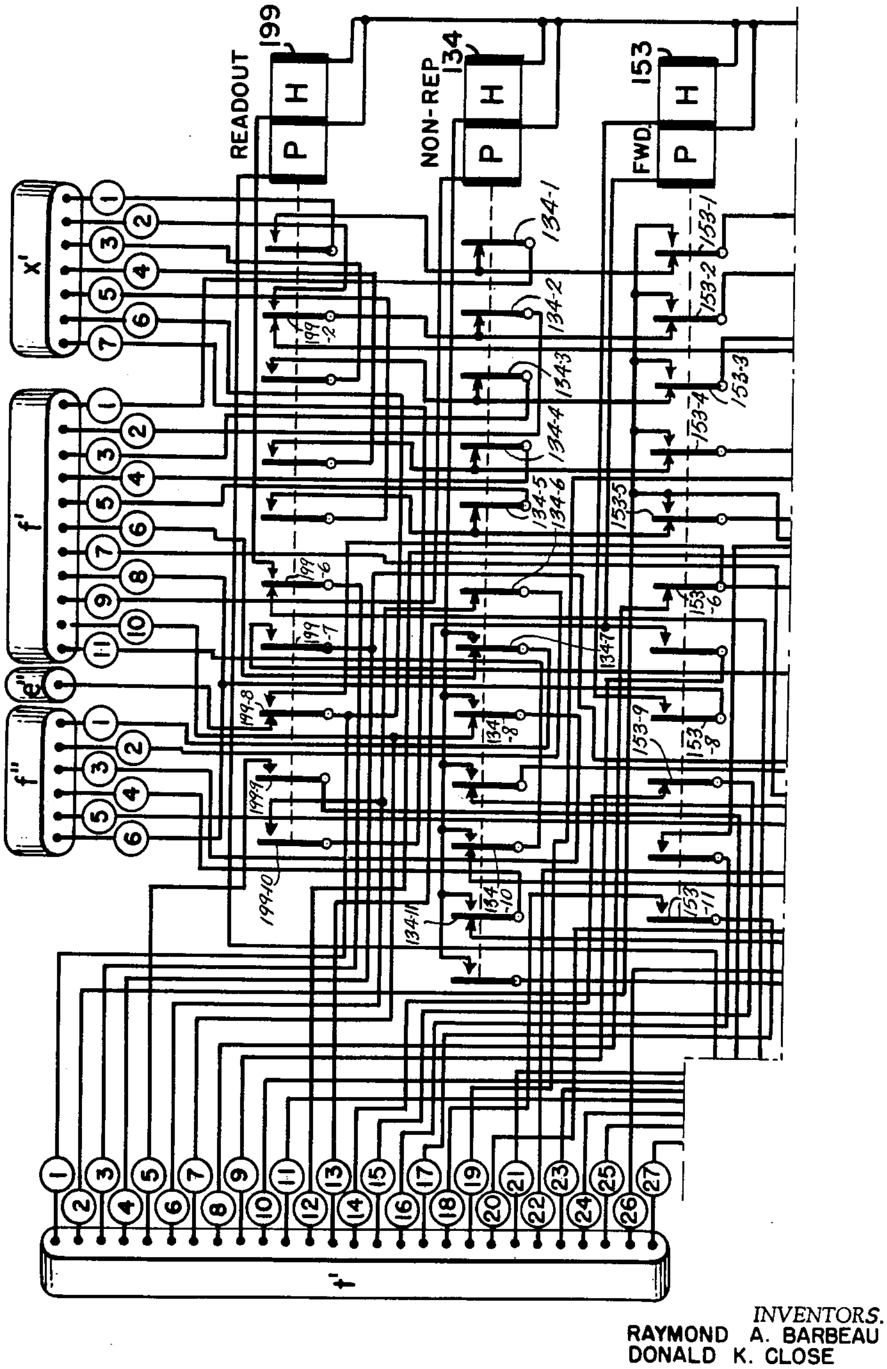
Figure 14C:
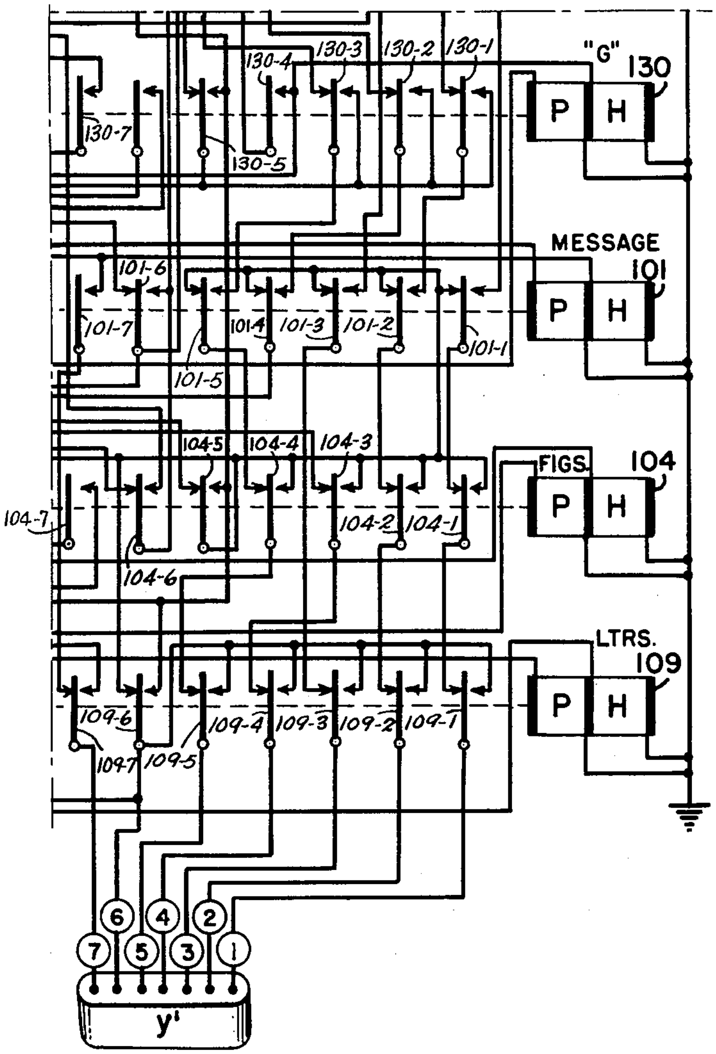
Figure 15:
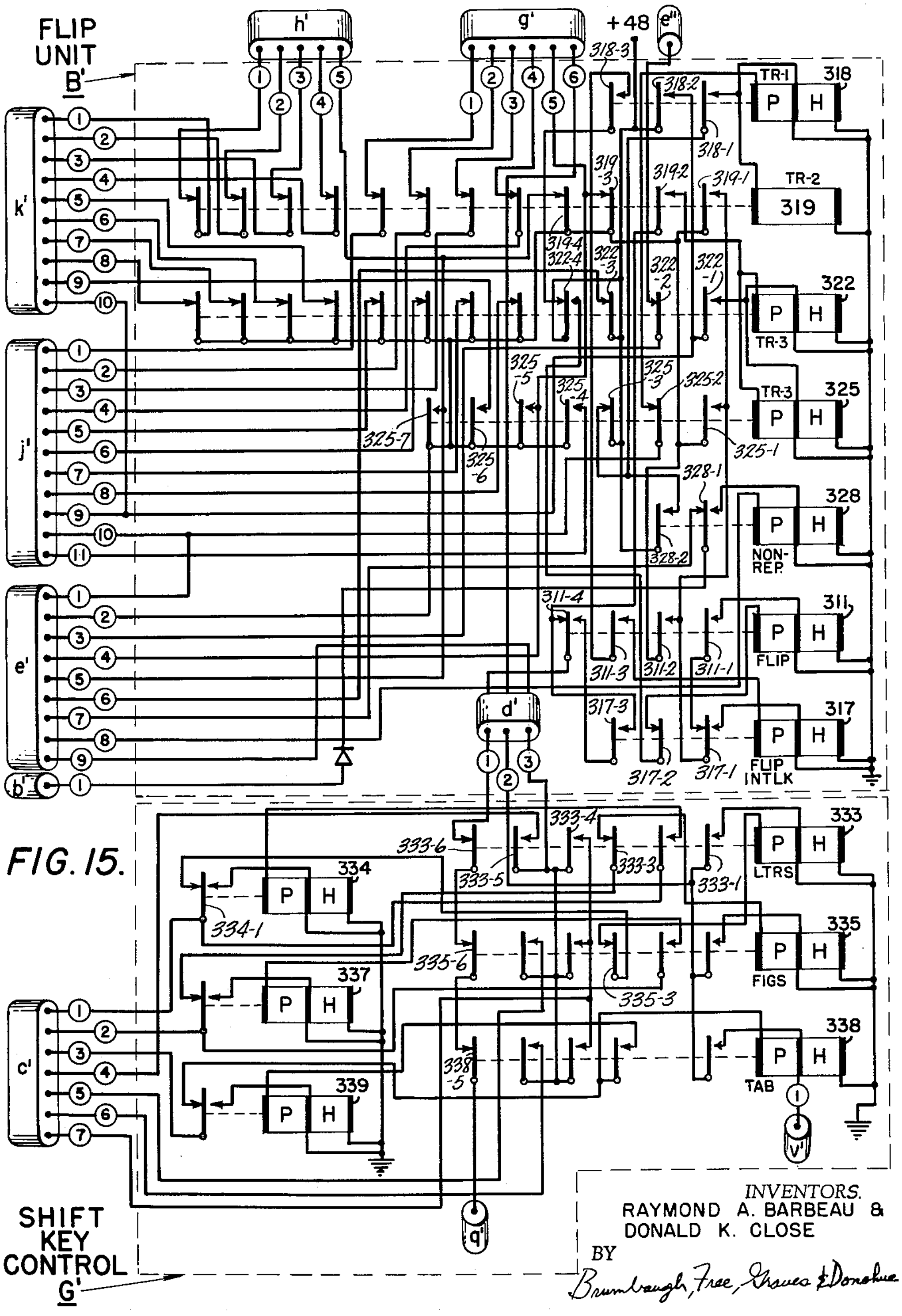
Figure 16:
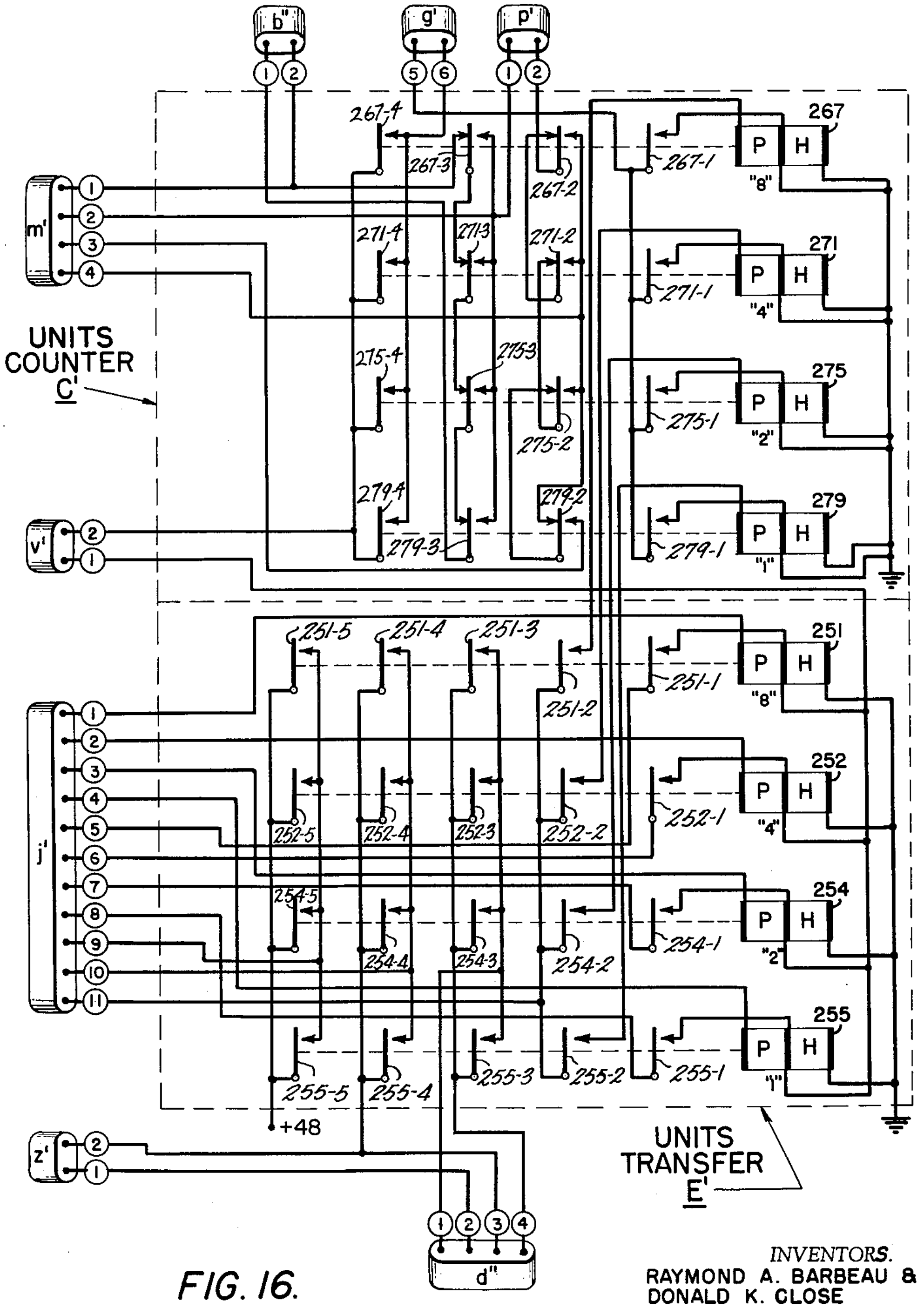
Figures 17, 17C:
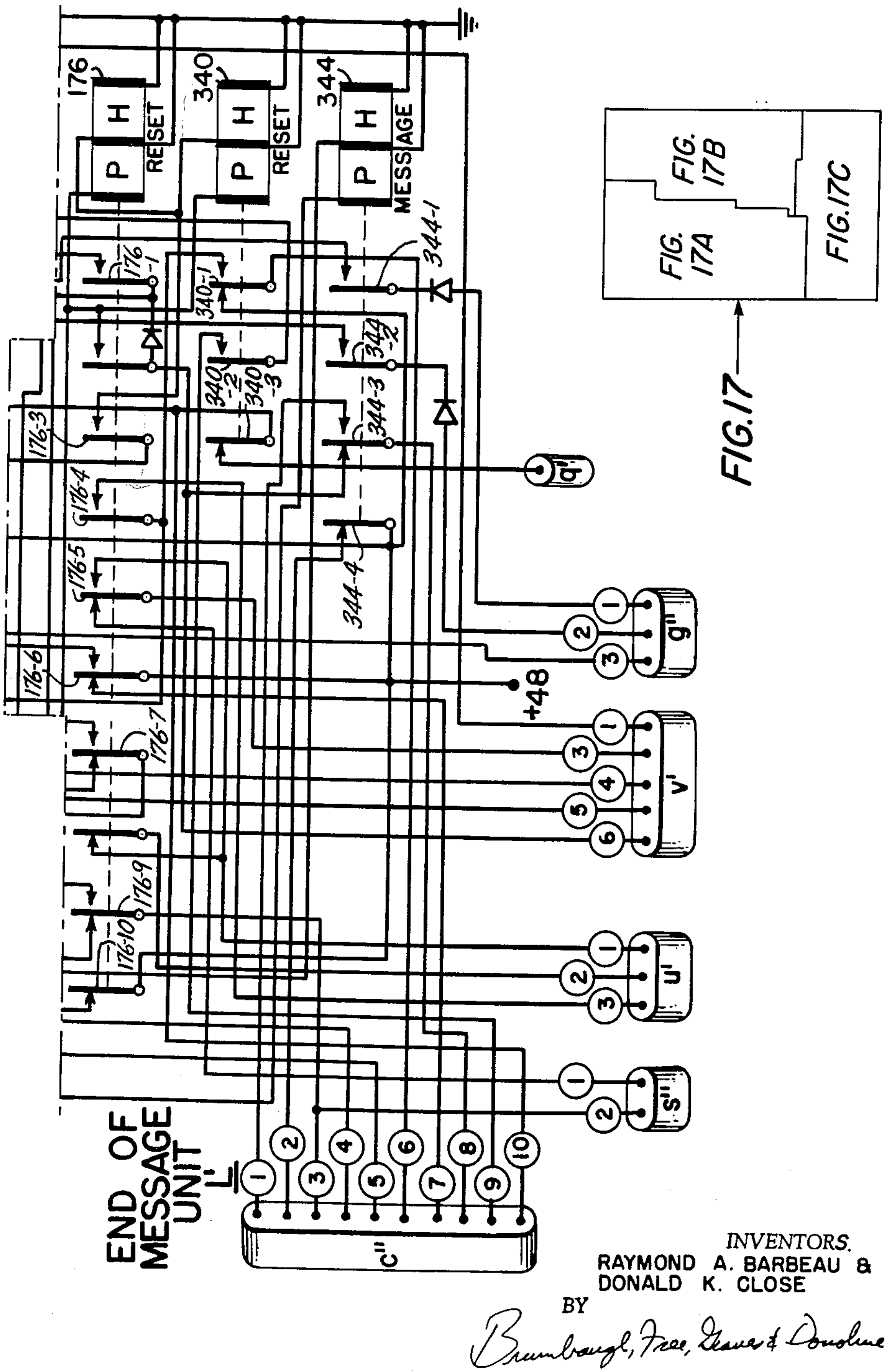
Figure 17A:
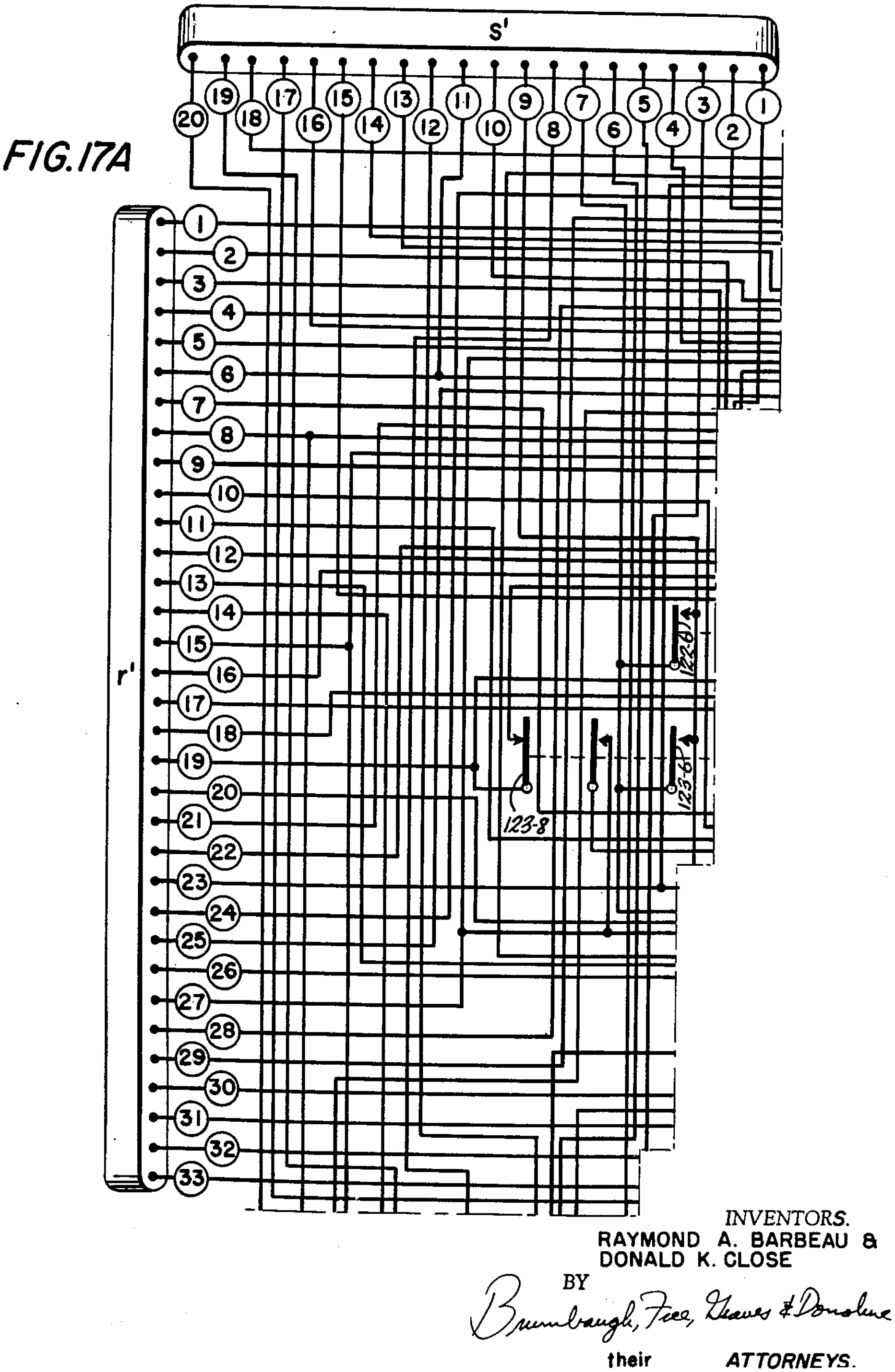
Figure 17B:
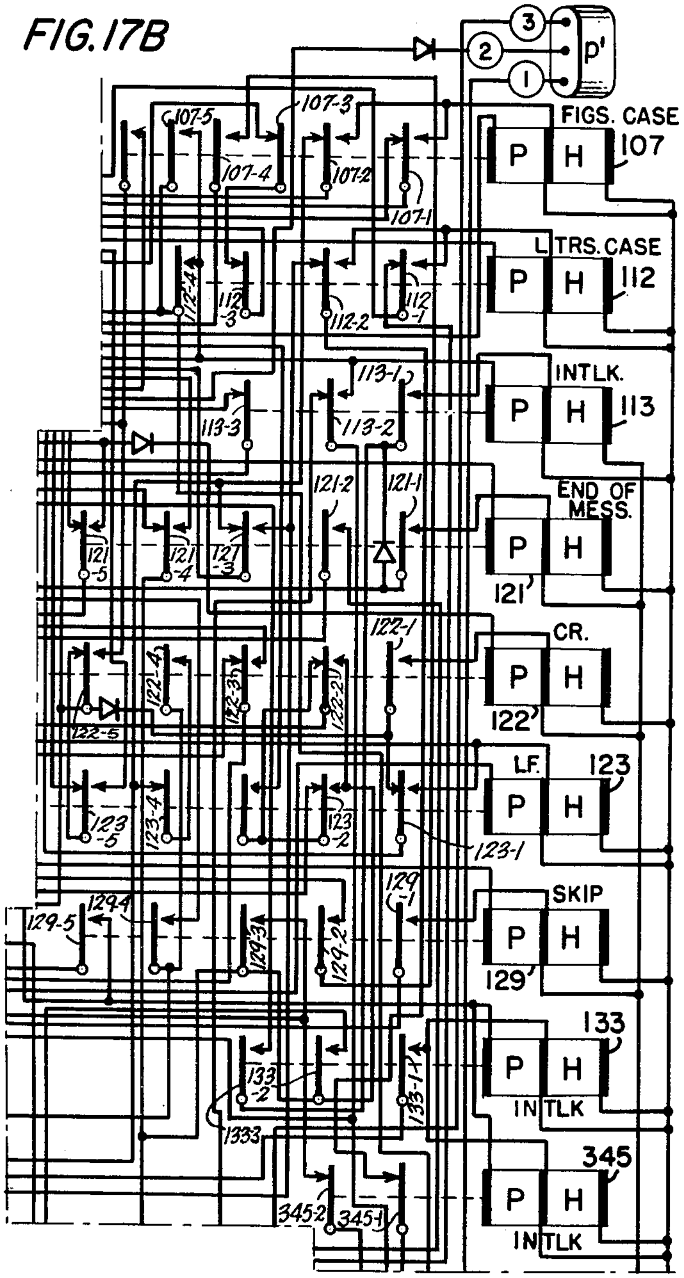
Figure 18B:
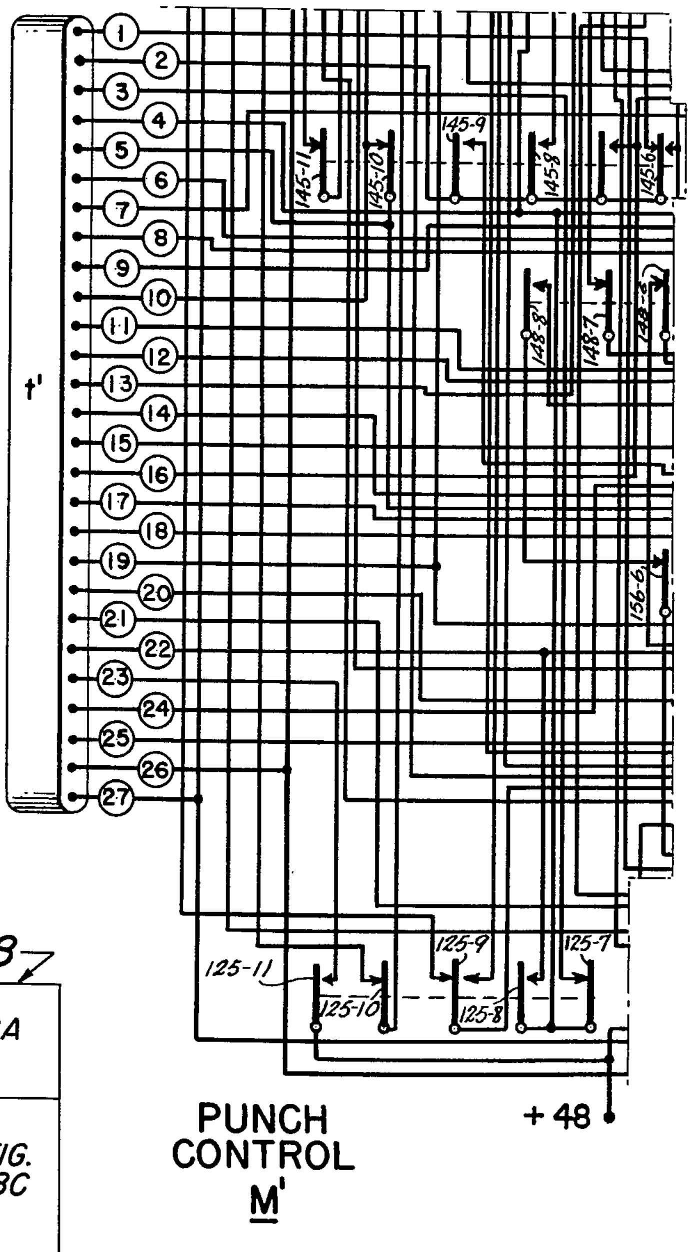
Figure 18:
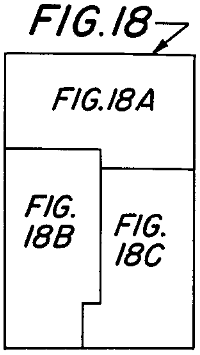
Figure 18A:
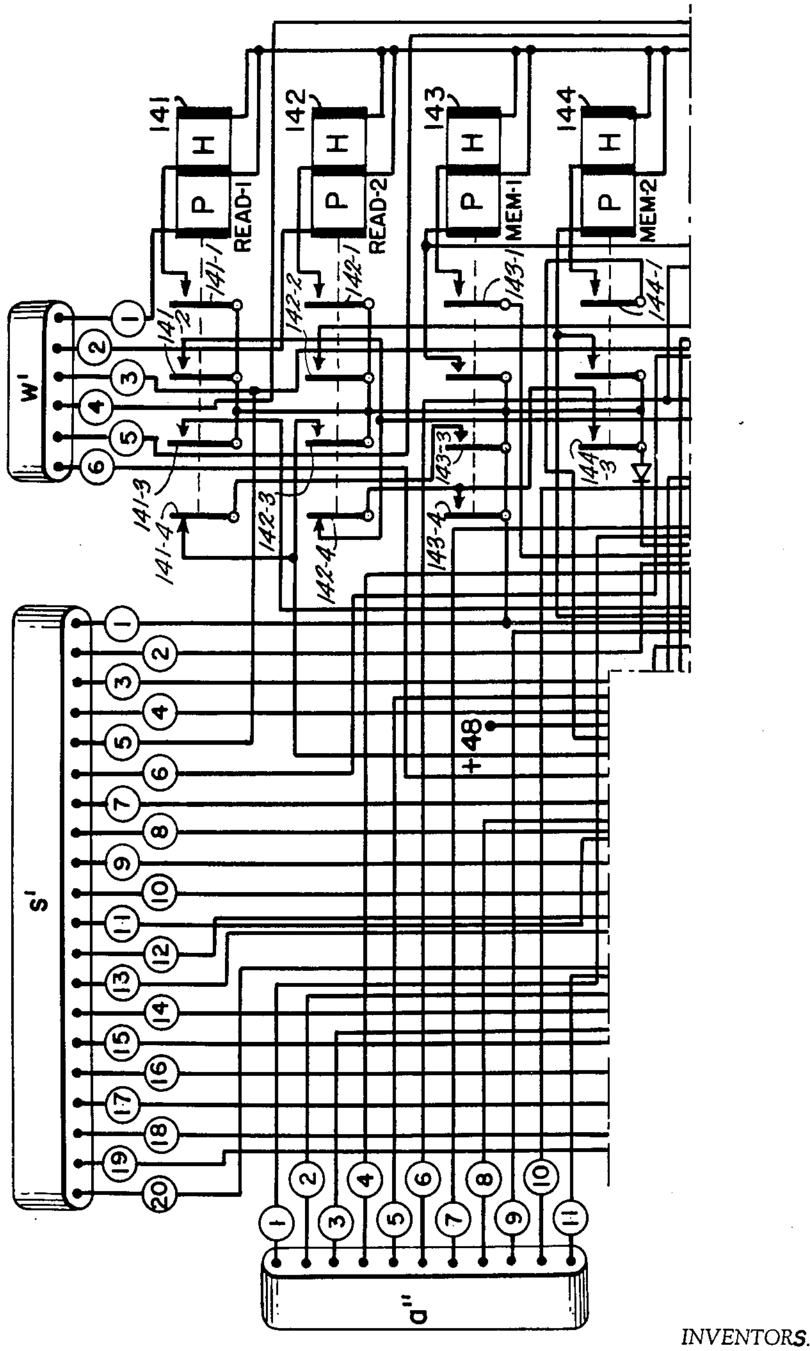
Figure 18C:
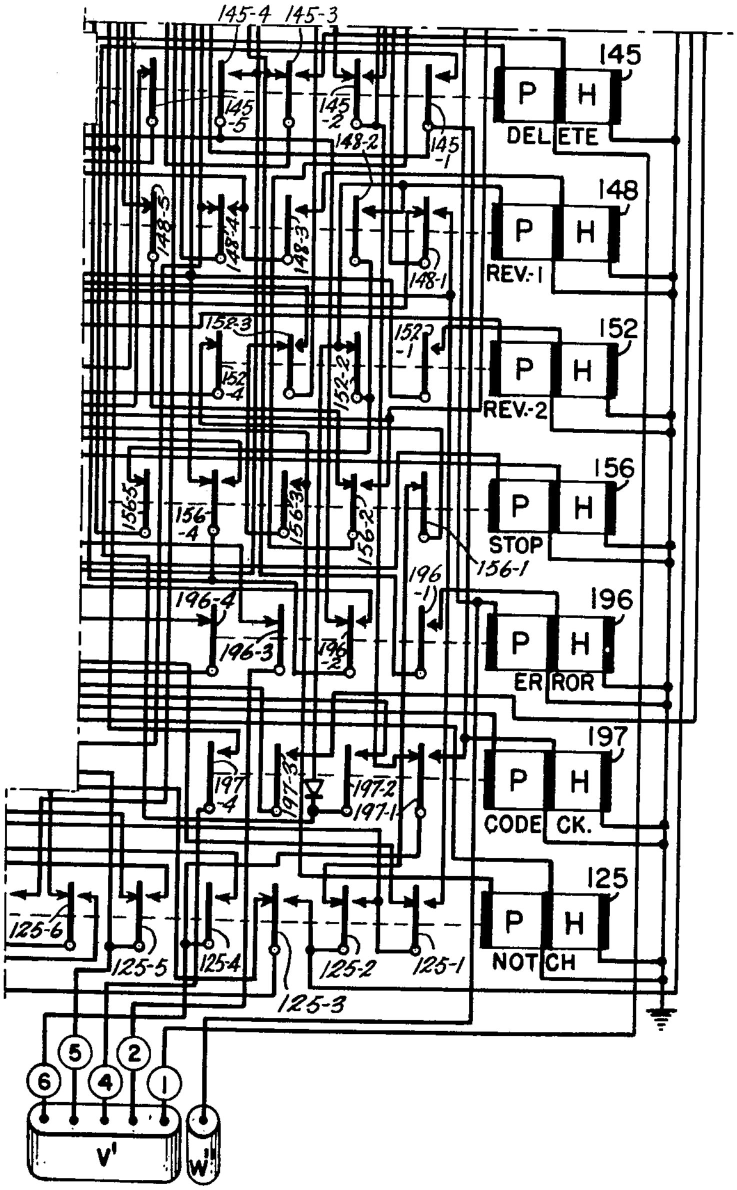
Figure 20:
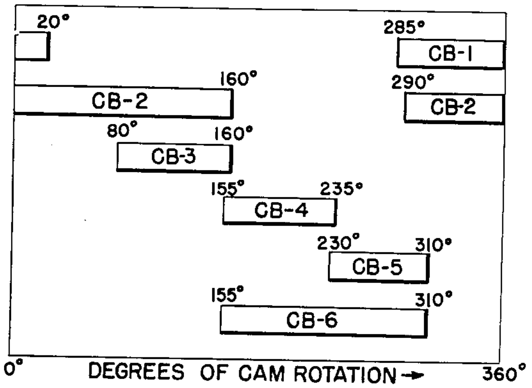
Figure 19:
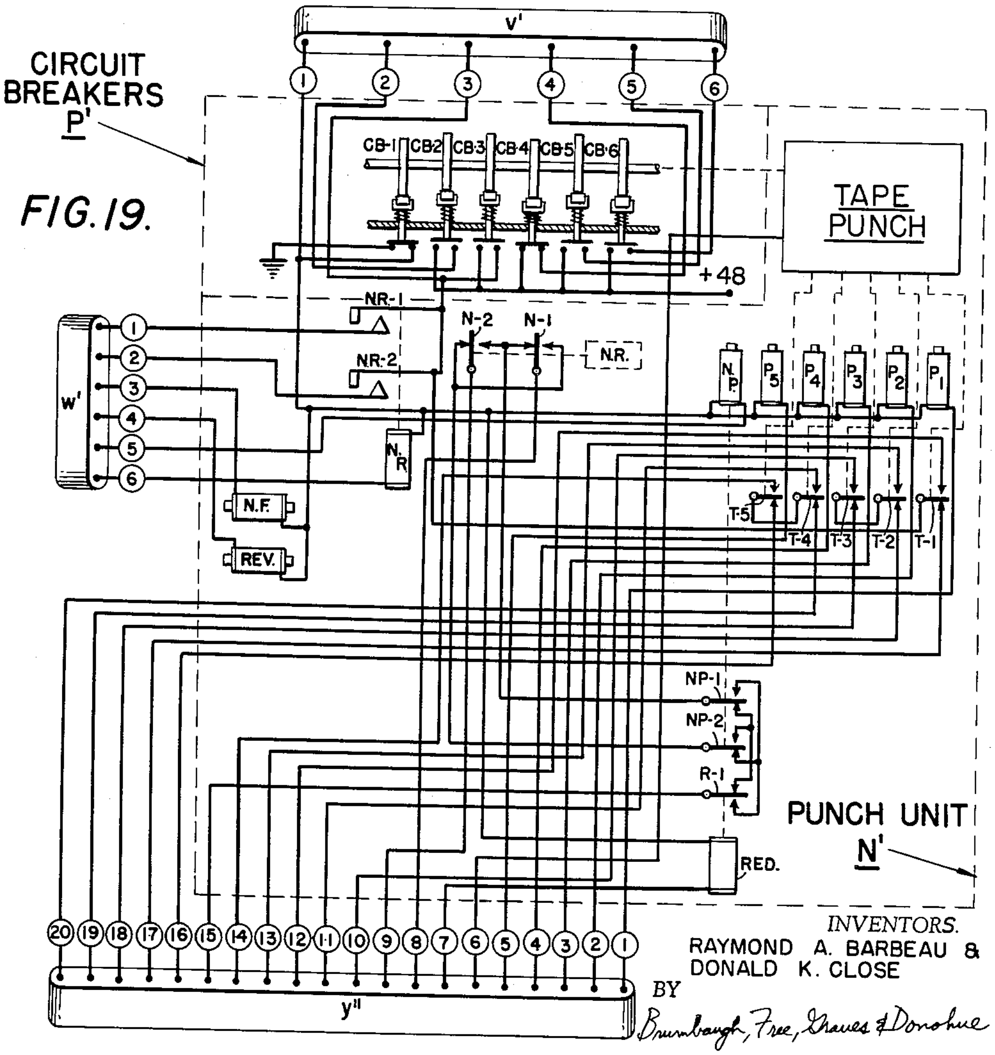
Figure 21A:
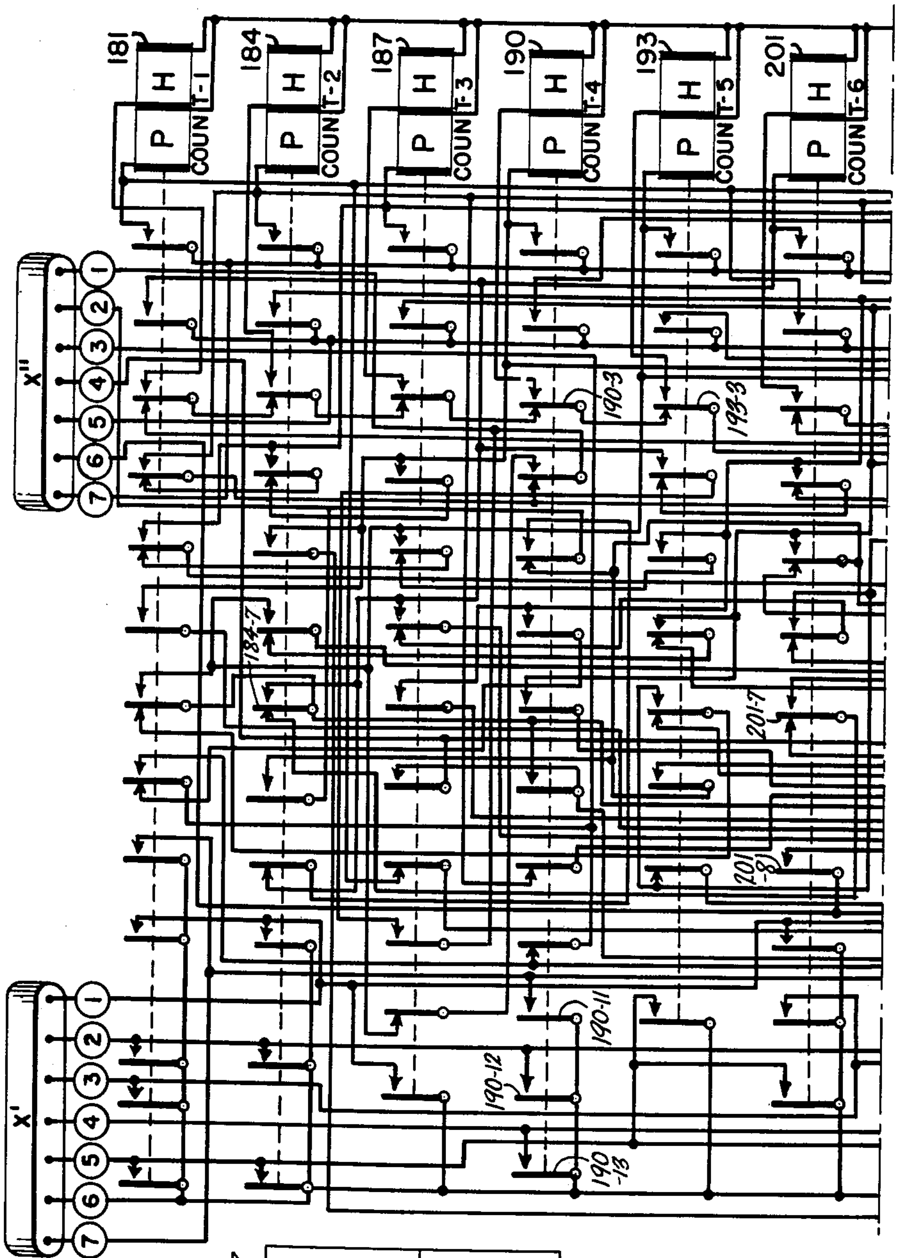
Figure 21:
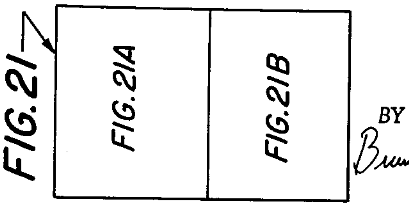
Figure 21B:
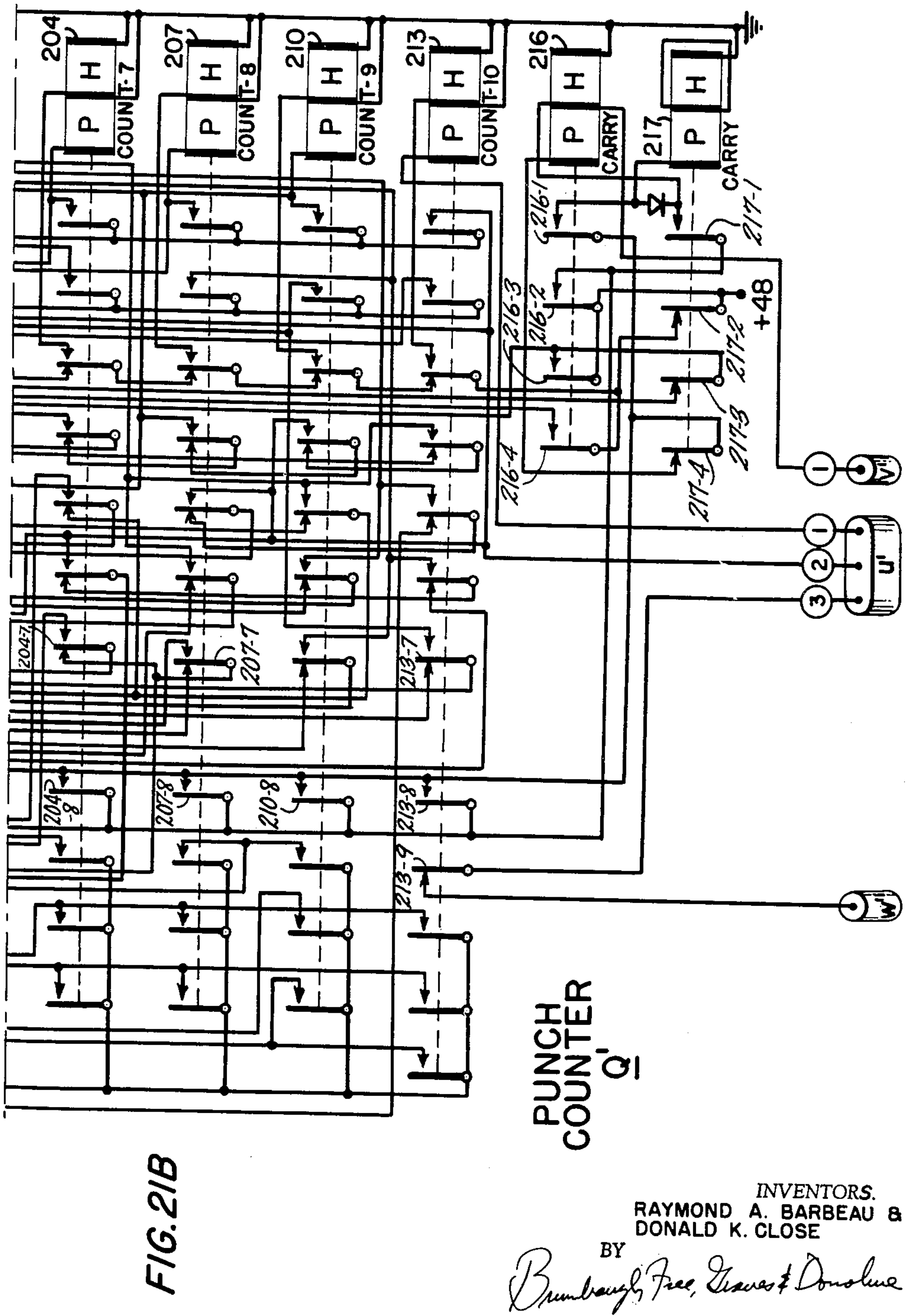

FIGS. 3*a*, 3*b* and 3*c* illustrate the manner of accumulation of check code totals according to the invention;

FIG. 4 illustrates a portion of a perforated tape prepared in accordance with the invention;

FIG. 5 is a block diagram illustrating a precoder arranged according to the invention;

FIG. 6 is a schematic diagram showing the keyboard control circuit for the precoder of FIG. 5;

FIG. 7 is a schematic circuit diagram of a flip unit;

FIG. 8 is a schematic circuit diagram of a typical counter utilized in the invention;

FIG. 9 illustrates schematically a timing unit and a transfer network arranged according to the invention;

FIGS. 10*a*–10*d* are sequence charts illustrating the sequence of operations of the precoder elements shown in FIGS. 5–9;

FIG. 11 is a block diagram showing the arrangement of a typical encoder according to the invention;

FIG. 12 is a schematic diagram illustrating the keyboard unit of the encoder;

FIG. 13 discloses the manner of assembling FIGS. 13*a* and 13*b*;

FIGS. 13*a* and 13*b* illustrate schematically the step control circuit of the encoder;

FIG. 14 discloses the manner of assembling FIGS. 14*a*–14*c*;

FIGS. 14*a*–14*c* are schematic circuit diagrams of the message control unit of the encoder;

FIG. 15 is a schematic circuit diagram of a flip unit and a shift key control;

FIG. 16 is a schematic diagram showing portions of the units counter and units transfer circuits of the encoder;

FIG. 17 discloses the manner of assembling FIGS. 17*a*–17*c*;

FIGS. 17a–17c are schematic circuit diagrams of an end of message unit;

FIG. 18 discloses the manner of assembling FIGS. 18a–18c;

FIGS. 18a–18c are schematic illustrations of a punch control circuit;

FIG. 19 is a schematic diagram showing a punch unit and associated circuit breakers;

FIG. 20 is a sequence chart illustrating the timing of the circuit breakers shown in FIG. 19;

FIG. 21 discloses the manner of assembling FIGS. 21a–21c;

FIGS. 21a–21c are schematic circuit diagrams of a punch counter; and

Figure 22:
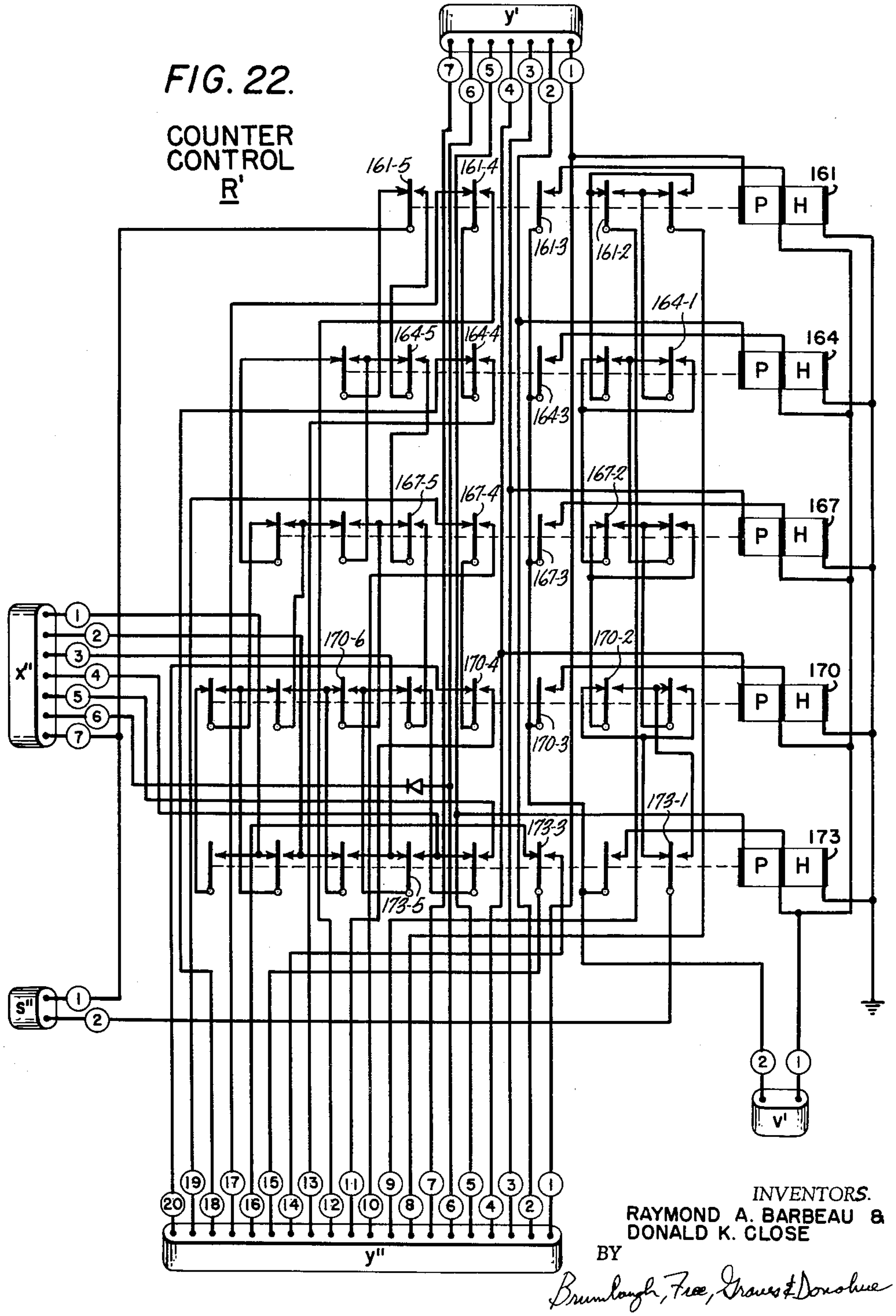

FIG. 22 illustrates schematically the circuit of a counter control.

Figure 1:
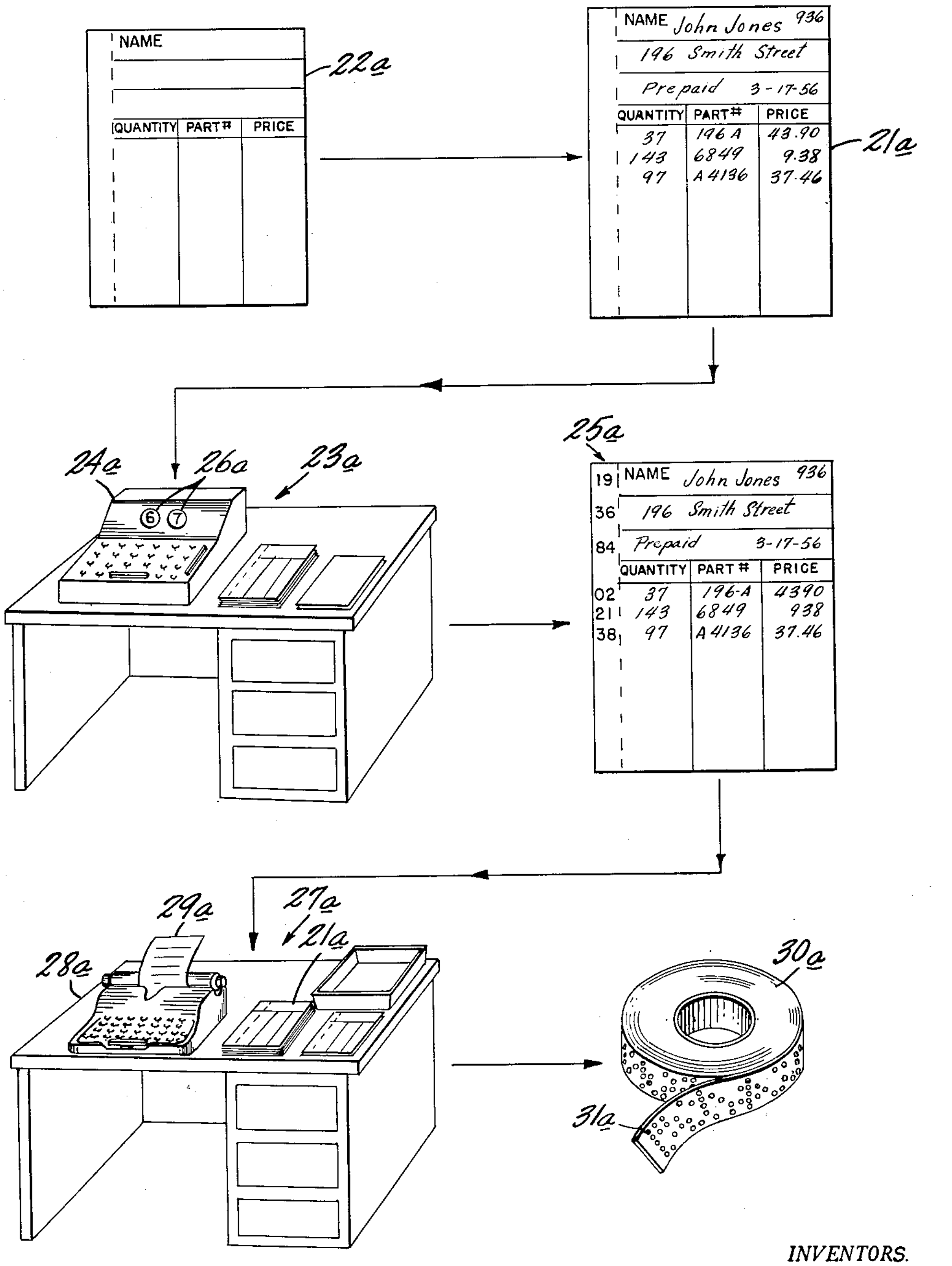
FIG. 1 is a schematic flow diagram of a typical billing operation carried out in accordance with the system of the invention.

In a typical record processing operation carried out in accordance with the invention as illustrated in FIG. 1, a source record such as an invoice 21a comprising handwritten transaction information entered on a preprinted form 22a is routed to a precoding station 23a where the information is entered into a precoder 24a by an operator manipulating a conventional typewriter keyboard. The arrangement and operation of the precoder will be described in detail hereinafter. At the end of each line or message of information, the operator records at a designated position on the invoice 22a, for example, in the left-hand margin 25a, a check code total which has been accumulated by the precoder 24a and is displayed by a numerical indicator 26a associated therewith.

Essentially, the purpose of the precoder is to obtain a check code total which is a function of the correct message characters and their proper arrangement and is substantially unique for any given message, thus assuring that any subsequent reproduction of the message is correct if it produces an identical check code total. In order to detect transpositions of information characters, which are among the most frequent errors in the copying of information and often passed undetected during sight verification, along with additions, omissions and substitutions of characters, a check code system may be arranged according to the invention by assigning, for example, two digits to each of the character keys on a typewriter keyboard. As illustrated in FIG. 2, the digits for each character may be arranged in either of two orders by transposition, resulting in two check code number assignments which will be distinguished hereinafter by referring to the assignment having the lower digit in the tens position as the "even" assignment and the one having the higher digit in the tens position as the "odd" assignment. In the illustrated embodiment of the invention, the odd and even code assignments are utilized alternately as the message progresses, the code numbers for the first, third, fifth, etc. characters being entered into the counters in the even assignment and those corresponding to the second, fourth, sixth, etc. characters having the odd assignment.

It will be observed that in order to avoid duplication the digits assigned to each key should be unlike and that a two digit system must be limited to 45 characters. Other codes arranged according to the invention utilizing three or more digits for each key can readily be visualized however, wherein in various permutations of the digits will produce six or more assignments for each key and well over a hundred keys or characters may be utilized.

Accumulation of the check code numbers in each message by the precoder 24a results in a check code total which is substantially unique for each arrangement of the information characters in the message so that any transposition, substitution, addition or omission of characters results in a different check code total. As an example, the word GRAY is shown in FIG. 3a to have a check code total of 63 obtained by adding the check code numbers from the table of FIG. 2 when the first and third letters have odd assignments and the second and fourth have even assignments. If the two middle letters are transposed, the word GARY is formed producing a check code total of 90, as illustrated in FIG. 3b, while a substitution of M for Y to spell GRAM accumulates a check code total of 85, as shown in FIG. 3c.

In order to simplify the coding system, the pairs of digits comprising the check code numbers in a message may be added in both the units and tens positions without carrying, thus accumulating a check code total having only two digits regardless of the message length. This arrangement, which is utilized in the apparatus described below, does not substantially decrease the accuracy of the verifying system.

After the invoice information has been precoded in the above manner and the check code totals have been entered on the source document, the work is passed on to an encoding station 27a where an operator again copies the information from the source document into an encoder 28a having a similar keyboard to produce a typewritten copy 29a, the precoder total in column 25a also being entered into the encoder. At the same time, the encoder accumulates the check code total for each line in the same manner as did the precoder and compares the two check code totals. Agreement of the totals at the end of each line indicates that the information has been entered correctly and automatically verifies the typewritten copy, permitting the operator to proceed to the next line or the next invoice. If, however, there is a disagreement, an error signal is actuated and the operator is prevented from entering further information, for example, by automatic locking of the keyboard until the error is found. When this occurs, the encoder operator visually compares the typewritten copy 29a with the original document 21a to determine whether the error was made in the encoding operation or in the precoding operation. If the typewritten document is correct, indicating that the check code total arrived at in the precoding operation was in error, the encoder operator supersedes the error indication, releasing the keyboard, and goes on to the next line. An error occurring in the encoding operation, however, requires the operator to delete the incorrect line before the keyboard can be used again. It will be noted that the novel system of the present invention requires visual comparison of the typewritten copy with the original record only in the infrequent cases when the check code totals do not agree and the usual proofreading of each record is eliminated, thus substantially reducing eyestrain and increasing operator efficiency.

Meanwhile, a coded record containing information messages identical to the typewritten copy and adapted to actuate automatic equipment such, for example, as a perforated paper tape 30a is simultaneously produced by the encoder 28a in response to the manipulation of its keyboard. Inasmuch as each typing operation, including elimination of errors, is transmitted to the tape punching mechanism, the roll of tape 30a is automatically prepared and simultaneously verified during the typing of the documents 29a, any copying error having already been eliminated by the encoder operator.

Although the invention is described herein with reference to the preparation of a verified record on paper tape, it will be understood that the verifying system may be utilized in preparing coded records on any medium such as punched cards, for example, and, in addition, is useful in preparing verified typewritten copy or the like without proofreading in the manner described above.

When coded paper tape is prepared in accordance with the invention, a punch code such as the one described in United States application Serial No. 556,643, filed December 30, 1955 (Docket 5002) may be utilized wherein each alpha-numerical character is represented by a transverse column 31a of perforations arranged in one or more of five longitudinal channels, as best seen in FIG. 4. In order to register the tape properly and advance it column by column through the punching and reading mechanisms, a row of tape feed perforations 32*a* is positioned between adjacent channels, edge notches 33*a* being utilized to distinguish the beginning of each information message during the error deletion operation described below. Adjacent message units on the tape are also separated by certain operational punch codes of the type described in copending United States application Serial No. 553,001, filed December 14, 1955 (Docket 5075) which control the function of tape handling equipment by indicating an "in record" condition at the start of each message and an "out of record" condition at the end of each message.

Inasmuch as the number of punch codes available in a five channel tape system of this type is insufficient to represent all of the letters and numerals, it is customary to assign codes which are identical to certain of the letters codes to the numerals 0 to 9 and precede each numeral or group of numerals in a message with a figures shift code (FIGS), a letters shift code (LTRS) being inserted before each letter or a group of letters. Accordingly, the precoder and encoder keyboards include a FIGS-LTRS shift key and a check code number is assigned to each shift operation.

*Precoder*

Each depression of a character key in the keyboard of the precoder 24*a* closes two contacts in a keyboard control A, shown in FIG. 5, corresponding to the two check code digits assigned to the character, completing circuits through a cable *a*, a flip unit B and two lines *c* and *d* to energize a units counter C and a tens counter D, respectively. Within the flip unit B, each conductor in the cable *a* is arranged to be connected alternately to conductors in the cables *c* and *d* by series relay contacts which are transferred from one of two conditions to the other after every operation of the precoder keyboard. In one condition, the first digit of the even assignment of the check code number is sent to the tens counter and the second is sent to the units counter. This will be called the "even" condition of the flip unit, the other or "odd" condition causing the first digit to be applied to the units counter and the second to the tens counter. Each of the counters C and D then passes a number representing the digit received added to the total present in the counter to the corresponding units transfer network E or tens transfer network F through two cables *e* and *f*, respectively.

After the new totals have been registered in the transfer networks, a timing unit H is signalled through two lines *q* and *r* and this, in turn, causes the counters to be reset through a line *p*. As soon as the counters are deactivated, as detected by the timing unit H through two cables *p* and *n*, and after the character key has been released as sensed through a cable *s*, the transfer networks transmit the new totals into the counters through two cables *g* and *h* on signal received from the timing unit through the cable *q* and the transfer networks E and F are deenergized. Meanwhile, circuits completed within the timing unit and the cable *t* change the relay contacts in the flip unit B to the opposite condition in readiness for receipt of the next check code number from the keyboard control A. As the precoder progresses through the message in this manner, the counters C and D accumulate the check code total and actuate appropraite elements such as electronic indicators, for example, in a display unit G through two cables *j* and *k* on signal received from the keyboard control through a cable *m*. Other circuits in the cable *m* are utilized to prevent information from being entered into the precoder until the operation of the counters and transfer networks is completed.

In the following detailed description of the various elements of the precoder, it is to be understood that each of the connecting cables indicated by a reference letter in FIGS. 6–9 corresponds to the line in FIG. 5, represented by the same reference letter and that, in cases where a cable contains more than one conductor, the several conductors are distinguished at either end by a reference number adjacent the end of the cable. Further, most of the relays are comprised of a pick coil (P) which actuates the relay, a hold coil (H) capable of retaining the relay in the actuated conditions after the pick coil is deenergized, and a series of movable contacts and fixed points associated therewith. In addition, apparatus assembled according to the invention may include appropriate spark-suppressing resistor-capacitor combinations (not shown) wired in the usual manner in parallel with those relay coils which are actuated through series contacts, in order to prevent burning or pitting of the contacts. Power is supplied to the apparatus from a direct current 48 volt source, the positive side being connected to the various +48 terminals, indicated in the drawings, and the negative side being grounded. Also, in circuits wherein the current is intended to flow in one direction only, the diode rectifiers illustrated in the drawings are adapted to prevent the flow of current in the wrong direction.

*Precoder Keyboard Control*

In order to accumulate a check code total for each document in the precoder 24*a* in FIG. 1 according to the invention, the operator manipulates the precoder keyboard (not shown) in the manner described above, positioning the FIGS-LTRS shift key shown in FIG. 6 according to the class of characters being entered. This causes two selected code contacts 35*a* to be closed as each key is depressed according to the check code number assigned to the key. It will be noted that these contacts are represented by the symbols 1U, 2T, . . . 0U, 6T each corresponding to a digit in the units or tens position in the code check number, but inasmuch as alternate code numbers are transposed by the flip unit B as described above, the units and tens orientation of the digits, as represented by the contacts 35*a*, correspond to the orientation of the number entered in a units and tens counters C and D only when the even assignment of the code number is used, that is, when the flip unit is in the even condition. During each key depression, a keyboard common contact shown in FIG. 6 is also closed, the keyboard being locked after each key depression to prevent the entry of further information until released by the operation of a keyboard restore magnet after the preceding code number has been registered in the counters.

At the end of each line of information, a motor bar key is actuated by the operator, clearing the counters and resetting the flip unit to the even condition and causing the check code total to be shown in the display unit G if a display switch, also shown in FIG. 6, is in the closed position. If, however, the display switch is kept open during the precoding operation, the cumulative total of the check code numbers will be displayed after each addition, thus giving the operator a visual indication that the key depression has been registered in the counters. If desired, a check code number may be assigned to the tab key to be accumulated in the same manner on each tab key operation and in the illustrated embodiment this feature is made optional by including a tab control switch in series with a tab key.

Tracing the circuit illustrated in FIG. 6 from the positive voltage terminal, it will be observed that the pick coil of a first letters relay 70 is energized as soon as power is applied if the FIGS-LTRS shift key is in the LTRS position as shown, the circuit being completed through the normally closed point of a second LTRS relay contact 72–1, a normally closed FIGS contact 66–5, and through the relay 70 pick coil to ground, transferring all the contacts associated with that relay. Closing of the 70–5 contact in this manner actuates the pick coil of the second LTRS relay 72, transferring the contact 72–1, thus energizing the hold coil through the normally open point of that contact and retaining it until the FIGS-LTRS key is shifted or until the power supply is turned off. Meanwhile, the opening of the normally closed point of the 72–1 contact deenergizes the pick coil of the relay 70 but the hold coil retains it in the actuated position through the normally open contact 70–1 and the normally closed keyboard restore contact until the keyboard is unlocked by the restore magnet.

In a similar manner, a first FIGS relay 66 is actuated when the FIGS-LTRS shift key is shifted to close the FIGS contact by completion of a circuit through the 69–1 normally closed contact of a second FIGS relay 69, the normally closed 70–6 contact, and the relay 66 pick coil to ground, the hold coil being energized through the 66–1 contact and the normally closed keyboard restore contact. When the normally opened 66–6 contact transfers it completes a circuit through the FIGS contact of the FIGS-LTRS key, now closed, to energize the pick coil of the relay 69, the normally open point of the 69–1 contact being utilized to hold the relay in the actuated position until the FIGS-LTRS shift key is shifted again or until the power supply is turned off.

As previously mentioned, FIGS shift and LTRS shift operations are assigned check code numbers which are accumulated in the counters along with the character code numbers in obtaining a check code total. In the embodiment herein described the LTRS shift operation has an even assignment code number of 46, as shown in FIG. 2, and this is transmitted to the flip unit B through the number 8 and number 11 conductors in the *a* cable when the normally open contacts 70–3 and 70–4 close each time the first LTRS relay 70 is actuated, thus corresponding to depression of the 4T and 6U contacts. Power is supplied to these contacts through the *s*–3 conductor, a normally closed timing relay contact 61–2 shown in the timing unit in FIG. 7, the *s*–2 conductor, two normally closed motor bar relay contacts 91–3 and 82–2 in FIG. 6, the *s*–7 conductor, another normally closed timing relay contact 62–2 in FIG. 7, the normally open, now closed, contact 70–2 and the keyboard restore contact in FIG. 6. This circuit assures that the code number is not transmitted to the counters when an adding or transfer operation is in progress, or when the motor bar key is depressed as at the end of a message. Likewise, the FIGS code number 45 is applied to the *a*–8 and *a*–9 conductors through the contacts 66–3 and 66–4 when the FIGS relay 66 is actuated, the circuit described above being completed in this case by the transfer of the 66–2 contact.

If the code check number 47, as represented in FIG. 2, is utilized for the tab key operation, by closing the tab control switch shown in FIG. 6, each tab key depression energizes the pick coil of a first tab relay 80 through the normally closed contact 81–1 of a second tab relay 81. Transfer of the 80–1 contact energizes the relay 80 hold coil and retains that relay in the actuated position through the contact 80–1 and the normally closed keyboard restore contact until the keyboard is restored, the second tab relay 81 being energized through the 80–5 contact and held through the normally opened 81–1 contact only as long as the tab key remains depressed. Closing of the contacts 80–4 and 80–3 completes circuits to the *a*–8 and *a*–13 conductors, corresponding to a depression of the 4T and 7U contacts in the manner described above, the 80–2 contact performing the same function as the 66–2 and 70–2 contacts in the case of the FIGS and LTRS codes.

If it is desired to display the accumulated total of check code numbers at all times during the operation of the precoder, the display switch is placed in the open position as shown in FIG. 6, leaving a display relay contact 35–3 in the normally closed position, thus completing a circuit from the display unit G through the *m*–3 conductor to ground permitting the display unit indicator tubes to show each total as it is accumulated. In this condition, depression of the motor bar key energizes the pick coil of a second motor bar relay 91 through the normally closed contact 35–2, the hold coil retaining the relay in the actuated position through the contact 91–1, the *m*–2 conductor and any of a group of parallel counter contacts 4–2, 8–2, 12–2, and 17–2, shown in FIG. 8, and similar tens counter contacts (not shown), until the counters C and D have been reset as described below, or through the *a*–21 conductor and a flip relay contact 86–2 shown in FIG. 9. If, however, the check code total is to be displayed only at the end of each message the display switch is closed, energizing the display relay 35 and opening the normally closed contact 35–3. With the 35–2 contact transferred, operation of the motor bar key at the end of each message actuates a first motor bar relay 82 to ground the *m*–3 conductor through the normally open 82–3 contact, thus displaying the total on the indicators, the relay 82 being held through the contacts 82–1, 91–2, and 35–1.

*Timing Unit*

Whenever a code number is applied to the cable *a* by a key depression or a FIGS-LTRS shift in the manner described above, a circuit to be discussed in detail hereinafter is completed through the flip unit B, the cables *c* and *d*, the counters C and D, and the cables *e* and *f* to actuate at least one relay in each of the units and tens transfer networks E and F. For convenience and simplicity of description only the units transfer network E is illustrated in detail in FIG. 7, the tens transfer network F being identical in all respects. As soon as any of a group of relays 23, 24, 26, and 27 within the units transfer network or one of a corresponding group in the tens transfer network is energized, a timing circuit is completed by one of the normally open contacts 23–2, 24–2, 26–2, and 27–2 and one of the corresponding contacts in the tens transfer network which are connected in series-parallel through the conductors *q*–5, *r*, and *q*–1. Power is supplied from the normally closed keyboard restore contact in FIG. 6 through one of the parallel 66–2, 70–2, 80–2, and keyboard common contacts, the conductor *s*–5, the contact 62–2 in FIG. 7, the *s*–7 conductor, normally closed contacts 82–2 and 91–3 in FIG. 6, the conductors *s*–2 and *q*–5 in FIG. 7, the above-mentioned transfer network circuits to energize a timing relay 61 and an interlock relay 90 in the timing unit, which remain energized as long as transfer relays are actuated in both networks. It is to be noted here that the interlock relay 90 is a latch-type relay which is mechanically retained in the actuated position after the latch pick coil (LP) has been energized until the latch trip coil (LT) is energized and released.

Current from the conductor *q*–1 also passes through the diode 90*a* and the conductor *s*–6 to energize the keyboard restore magnet in FIG. 6, the positive terminal in FIG. 7 supplying power through the 90–1 contact after the relay 90 transfers. Inasmuch as certain circuits described hereinafter must be completed after the relay 90 transfers but before the normally closed keyboard restore contact opens, the keyboard restore magnet is of a type which is slow to actuate, having at least twice as long a delay as the other relay coils. As described above, circuits to the hold coils of the FIGS relay 66, the LTRS relay 70 and the tab relay 80 are completed through the normally closed point of the keyboard restore contact and when this contact is transferred by actuation of the keyboard restore magnet any of these relays which have been actuated are released. In order to insure that this has taken place before the magnet is deenergized, the normally open keyboard restore contact completes a circuit through the normally closed contacts 80–6, 70–7 and 66–7 to actuate the latch trip coil of the relay 90 through the *s*–1 conductor.

Control of the adding and transfer operations is maintained by the timing unit H and each must be completed before the next operation can begin. Accordingly, energization of the relay 61 transfers the normally closed 61–2 contact to break the circuit described above for applying signals to the *a* cable. As soon as the new total has been transmitted to either of the transfer networks from its counter, the counter storage circuits are cleared by releasing all the relays within the counter. Inasmuch as both the units and tens counters are identical in all respects only the units counter C is illustrated in detail in FIG. 8, where it will be noted that two groups of four relays each, numbered 1, 5, 9, and 14, and 4, 8, 12, and 17 have their corresponding coils connected in parallel, the hold coils being energized through four contacts 4–1, 8–1, 12–1 and 17–1, the conductor *g*–5, four normally closed series-connected contacts 23–5, 24–5, 26–5, and 27–5 when the transfer network in FIG. 7 is not activated, the conductor *m*–1 and through the contact 91–2 and the normally closed motor bar contact in FIG. 6. Thus, the relays in both counters are restored as soon as any of the contacts 23–5, 24–5, 26–5, and 27–5, and one of the corresponding contacts in tens transfer network F are opened.

With the counters thus inactivated, the precoder is prepared for the next step in accumulating a check code total and a circuit is available to energize a second timing relay 62 through the normally closed keyboard restore contact which is still closed because of the slow operation of the magnet, one of the parallel-connected keyboard common, 80–2, 70–2, and 66–2 contacts, the *s*–5 and *p*–1 conductors connected together as shown in FIG. 7, four series-connected normally closed units counter contacts 4–3, 8–3, 12–3, and 17–3, the conductor *n* and four similar series-connected contacts in the tens counter (not shown) leading to the *d*–11 conductor shown in FIG. 9, through two flip unit contacts 83–2 normally open and 89–2 normally open or through 83–2 normally closed, depending on whether the flip unit is in the even or the odd condition, the *t*–1 conductor and contact 61–1 normally open, now closed in FIG. 7. During the first keyboard depression after an end of message motor bar key actuation with the display switch closed, the above-described circuit through the *p*–1 conductor also carries power through the contact 62–2 in FIG. 7 and the *s*–7 conductor to energize the second motor bar relay 91 through the 32–2 normally open contact, the hold coil being energized through the 91–1 contact and the *m*–2 conductor only as long as the counter relays are actuated as described above. This breaks the hold circuit to the relay 82 by opening the 91–2 contact and the resulting transfer of the 82–3 contact shuts off the display unit indicators, the counter relays also being restored by opening of the 91–2 contact.

Returning to the operation of the second timing relay, it will be observed that the first timing relay 61 is restored by the opening of the 62–2 contact through which it was energized and that the transfer of the 62–1 contact energizes the hold coil of the relay 62 through the conductor *q*–4 and any of a series of parallel-connected normally opened contacts 23–3, 24–3, 26–3, and 27–3 in the units transfer network E and a similar contact (not shown) in the tens network F, the conductor *m*–1, which leads to both transfer networks, and the normally closed 91–2 and motor bar key contacts in FIG. 6. It will be noted that these two contacts also supply power through the *s*–4 conductor to four normally closed timing relay contacts 62–7, 62–8, 62–9 and 62–10 in FIG. 7, and these in turn energize selected units transfer relay hold coils through the conductors *q*–6, *q*–7, *q*–8 and *q*–9, and the contacts 23–1, 24–1, 26–1 and 27–1, identical circuits (not shown) energizing the tens transfer hold coils. Alternatively, each of these coils may be energized through the appropriate *p*–2, *p*–3, *p*–4 and *p*–5 conductors and the corresponding units counter relay contacts 1–1, 5–1, 9–1, and 14–1 in FIG. 8 and similar tens counter circuits from the *m*–1 conductor during the transfer operation described below. Accordingly, with the timing relay 62 energized, all the transfer relays will be restored if the corresponding counter relays have been properly energized through the cables *g* and *h*, transferring the cumulative total back to the counters, and when this occurs, the relay 62 is restored by the opening of all the contacts 23–3, 24–3, 26–3 and 27–3 and the similar contacts in the tens transfer network F.

*Flip Unit*

As described above, the code contacts 35*a* in FIG. 6 associated with each key or shift operation apply signals to the conductors of the *a* cable representing the even assignment of a character code number and the digits of the code numbers corresponding to alternate characters in the message are transposed by the flip unit B and transmitted to the counters C and D. This is accomplished by the flip unit circuit illustrated in FIG. 9 wherein the odd numbered conductors 1, 3, 5, . . . 15, 17, and 19 in the *a* cable carry the units digit information and the even numbered conductors 2, 4, 6, . . . 16, 18, and 20 transmit the tens digit information as received from the keyboard control unit A. Each of the odd-numbered conductors leads to a flip relay 83 contact having its normally closed point connected to a conductor representing the same digit in the *c* cable and its normally open point connected to the corresponding conductor in the *d* cable, while each even numbered *a* cable conductor leads to a flip relay 86 contact having its normally closed point connected to the appropriate digit conductor in the *d* cable and its normally open point leading to the corresponding conductor in the *c* cable. Thus, the flip unit is in the even condition if the relays 83 and 86 are not actuated, the even assignment of the code numbers being applied to the counters, the units digit going through the *c* cable and the tens digit through the *d* cable, while the odd assignment is applied if the relays 83 and 86 are energized.

In order to provide the alternate digit transposition described above, a flip interlock relay 89 controls the actuation of the flip relays 83 and 86. The first signal after a motor bar key operation, which deenergizes the flip relays, passes through the flip unit unaffected and the even assignment of the code number is added into the counters. Actuation of the second timing relay 62 in FIG. 7 during this operation transfers the contact 62–5, applying positive potential through the *t*–2 conductor and the normally closed 89–3 contact to energize the relays 83 and 86 and these are held through the 83–1 and 89–4 contacts, the *a*–22 conductor and the normally closed 91–2 and motor bar key contacts in FIG. 6. This condition is maintained while the next code number is generated, thus applying it in transposed form to the counters. Afterward, however, when the timing relay 61 is energized by actuation of the transfer relays, as described above, and before the second timing relay 62 is energized, a circuit is available from a positive terminal in FIG. 7 through the normally closed 62–5 contact, contact 61–3, the conductor *t*–3 and the contact 86–1 to energize the flip interlock relay 89, which is held through its contact 89–1, the *t*–5 conductor, either of the parallel-connected contacts 61–4 and 62–6, the *t*–4 and *a*–22 conductors and the 91–2 and motor bar key contacts in FIG. 6 until both the contacts 61–4 and 62–6 are opened at the end of the timing relay cycle. The resulting transfer of the contacts 89–3 and 89–4 restores the flip relays 83 and 86 and prevents them from being reenergized when the 62–5 contact closes during that timing unit cycle.

During the next timing relay cycle, after the third code number has been transmitted to the counters in the even assignment, the flip relays are energized as before to transpose the digits of the following code number and the alternate operation of the flip unit continues in this manner until the completion of the message. At the end of each message, depression of the motor bar key in FIG. 6 releases the flip relay hold coils, if energized, by opening the normally closed motor bar key contact, thus inactivating the *a*–22 conductor so that a subsequent message will be started with the flip unit in the even condition.

*Digit Accumulation*

It will be noted in FIG. 9 that the conductor numbers in the *c* and *d* cables correspond to the value of each code digit transmitted by the flip unit to each of the counters, except that the zero signals are carried by the number ten conductors. As shown in the units counter circuit diagram of FIG. 8, each counter is adapted to generate a number representing the total of the digit received from the flip unit and the digit already stored in the counter and transmit it to the transfer network. In the typical embodiment of the invention herein described, each counter circuit is adapted to transmit only the last digit of its total without carrying, thus eliminating any second place digits which occur as a result of the addition.

In order to simplify the counter structure, each digit is stored in binary fashion, an eight being represented by actuation of the relay 1; a four by the relay 5; a two by the relay 9; and a one by the relay 14; each of these relays having a corresponding simultaneously actuated relay 4, 8, 12 and 17, respectively, associated therewith to provide additional contacts. Thus, the digit six, for example, is stored in the counter by actuation of the relays 5 and 9 and their associated relays 8 and 12, and the digit nine is represented by simultaneous energization of the relays 1 and 14 with their associated relays 4 and 17. It will be noted that a zero is stored by the counters by energizing the relays 1, 4, 9 and 12 rather than by complete inactivation of the counter, thus permitting the timing unit to be actuated in the manner described above through the counter relay contacts after each entering and clearing operation regardless of the value of the digits stored in the counters.

Addition of the digits takes place in the circuits set up by the contacts associated with the counter relays and the total is transmitted in binary form to the transfer network in FIG. 7 through the conductors *e*–1, *e*–2, *e*–3 and *e*–4 to energize the appropriate transfer relays 23, 24, 26, and 27 which represent the numbers eight, four, two, and one, respectively, these relays being held as described above through the timing relay contacts 62–7, 62–8, 62–9, and 62–10 or through the counter contacts 1–1, 5–1, 9–1 and 14–1 after the counter has been cleared. For example, if the number five is stored in the units counter by actuation of the relays 5 and 14 and a 7 is transmitted through the *c*–7 conductor from the flip unit, a circuit is completed through the contacts 1–10, normally closed, 5–11 normally open, 9–9 normally closed and 14–10 normally open, to actuate the relay 26 through the *e*–3 line, indicating a two, the tens digit of the total of twelve being dropped. As soon as the transfer relay 26 is energized, the counter is cleared by opening of the normally closed contact 26–5 through which the counter relays 5, 8, 14, and 17 were held from the line *m*–1 through the *g*–5 conductor and the contacts 8–1 and 17–1.

When all the counter relays have been restored, the circuit described above for actuation of the second timing relay 62 is available through the contacts 4–3, 8–3, 12–3 and 17–3 and similar contacts in the tens counter, and after the relay 62 is energized the new total held by the transfer relay 26 is applied to the units counter through the motor bar key, contact 91–2, the *s*–4 conductor, contact 62–3, the conductor *q*–3, contact 26–4 and the *g*–3 line, energizing the relays 9 and 12 to store a two in the units counter. These relays are held through the contact 12–1 and the *g*–5 and *q*–2 conductors in FIG. 7, the contact 62–4, the *s*–4 conductor, and the normally closed 91–2 and motor bar key contacts in FIG. 6 until the transfer relay 26 is restored, after which the hold circuit is completed through the contacts 23–5, 24–5, 26–5, and 27–5 and the *m*–1 conductor to the 91–2 contact until the next transfer operation, the contact 62–4 being opened by deenergization of the timing relay 62. At the end of each message, depression of the motor bar key releases any counter or transfer relays held through the *m*–1 and *s*–4 lines and clears the precoder in preparation for the next precoding operation.

Meanwhile, however, another group of counter contacts associated with the relays 4, 8, 12, and 17, converts the digit stored in each counter in binary form back into a decimal digit for actuation of an indicator in the display unit. Thus, if a five is stored in the counter by actuation of the relays 8 and 17 in FIG. 8, power is available from the positive terminal through the contacts 4–4 normally closed, 8–4 normally open, 17–8 normally open and 12–7 normally closed to energize the *j*–5 line, the conductor numbers in the *j* cable corresponding to the display unit indicator numbers actuated thereby.

*Precoder Operation*

The understanding of the invention will be further facilitated by following the sequence charts shown in FIGS. 10*a*–10*d*, wherein the activation of the above-described relays and contacts during a typical precoding operation is illustrated on a horizontal time base by the various bars. In each case, it will be noted that the relay activation and deactivation time is indicated by the shaded portions of the bar, the upper bar representing the pick coil operation and the lower bar representing the hold coil energization. In the case of the interlock relay 90, mechanical retention of the relay in the actuated position by the latch is indicated by the dotted bar, while the upper keyboard restore bar represents magnet actuation time and closing of the normally opened contact, and the lower bar shows the opening of the normally closed keyboard restore contact. Also, in the case of the tens counter D and tens transfer network F, the relays not illustrated in detail in the drawings are represented by the corresponding units relay number preceded by a T.

Figure 10A:
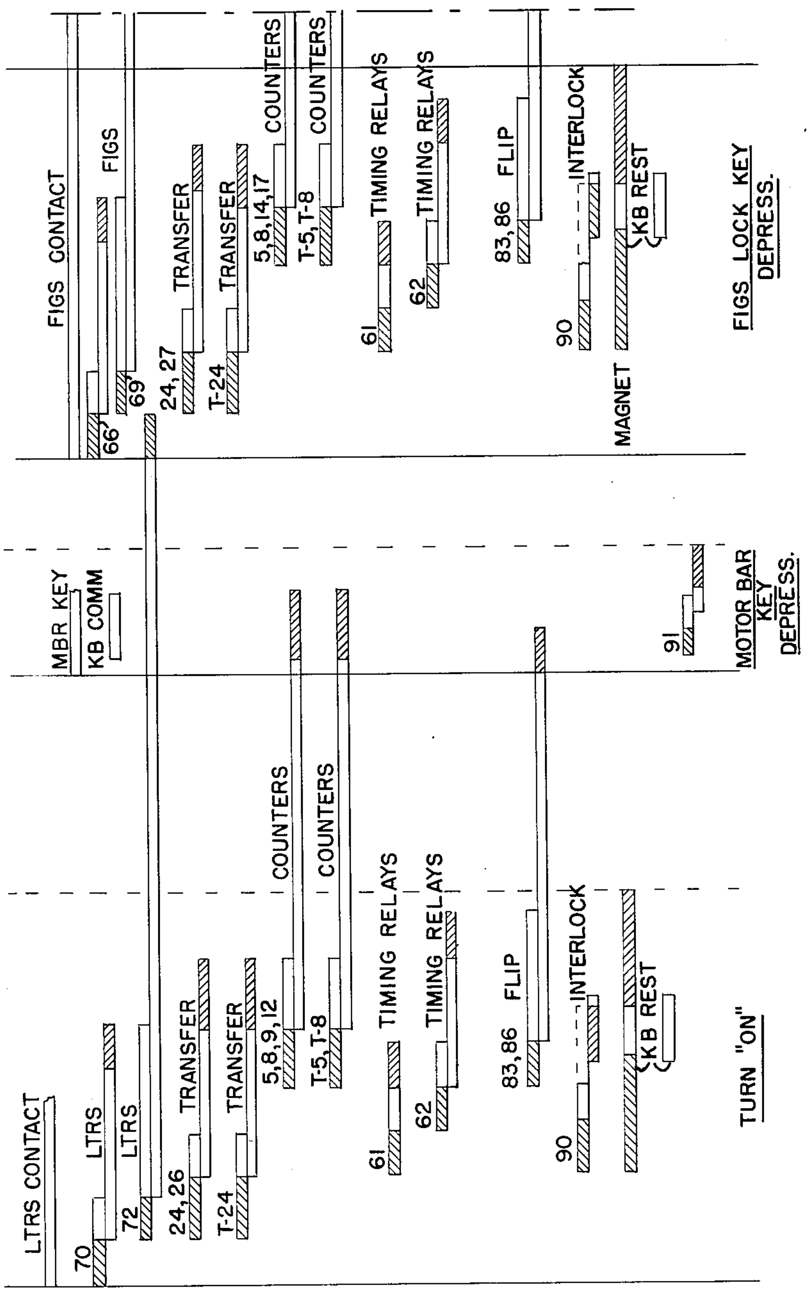

Following the chart in FIG. 10*a*, if the FIGS–LTRS shift key is in the letters position when the precoder is turned on, the LTRS code 46 will be sent through the inactive flip unit and counters to energize the relays 24 and 26 in the units transfer network and T–24 in the tens transfer network. This total is carried into the counters during the timing relay cycle, actuating the relays 5, 8, 9 and 12 in the units counter and T–5, and T–8 in the tens counter, the flip relays 83 and 86 being simultaneously energized. Depression of the motor bar key then clears the counters and resets the flip unit in readiness for the precoding operation.

Figure 10B:
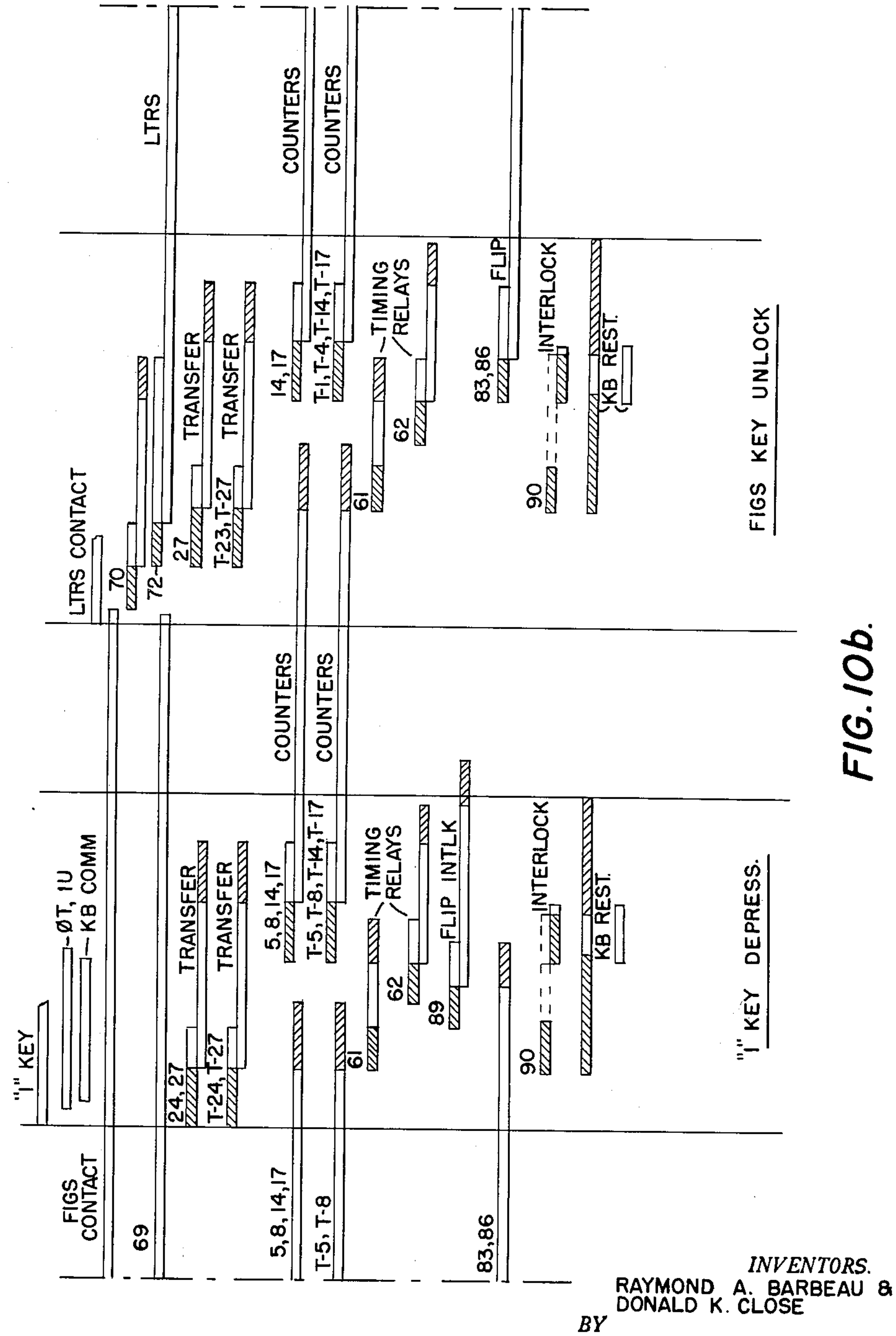

As an example of the operation, the numeral one and the letter A will be entered and the tab key depressed to accumulate a check code total of 59. Shifting the FIGS–LTRS key to the figures position releases the relay 72 and energizes the FIGS relays 66 and 69 to actuate the transfer relays 24, 27 and T–24, representing the check code number 45. Operation of the timing relays carries this number into the counters by picking the relays 5, 8, 14, 17, T–5 and T–8 and energizes the relays 83 and 86 to change the flip unit to the odd condition, the keyboard being inactivated by the keyboard restore magnet until this operation has been completed. With the FIGS contact and the relays 69, 5, 8, 14, 17, T–5, and T–8 activated, the "1" key on the keyboard is depressed, as shown in FIG. 10*b*, closing the 0T and 1U code contacts and the keyboard common contact. These digits, transposed by the flip unit, are added to the numbers stored in the counter to actuate transfer relays 24, 27, T–24, and T–27, representing a check code total of 55. This number is then transferred to the counters as before and carried into the next operation by the relays 5, 8, 14, 17, T–5, T–8, T–14, and T–17, the flip interlock relay 89 preventing reactivation of the flip relays during this cycle. Shifting back to the LTRS contact releases the relay 69 and actuates the LTRS relays 70 and 72, adding the even assignment of the LTRS code number, 46, to the 55 present in the counters, thus energizing the transfer relays 27, T–23 and T–27 to indicate a check code accumulation of 91. Transfer of this number to the counters actuates the relays 14, 17, T–1, T–4, T–14, and T–17 which are held over to the next operation along with the flip relays 83 and 86.

Figure 10C:
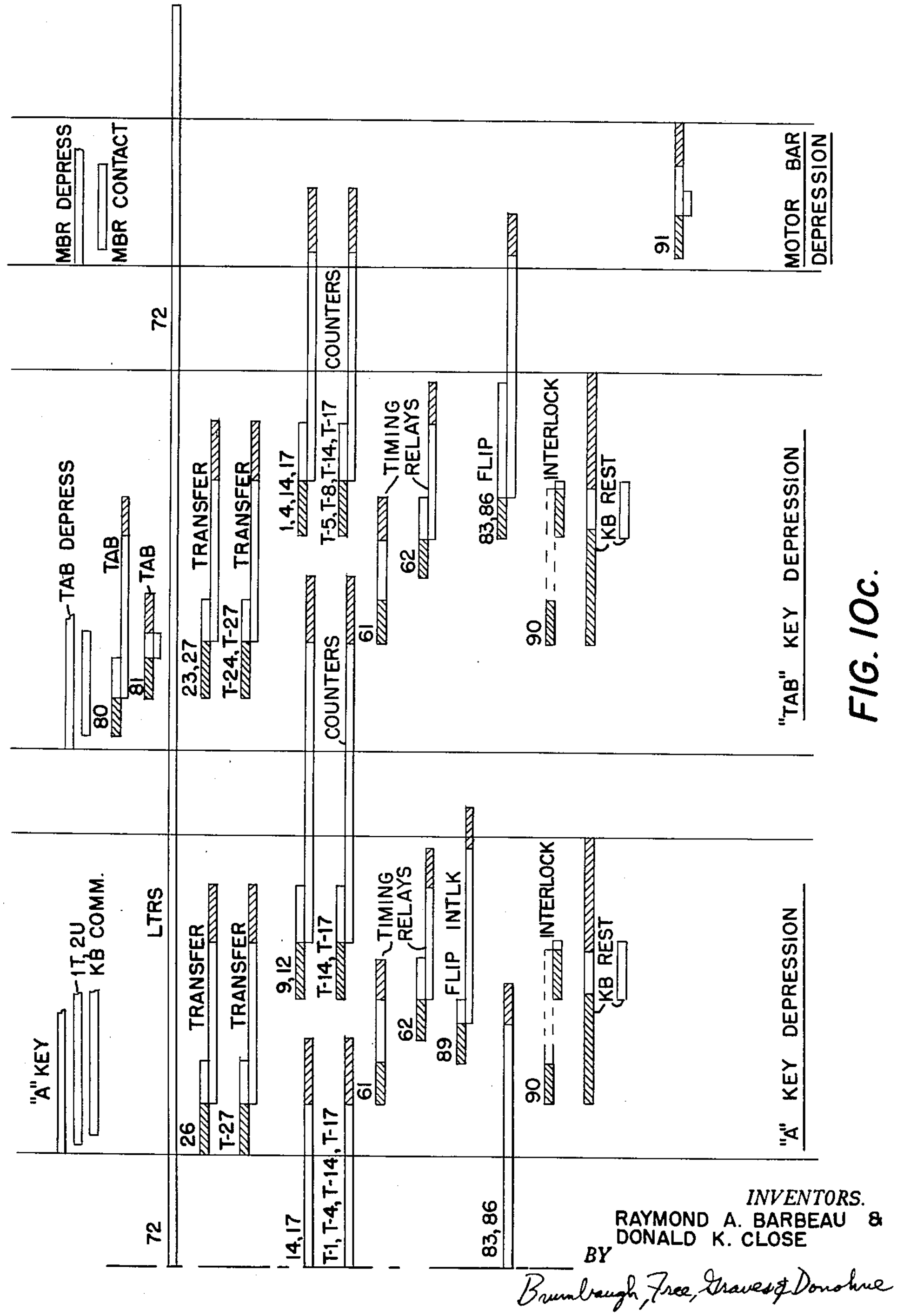

In FIG. 10*c*, depression of the "A" key closes the code contacts 1T and 2U and the keyboard common contact to add 21 to the counter total, the digits being transposed by the flip unit. This energizes the transfer relays 26 and T–27 and the counter relays 9, 12, T–14 and T–17 in the proper sequence to indicate a total of 12 which is stored until the next code number is added. When the tab contact closes in the next phase of the precoding operation, the tab relays 80 and 81 transmit the even assignment of the tab code 47 through the counters to apply a new total of 59 to the transfer networks as shown by activation of the relays 23, 27, T–24, and T–27. This total is transferred to the relays 1, 4, 14, 17, T–5, T–8, T–14, and T–17 in the counters and is shown as the check code total in the display unit, depression of the motor bar key thereafter clearing the counters and restoring the flip unit to the even condition.

Figure 10D:
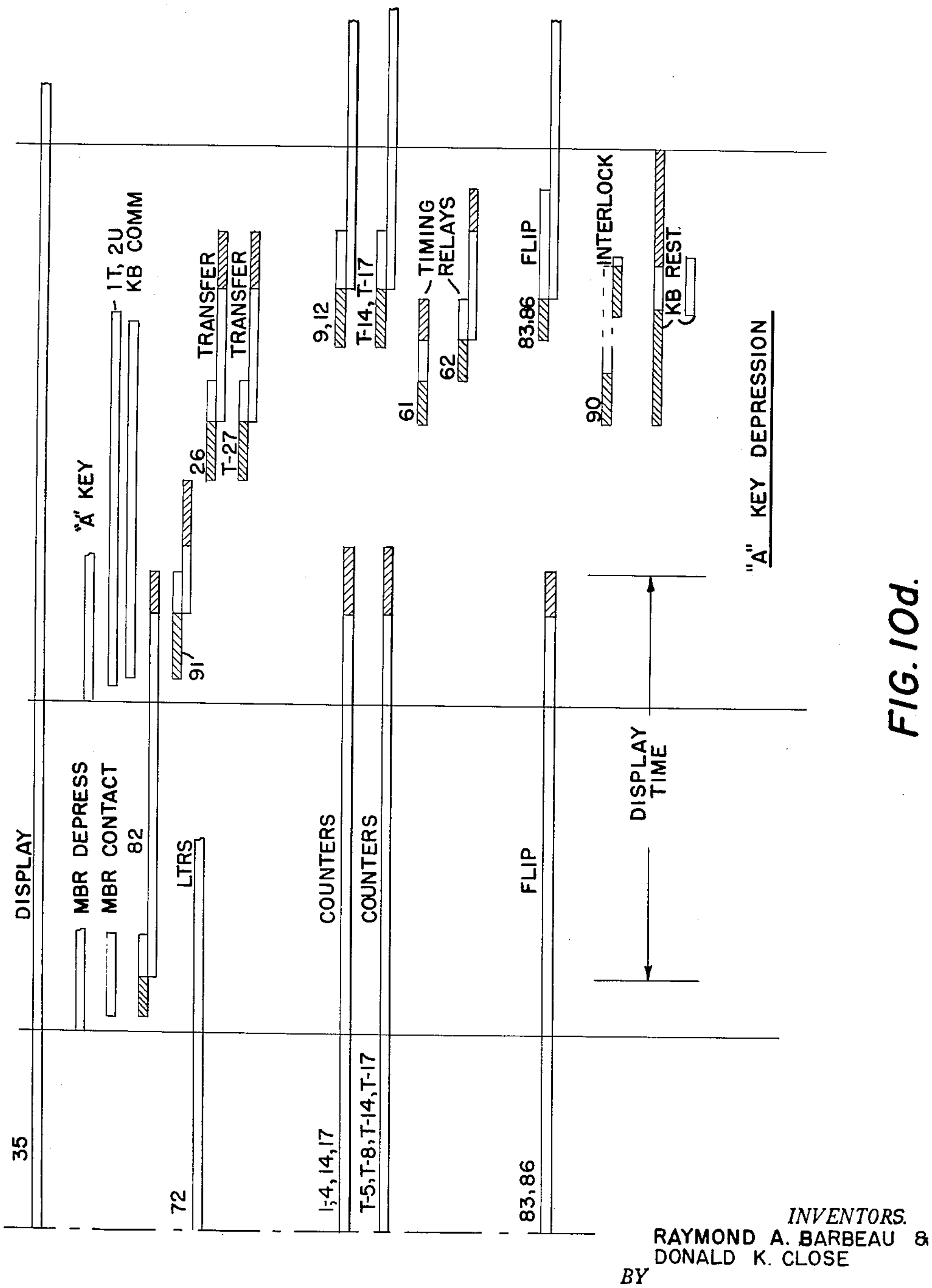

In the preceding operation, it was assumed that the display switch was open throughout, thus showing the cumulative digit total in the display unit after each adding operation. If, however, the display switch is closed, the relay 35 will be actuated, as shown in FIG. 10*d*, wherein the other relays are in the same condition as at the end of the tab key depression shown in FIG. 10*c*. In this case, the total is not displayed until the motor bar key is depressed at the end of the message, actuating the relay 82. As previously described, this holds the counter relays and displays the check code total until the power is turned off or until the first code number is generated at the beginning of the next message, for example, by depression of the "A" key. This energizes the second motor bar relay 91, releasing the relay 82, the counter relays, and the flip relays before the "A" code number is applied to the transfer relays.

After each document or group of documents has been precoded message by message on the precoder in the manner described above, the group of documents is transferred to an encoding position where the same information is entered into the encoder as described below.

*Encoder*

As previously mentioned, the encoder 28*a*, shown in FIG. 1, accumulates a check code total in the same manner as the precoder while a typewritten copy of the original document is being prepared, and also produces a verified punched tape record of the same information at the same time. Referring to the block diagram of the encoder in FIG. 11, check code numbers generated in a keyboard unit A′ are transmitted through a cable *b′* to a flip unit B′ where the code digits are alternately transposed and applied to a units counter C′ and a tens counter D′ through two cables *g′* and *h′*. After these digits have been added to the numbers stored in the counters, the totals are passed on to units and tens transfer networks E′ and F′ which then transfer the new totals back to the counters C′ and D′, respectively, on signal from the flip unit B′ through two cables *j′* and *k′*, the flip unit including timing relays similar to those in the precoder which are arranged to control the adding and transfer operations.

At the end of each message, the check code total accumulated in the encoder counters is compared with the precoder total which is copied from the source document into the encoder keyboard unit by either of two methods. Using the first method, a method switch in a step control H′ is kept in the open position and the encoder operator copies the precoder total into the encoder before typing each message by depressing the appropriate numerical keys in the keyboard. In this case, each digit of the precoder total is subtracted from one and the difference is entered into each counter through two cables *a′* and *e′* when the numeric keys are operated, thus causing the counters to indicate an eleven after all the message characters have been entered into the encoder if the two totals are in agreement.

In the second method of encoder operation, the method switch is closed and the message is first typed into the encoder to accumulate a check code total and the precoder total is then entered through a separate numeric keyboard associated with the keyboard unit A′ to add the eleven complement of the precoder total into the counters, resulting in an eleven in the counters if the two totals agree.

At the end of each message, a carriage return key is closed in the keyboard unit A′ causing a message control K′ to test the counters through a series of cables *a′*, *f′*, *r′*, *p′* and *m′* and if an eleven is indicated, the message control signals the keyboard unit A′ through a cable *f″*, permitting the next message to be applied to the keyboard. Meanwhile, a punch unit N′, such as the one described in detail in United States Patent No. 2,540,027 adapted for automatic error deletion in the manner described in United States application Serial No. 555,531, filed December 27, 1955 (Docket 5077), prepares perforated tape in the manner previously described under the supervision of a punch control M′ according to predetermined punch code signals received from the keyboard unit A′ through a series of cables *a′*, *f′*, *y′* and *y″*. These signals are generated by a second set of contacts associated with each of the character keys in the keyboard unit in the manner described in detail in United States application Serial No. 556,629, filed December 30, 1955 (Docket 5072). As described above, each character is represented in the punch code by a column of perforations in the tape and the signals generated by the second set of contacts energize appropriate punch magnets in a punch unit N′ to perforate the tape during the next punch cycle according to the punch code corresponding to the character entered into the encoder.

In a similar manner operation of a figures-letter shift key in the keyboard unit A′ signals the punch unit N′ through cables *g″*, *r′*, *y′* and *y″* to punch the appropriate FIGS or LTRS punch code into the tape. It will be understood that these codes are utilized as previously described to represent case shifts only between the beginning and the end of a message unit, that is, when the tape is in record, and they may represent entirely different functions in the out of record condition. For example, according to the punch code system described above, the figures code comprising perforations in the first, second, fourth and fifth channels, represents the beginning of a message when it occurs out of record, while the letters punch code comprising perforations in all five channels is a tape feed signal out of record, being identical with the pattern resulting from deletion of an incorrect message by overpunching. This signal causes a tape being read to be advanced one column without actuating any other operation of the equipment reading it. Also, at the end of each message, when the carriage return key in the keyboard unit A′ is closed, signals from the end of message unit L′ automatically cause a series of codes comprising an end of message code to be inserted in the tape, through the cables *r′*, *y′*, and *y″* followed by a message-separating edge notch and a beginning of message FIGS code, if the message has been correctly copied. In the embodiment herein described, the end of message code comprises a carriage return code (CR) having a single perforation in the fourth channel, the FIGS code, and a line feed signal (LF), represented by a single perforation in the second channel, occurring in sequence.

In order to provide an accuracy check for subsequent reproductions of the message recorded on the perforated tape, a punch counter Q′ accumulates a number representing the total of perforations entered in the tape during each message as detected through a cable *x″* from a counter control R′ and the punch code corresponding to this number, known as the checkable tape code, is punched into the tape through the cables w″ and w′ after the end of message code but before the message separating edge notch.

As previously mentioned, the tape is perforated and advanced through the punch unit N′ illustrated in FIG. 19, column by column, and in order to synchronize the tape punching operation with other functions of the encoder during each punching cycle, a series of circuit breakers P′ is associated with punch unit. These are mechanically linked to the tape punching and advancing mechanism within the tape punch and control the completion of certain circuits in the various units of the encoder through a cable v′. The circuit breakers designated CB–2 through CB–6 apply 48 volts through the conductors v′–2 through v′–6, respectively, when they close according to the cycles illustrated in the chart of FIG. 20, while the circuit breaker CB–1 connects the v′–1 cable to ground during the time between 285° and 20° of the CB–1 cycle shown in FIG. 20, the punching operation taking place in the interval between 55° and 210° and the tape advance occurring between 260° and 350°.

*Encoder Keyboard Unit*

Inasmuch as the check code accumulating circuits of the encoder are identical in most respects with those of the precoder, only the additional portions required by the encoder are illustrated in detail in the encoder circuit diagrams, reference being made to the precoder illustrations for networks not shown.

Within the keyboard unit A′, a typewriter keyboard operating a series of contacts such as the series 35a in FIG. 6, to generate the check code numbers illustrated in the table of FIG. 2, is connected to the flip unit and the counters through the b′ cable a typewriter common contact being closed during each key depression. In order to represent the flip operation for all the code digit conductors, a single flip contact 311–5 is illustrated in FIG. 12 and only the conductors b′–12 and b′–13 are shown, which carry the code number through other conductors (not shown) in the flip unit B′ and the cables g′ and h′ to adding networks in the counters C′ and D′ identical with those of the precoder counters, it being understood that the b′ cable includes other conductors corresponding to each of the units and tens digits. In this case, however, before the new totals are passed on to the transfer networks E′ and F′, the units total is carried back to the flip unit B′ in binary form by the conductors g′–1, g′–2, g′–3 and g′–4 and the tens counter total appears in binary form at the conductors h′–1, h′–2, h′–3 and h′–4 in FIG. 15. After passing through a group of normally closed contacts of a transfer relay 319, the accumulated check code total is transmitted to the units transfer E′ in FIG. 16 through conductors j′–1, j′–2, j′–3, and j′–4 representing an eight, a four, a two, and a one, respectively, as before, and to the tens transfer F′ through the conductors k′–1, k′–2, k′–3 and k′–4 in the same manner. As the typewriter keyboard is manipulated, another series of contacts included therein supplies power to selected punch magnets in the punch unit N′ when each key is depressed according to the punch code associated with that key through selected conductors a′–6, a′–7, a′–8, a′–9, and a′–10, the a′–11 conductor being connected to a tab key lock solenoid, while the a′–5, a′–20 and g″–3 conductors are each capable of energizing a keyboard lock solenoid (not shown) in the typewriter keyboard.

When the figures-letters shift key in the keyboard unit is in letters position, as illustrated in FIG. 12, a circuit is completed through a c′–1 conductor and the normally closed contacts 334–1 and 335–3 to energize a letters relay 333 in the shift key control G′ shown in FIG. 15. When the contacts 333–4 and 333–5 close, the letters check code 46 is transmitted through the conductors c′–4 and c′–7 and the conductors b′–7 and b′–9 or b′–6 and b′–8 according to the condition of the flip contacts 311–7 and 311–6. This circuit is completed through the d′–3 conductor from the shift key control to the flip unit and through the conductor e′–9 contact 329–2 in FIG. 13, conductors a″–3 and a″–2, joined by the 145–10 contact in FIG. 18 and contact 223–1 normally open, conductor a″–1 and contact 125–6 in FIG. 18, or contacts 223–1 normally closed and 249–2, according to the method being used. Similarly, the FIGS check code 45 is transmitted through the b′–5 and b′–9 or b′–4 and b′–8 conductors, depending on the condition of the flip unit when a FIGS relay 335 in the shift key control is energized through the conductor c′–2. Also, depression of the tab key in the keyboard unit when the tab switch is closed completes a circuit from the positive terminal in the step control H′, shown in FIG. 13, through a normally closed contact 329–4, conductors a′–13 and a′–16, a normally closed contact 249–4, the conductors a′–12 and c′–3 to energize a tab relay 338, transmitting the tab check code 47 to the counters through the conductors c′–6 and c′–7, and b′–3 and b′–9 or b′–2 and b′–8 as controlled by the flip contacts 311–6 and 311–9, the b′–2 through b′–13 conductors not being illustrated in the flip unit circuit diagram.

In the second method of the encoder operation, after the message has been entered through the encoder keyboard, the precoder check code total is entered into the separate numeric keyboard shown in FIG. 12, wherein another series of contacts similar to the contacts 35a in FIG. 6 is adapted to subtract the total from 11 and transmit the difference to the units and tens counters through the b′–11 and b′–10 conductors and the normally closed and normally open points, respectively, of a step relay contacts 235–8. The circuit to these numeric code contacts is completed through the normally closed keyboard restore contact, the a′–17 conductor, and the normally closed error control contact 329–3 to the positive terminal in FIG. 13, the method switch being closed while carrying out this method of operation.

*Encoder Flip Unit*

Returning to the encoder check code total accumulation, it will be observed that the flip unit B′, illustrated in FIG. 15, includes a group of timing relays 318, 319, 322 and 325 which govern the adding and transfer operation in much the same manner as those in the precoder. As soon as relays in both the transfer networks E′ and F′ have been actuated by receipt of a new total from the counters, the first transfer relay 318 is energized through the normally closed 325–2 contact, the conductor j′–10, any of the normally open parallel contacts 251–4, 252–4, 254–4 and 255–4, the conductor z′–2, and any of an identical group of parallel contacts in the tens transfer F′ (not shown) connected to a positive voltage source therein. Transfer of the 318–1 contact holds the first timing relay and energizes the second timing relay 319 through the normally closed contact 325–3 or the normally open contact 328–2, the relay 318 being utilized to delay the opening of the series of normally closed relay 319 contacts. This assures that the appropriate transfer relay hold coils have been energized through the corresponding contacts 251–1, 252–1, 254–1, and 255–1 and similar contacts in the tens transfer F′ according to the code number, the corresponding contacts in the group j′–5, j′–6, j′–7, j′–8, k′–5, k′–6, k′–7, and k′–8, connected to a series of normally closed relay 322 contacts, and the e′–2 conductor which is activated whenever the counters are not being reset.

With the relay 319 actuated, any units counter relays 267, 271, 275 and 279 in FIG. 16 which were held through the 319–3 contact, the conductor g′–5 and the corresponding normally open 267–1, 271–1, 275–1 and 279–1 contacts are restored, along with similar tens counter relays, through the contact 319–4 and the h′–5 conductor. Thus, when the 319–2 contact has closed, a pair of third timing relays 322 and 325 is energized through the normally closed contact 311–4 or the normally open contacts 317–3 and 311–4, depending on the condition of the flip relays, the conductor $d'$–1, normally closed series contacts 333–6, 335–6 and 338–5, the $q'$ conductor, a normally closed reset contact 340–3 in FIG. 17, the $p'$–3 conductor, a group of series-connected normally closed contacts (not shown) in the tens counter D′, the $m'$–1 conductor, a similar series of normally closed contacts 267–3, 271–3, 275–3 and 279–3 in the units counter shown in FIG. 16, the $b''$–1 and $c''$–6 conductors connected in FIG. 13 and the normally closed 340–1 contact in FIG. 17. As long as the relay 318 is actuated, the parallel-connected hold coils of the relays 322 and 325 are energized through the contacts 322–1 and 318–2 and thereafter these relays are held through the $j'$–9 conductor and any of four parallel contacts 251–5, 252–5, 254–5, and 255–5 in FIG. 16, and through the $k'$–10 line and similar contacts in the tens transfer network F′ until the transfer relays are restored.

As in the precoder timing unit, actuation of the last timing relay transmits the new total in the transfer units back into the counters and this is accomplished in the encoder by closing of the contacts 325–4 and 325–6, energizing the $j'$–11 and $k'$–9 conductors to actuate the appropriate counter relays through transfer contacts 251–2, 252–2, 254–2 and 255–2 in FIG. 16 and similar contacts in the tens transfer unit F′. As previously mentioned, the relays in both counters are held until the next transfer operation or until they are reset through the $h'$–5 and $g'$–5 conductors, the 319–3 and 319–4 contacts or the 325–5 and 325–7 contacts, and the $e'$–2 conductor which is energized until the counters are reset, or through the $e'$–4 and $e'$–5 conductors in the second method of operation as described below. Actuation of the relay 322 also restores the transfer relays through $j'$–5, $j'$–6, $j'$–7, $j'$–8, $k'$–5, $k'$–6, $k'$–7, and $k'$–8 conductors, the first and second timing relays being released by opening of the 325–2 and 325–3 contacts, and when both transfer networks have been cleared the relays 322 and 325 are restored by deenergization of the $j'$–9 and $k'$–10 conductors.

Meanwhile, the flip unit operates in the same manner as in the precoder, the flip relay 311 transferring the contacts illustrated in FIG. 12 and others (not shown) to transpose the digits of alternate code numbers. In the first operation of each message, after the first code number has actuated selected transfer relays, the relay 311 is energized through the contacts 317–2 normally closed, and 322–4 normally open, and is held through contacts 311–1, 317–1 normally closed, and 311–2, and the $e'$–2 conductor until the next code number has passed through the other flip contacts in the odd, or transposed, state. Actuation of the relay 318 then energizes the flip interlock relay 317 through the contacts 322–4 normally closed, 318–3, normally open, and 311–3 normally open, the interlock relay being held through the contact 317–1, normally open, and any of the parallel contacts 311–2, 325–1, and 319–1 to release the flip relay and prevent its actuation when the 322–4 contact transfers later in the same timing relay cycle, thus permitting the following code number to pass to the counters in the even assignment.

*Step Control*

Inasmuch as the two digit precoder check code total is entered through the typewriter keyboard in the keyboard unit A′ before the message is typed in in carrying out the first method of operation, a series of step relays is arranged as shown in FIG. 13 to differentiate the first two typing operations from the remaining character entries. Accordingly, when the typewriter carriage is returned after each message has been recorded, a carriage return contact in FIG. 12 is closed, energizing two parallel step control relays 226 and 240 through the $f''$–4 conductor, contact 134–11 normally closed in FIG. 14, the $r'$–8 and the $c''$–5 conductors joined in FIG. 17, and the 223–2 normally closed contact in FIG. 13, the method switch being in the open position. These relays are held through the 226–1 contact, the conductor $a''$–3, and contact 145–11 in FIG. 18 and the contacts 223–1 and 249–2, normally closed, until the precoder total has been keyed in. Also, it will be noted that as long as the relay 223 is inactive a circuit is available from the positive terminal in FIG. 13 through the normally closed 223–5 contact and the conductor $a'$–2 to energize an internal lock solenoid (not shown) in the numeric keyboard in FIG. 12, preventing these keys from being used in this method of operation.

When the first key is closed in the typewriter keyboard after the typewriter carriage has been returned, a circuit is completed from the positive terminal in FIG. 13 through the 329–4 contact, the $a'$–16 conductor, the typewriter common contact in FIG. 12 which closes each time a key is depressed, the $a'$–4 conductor, the normally closed 239–2 contact, the $a'$–3 conductor, the numerical contact which is closed in the typewriter keyboard, and the normally open 240–6 and normally closed 311–10 contacts to energize the $b'$–14 conductor leading to the appropriate units counter relay. It will be noted that actuation of the relay 226 disconnects the punch code conductors $a'$–6, $a'$–7, $a'$–8, $a'$–9 and $a'$–10 from the $f'$ cable in FIG. 13, thus preventing the precoder total from being punched into the tape and it will be understood that each numerical contact in the keyboard is connected to a normally open contact such as the 240–6 contact actuated by the relay 240 and a flip relay contact such as the 311–10 contact, only one of each being illustrated in the drawings. Also, in order to prevent the tape from being advanced in the tape punch when the precoder total is entered, a code check relay 197 in FIG. 18 is energized from the $v'$–3 conductor in FIG. 13 through the parallel contacts 245–10 and 232–7, the $c''$–3 conductor, contact 176–9 normally closed in FIG. 17, the $s'$–19 line, and normally closed contact 125–9 in FIG. 18. Actuation of the CB–6 circuit breaker before the CB–3 breaker opens holds the check code relay through the conductor $v'$–6 and the 197–1 contact and energizes a no-feed magnet in the punch unit while the check code is being entered through the $a''$–7 conductor, any of the parallel normally open contacts 232–8, 235–4, 245–11, and 249–3, the $a''$–9 conductor, contact 197–2, the $s'$–12 and $s'$–5 conductors, which are joined through the normally closed contact 176–7 in FIG. 17, and the $w'$–3 conductor leading to the no-feed magnet NF in FIG. 19. This magnet is mechanically arranged to prevent the forward motion of the tape during the next tape feed cycle when actuated, the circuit being completed to ground through the CB–1 circuit breaker.

As soon as the tens digit complement of one is entered into the tens transfer F′, a circuit is completed through any of a group of parallel normally open contacts identical to the group 251–3, 252–3, 254–3, and 255–3 in FIG. 16, to the conductor $z'$–1, and power is available from the positive terminal in FIG. 13 through the contacts 226–3 and 305–2, the conductor $d''$–4 which leads to both transfer networks, any of the above-mentioned tens transfer contacts, the conductors $z'$–1 and $d''$–2, and the contacts 245–2 and 235–6 to energize a step one relay 232 in FIG. 13. This relay is held through its normally open contact 232–1, contact 306–4 normally closed and the $v'$–2 conductor, or through the $e'$–6 conductor until the third timing relay 322 in FIG. 15 is actuated to transfer the tens digit into the tens counter, opening the 322–3 contact. Inasmuch as only the tens transfer relays are intended to be energized by the numerical key during this step of the check code entering, another circuit is available to ascertain that no units transfer relays have been energized, as by depression of a non-numerical key, for example, through the $d''$–4 conductor, any of the contacts 251–3, 252–3, 254–3 and 255–3 in FIG. 16, the $d''$–1 conductor, the contacts 235–1 and 245–4 normally closed and the $a''$–6 conductor, energizing an error relay 196 in FIG. 18 if any of the units transfer relays is actuated.

After the tens digit has been entered, the first timing relay 318 is energized to begin the transfer operation described above from a positive source through any of a parallel group of normally open tens transfer contacts similar to the 251–4 contact in FIG. 16, the conductors $z'$–2 and $d''$–3, the contacts 240–5 normally open, 245–7 normally closed, 232–4 normally open, and the $e'$–1 conductor. Meanwhile, a step two control relay 235 is picked in readiness for the units digit entry through the contact 232–2 when the $v'$–3 conductor is energized by its circuit breaker, this relay being held through its own normally open point and the contacts 306–3 and 245–3 to the positive terminal and through the $v'$–2 conductor and its circuit breaker when the 245–3 contact opens.

Depression of the next numerical key in the keyboard transmits the one complement of the precoder total units digit to the units transfer E′ through the conducor $b'$–15, the flip relay 311 having been energized by the timing relays in the last cycle. When the corresponding units transfer relays have been actuated a circuit is available to energize a step two relay 245 through the contact 235–1 normally open, conductor $d''$–1, any of the parallel contacts 251–3, 252–3, 254–3 and 255–3 in FIG. 16, the $d''$–4 conductor and the contacts 305–2 and 226–3 in FIG. 13, the first timing relay 318 being actuated through the contacts 245–7 and 240–5 normally open, the $d''$–3 conductor, any of the contacts 251–4, 252–4, 254–4 and 255–4 and the $j'$–10 conductor. The relay 245 is held through its own normally open contact, the contact 235–5 and through the $v'$–2 conductor until the end of the CB–2 cycle, when the circuit breaker CB–6 energizes the $v'$–6 conductor to hold it. In order to retain the previously entered tens digit in the tens counter during this operation, the $h'$–5 conductor leading to the tens counter hold coils remains energized through the conductor $e'$–5, normally open contact 245–9, the $c''$–7 conductor, and the normally closed reset contact 176–6 in FIG. 17.

With the eleven complement of the precoder total entered in the counters, the encoder carriage is automatically tabbed to the first message starting position on the document form 29a by actuation of an auto-tab relay 249. It will be noted that this is a latch type relay and the latch pick coil is energized automatically from the $v'$–3 conductor through the contacts 223–6 normally closed and 245–6 normally open during the first cycle after the relay 245 is actuated. When this relay is actuated, an internal tab solenoid, energized through the conductor $b'$–6, the contact 249–1, and the $a'$–11 line shifts the typewriter carriage closing the tab contact in FIG. 12, thereby completing a circuit through the $a'$–13 line, contact 249–4 normally open, conductors $c''$–1 and $c''$–8, joined through the normally open message contact 344–3 in FIG. 17, and contact 306–2 to energize the latch trip coil. If the message relay 344 is restored when the relay 249 is latched, the latch trip coil is energized through the contact 305–2 normally closed, conductor $c''$–8, contact 344–3 normally closed in FIG. 17 and the $v'$–6 conductor. When the tab contact is closed, the latch pick coil is also energized through the contact 249–4, the conductor $a'$13, the tab contact, conductor $a'$–16 and the normally closed 329–4 contact in FIG. 13 and therefore the 249 relay remains actuated as long as the tab contact is closed and is released when that contact opens. Opening of the 249–2 contact restores the step control simultaneously transmitted to relays 226 and 240 and prevents the tab check code from being transmitted to the counters during the auto-tab operation. Meanwhile, a step error control relay 305 is energized through the contact 245–12 and the $v'$–6 conductor and is held through the contacts 305–1 and 329–2 and the $a''$–3 conductor until the normally closed 249–2 contact opens in method one or the 125–6 normally closed contact opens during method two, transfer of the 305–2 contact preventing further actuation of the step relays 232, 235 and 245 by erroneous depression of a third key before the tab operation is completed. Release of the tab contact and the relay 249 thereafter places the encoder in condition for typing and punching of the message under method one.

When the second encoding method is utilized, the method switch in FIG. 13 is closed, energizing two method relays 223 and 239 in the step control H′, thus permitting the message to be typed and punched into the tape before the precoder total is entered. After the message has been completed in the manner described above, the precoder total is entered through the numeric keyboard in FIG. 12, the keys having been unlocked by opening of the 223–5 contact. Closing of the method switch also supplies positive voltage through the contact 329–3 normally closed, the $a'$–17 conductor, and the normally closed numeric keyboard restore contact to energize the internal numeric code contacts in readiness for transmission of the precoder total to the counters through the $b'$–10 and $b'$–11 conductors as described above. When the first numeric key is depressed, simultaneously closing a numeric keyboard common contact shown in FIG. 12, a circuit is completed to energize the step control relays 226 and 240 through the circuit described above to the numeric keyboard restore contact, the numeric keyboard common contact, conductor $a'$–14, contacts 305–3 normally closed and 223–2 normally open in FIG. 13, the relays being held through contact 226–1 normally open, conductors $a''$–3 and $a''$–2 which are connected through the normally closed contact 145–11 in FIG. 18, the contact 223–1 normally open, the $a''$–1 conductor and the notch relay contact 125–6 in FIG. 18.

Entering of the first digit of the precoder total into the tens transfer F′ completes a circuit through contacts 226–3 normally open and 305–2 normally closed, the $d''$–4 conductor, and appropriate tens transfer contacts as described above to energize the first step relay 232 through the $z'$–1 and $d''$–2 conductors, and the first timing relay 318 is then actuated through the tens transfer in the same manner as in method one operation. In this case, however, the check code total stored in the units counter must be retained during the timing relay cycle and this is accomplished by holding the units counter relays in FIG. 16 through the lines $g'$–5 and $e'$–4, joined in FIG. 15, the contacts 239–5 and 232–6 in FIG. 13, and the conductor $c''$–7 and contact 176–6 in FIG. 17. In the tens transfer F′ and counter D′, the adding and transfer operations take place in the usual manner as the timing relays are actuated in sequence, the third timing relays 322 and 325 being energized in this case through the contact 340–1 in FIG. 17, the $c''$–6 conductor, contacts 239–4, 232–5, and 245–8 normally closed, conductors $b''$–2 and $m'$–1, the normally closed tens counter contacts, conductor $p'$–3 and the circuit previously described. In the second step of method two operation the precoder total units digit is entered, the step two relays 235 and 245 being actuated in the same manner as before while the tens digit is retained in the counter during this operation as in method one.

During each step of the entering of the precoder total, the keyboard restore interlock relay 248 in FIG. 13 is actuated from the $v'$–2 conductor through the contacts 223–4, 226–4 and 232–3, or 235–2 and 245–5. This permits the positive potential from the $v'$–2 conductor to be applied through the contacts 223–4 and 248–1 and the $a'$–2 conductor to energize the restore magnet in the numeric keyboard, the 223–5 contact being held open. It will be noted that the keyboard restore interlock relay 248 is also energized through the $c''$–2 conductor and the normally closed 344–4 contact in FIG. 17 whenever a message relay 344 is not energized.

*Message Control*

As previously mentioned when each typewriter key is depressed, predetermined punch code contacts in the typewriter keyboard close to energize selected conductors in the group *a′*–5, *a′*–7, *a′*–8, *a′*–9 and *a′*–10 according to the punch code assigned to the character, as described in United States application Serial No. 556,629, filed December 30, 1955 (Docket 5072). Except when the precoder total is being entered, these conductors lead through the normally closed step control contacts in FIG. 13 and the conductors *f′*–1, *f′*–2, *f′*–3, *f′*–4 and *f′*–5, respectively, to the message control K′ illustrated in FIG. 14. Normally, during the typing of a message in the encoder, each of these conductors leads to a correspondingly-numbered conductor in the *y′* cable which is connected in the counter control R′ to a similarly numbered conductor in the *y″* cable to energize a corresponding punch magnet in the punch unit. For example, the conductor *f′*–2 has a circuit through the contacts 134–2, 153–2 and 130–1 normally closed, 101–2 normally open, a message relay 101 being energied, 104–2 and 109–2 normally closed and the *y′*–2 and *y″*–2 conductors joined in FIG. 22, to a punch magnet P–2 in the punch unit N′ shown in FIG. 19. In addition, in order to punch any code into the tape, a punch clutch included within the tape punch shown in FIG. 19 must be energized through the *y″*–6 and *y′*–6 conductors, joined in FIG. 22, contacts 109–6 and 104–5 normally closed in FIG. 14, conductor *r′*–19 normally closed, contacts 122–2 and 123–2 in FIG. 17, conductor *r′*–11, contact 130–5 normally closed, the *t′*–2 line, contact 145–6 normally closed in FIG. 18, conductor *t′*–1, contact 199–8 normally closed, the *e″* line, contact 322–2 in FIG. 15, the conductor *e′*–3, either of the parallel normally closed contacts 233–3 and 226–2 in FIG. 13, the *f′*–6 conductor, contact 134–7 normally closed in FIG. 14, the *f″*–1 conductor and the typewriter common contact in FIG. 12. It will be understood that the punch clutch line may be energized through any of the normally open points of the normally closed contacts mentioned above, these points being connected to the positive voltage source.

At the end of each message which has been verified as correct, the end of message code group CR, FIGS, LF, followed by the checkable tape code is punched in the tape in the manner described in detail hereinafter. This code group is followed by a message-separating edge notch in the tape, produced by actuation of a notch relay 125, two message relays 344 in FIG. 17 and 101 in FIG. 14 also being actuated at this time. The message relays are held through the *r′*–14 conductor, contact 101–7, the *r′*–15 line, and contact 121–4 in FIG. 17 until an end of message relay 121 is energized.

When the notch relay 125 is energized, the beginning of message figures code is automatically punched in the tape at the same time that the notch is punched by energization of the figures relay 104 in FIG. 14 through the conductor *r′*–30, contact 121–3 normally closed in FIG. 17, conductor *s′*–4, contact 125–5 and the *v′*–5 conductor, the FIGS relay being held through the 104–11 contact, the line *r′*–24, contact 107–1 normally closed in FIG. 17, conductor *r′*–23 and 104–8 contact. Transfer of the contact 104–5 energizes the conductors *y′*–1, *y′*–2, *y′*–4 and *y′*–5 through the normally open contacts 104–1, 104–2, 104–3, and 104–4 to actuate the first, second, fourth and fifth punch magnets P–1, P–2, P–4, and P–5 in the punch unit N′ causing perforations to be entered in the corresponding channels in the next tape column as described below. At the same time, the 125–8 contact and the *s′*–9 line actuate two interlock relays 133 and 345 in FIG. 17 and these are held through the 133–1 contact and the *v′*–4 conductor, transfer of the 133–2 contact energizing the typewriter keyboard lock solenoid through the *g″*–3 conductor to prevent its use until the automatic operations of the encoder are completed.

Closing of the 104–10 contact in FIG. 14 actuates a figures case relay 107 in FIG. 17 through the *v′*–4 and *r′*–28 conductors, and this relay is held through the contact 107–1 normally open, the *r′*–23 conductor and contact 104–8 after the *v′*–4 line is deenergized until the FIGS relay 104 has been restored by opening of the 107–1 contact. When the fourth circuit breaker opens at the end of its cycle, the interlock relays 133 and 345 are restored and a case test is initiated to determine the position of the figures-letters shift key in the keyboard unit A′. If the key is in the figures position, the *g″*–2 conductor is energized and the figures case relay 107 is held through the contacts 344–2, 345–2 and 107–2 until the key is shifted. If the key is in letters position, a circuit is completed through the *g″*–1 conductor, the contacts 344–1, 345–1 and 112–2 normally closed and the conductor *r′*–31 to energize the letters relay 109 in FIG. 14. This punches the five perforation letters code in the tape by energizing the *y″*–1, *y″*–2, *y″*–3, *y″*–4 and *y″*–5 lines through the contacts 109–1, 109–2, 109–3, 109–4, 109–5, and 109–6 normally open, the hold coil of the relay being activated through the contact 109–11, the *r′*–33 conductor, contact 112–1 in FIG. 17, the *s′*–18 and *t′*–27 conductors joined in FIG. 18, and the 109–9 contact in FIG. 14 until the letters case relay 112 is actuated. Meanwhile, the 109–10 contact closes and when the *v′*–4 lines is energized a circuit is completed to pick the relay 112 through the conductor *r′*–29, the relay being held through the 112–2 normally open contact and the contacts 345–1 and 344–1 until the relay 345 is actuated again or the FIGS-LTRS shift key is operated. Transfer of the 112–1 contact restores the letters relay 109 and the encoder is in condition to receive the next message through the keyboard.

Each time the tab contact in FIG. 12 is closed to shift the encoder typewriter carriage during a message, a skip relay 129 in FIG. 17 is energized through the 329–4 contact in FIG. 13, the *a′*–16 and *a′*–13 conductors connected by the tab contact, contact 249–4 normally closed, the *f′*–11 conductor, contact 134–10 normally closed in FIG. 14 and the *r′*–7 conductor, the pick coil circuit being completed to ground through the *v′*–1 conductor, and the hold coil being energized through the contact 129–1, conductor *r′*–13, contact 130–8 in FIG. 14, conductor *t′*–4, and contact 196–2 normally closed in FIG. 18. In order to enter the tab code which comprises a "G" code in the figures case, a circuit is completed from the *v′*–5 conductor through the 129–4 contact, the *r′*–12 conductor and the contact 101–11 to energize a G relay 130 in FIG. 14. This relay is held through the *r′*–10 conductor, contacts 129–2 and 107–4 in FIG. 17 and conductor *s′*–10 if the figures case relay 107 is actuated, or through contact 130–4 and conductor *t′*–19, the 196–3 contact and the *v′*–2 line causing a "G" code comprising perforations in the second, fourth and fifth channels to be punched into the tape. This takes place through the normally open contacts 130–1, 130–2 and 130–3 which are energized through the 130–5 normally open contact, and the *y′*–2, *y′*–4 and *y′*–5 conductors, the 130–2 contact being connected to the *y′*–4 conductor through the lines *r′*–17 and *r′*–20 which are joined in FIG. 17 by the normally closed contact 122–3. If the encoder is in the letters case, contact 129–3 energizes the figures relay 104 through the contact 107–2 normally closed and the *r′*–30 conductor to punch the figures code into the tape before the "G" code is entered. This is followed by a letters code punched into the tape as a result of a case test operation as described above.

In order to prevent double-punching of codes in the paper tape if a typewriter key is held down longer than the duration of the punch cycle, a non-repeat relay 134 is energized by the *v′*–3 and *f′*–9 lines during every circuit breaker cycle to break the punch magnet circuits by opening of the normally closed contacts 134–1, 134–2, 134–3, 134–4 and 134–5. This relay is held through one of its own normally open contacts, the *f″*–1 conductor, the typewriter common contact and the line $a'$–16 until the key is released, or through the line $f''$–3 until the error key is released, through the line $r'$–5 and contact 121–4 until the end message relay 121 is restored, through the line $f'$–11 until the tab key is released, through the conductor $f''$–4 until the carriage return tab contact is restored, or through the line $r'$–9, contact 133–3, conductor $r'$–22, contact 101–10 normally open, the $t'$–4 conductor and the contact 196–2 in FIG. 18 until the interlock relay 133 is restored.

Whenever it is desired to pass tape through the punch without recording any message, for example, to produce leader or trailer, a tape feed switch, shown in FIG. 14, or a tape feed contact, illustrated in FIG. 12, is closed, energizing the relay 130 through the $f''$–5 conductor and the normally closed contact 101–11, the encoder being out of the message condition so that the message relay 101 is not actuated. Transfer of the contact 130–5 energizes the conductors $y'$–1, $y'$–2, $y'$–3, $y'$–4, and $y'$–5 through the conductor $r'$–11, contacts 123–2 and 122–2 normally closed in FIG. 17, conductor $r'$–19, and normally closed contacts 104–5 and 101–1 through 101–5 to punch the five perforation letters code into the tape, this also being a tape feed code as mentioned above.

*Checkable Tape Code*

In order to make certain that the information recorded on the paper tape is properly read out during subsequent operations such as tape duplication governed by a paper tape prepared in accordance with this invention, a checkable tape code number is punched into the tape at the end of each message. This code is of the type described in United States application Serial No. 553,001, filed December 14, 1955 (Docket 5075) and in this case consists of a number representing the last digit of the total number of tape perforations comprising the message record. As illustrated in the counter control R′ in FIG. 22, each of the energized conductors in the $y'$ cable leading to a punch magnet through the $y''$ cable also actuates one of the counter control relays 161, 164, 167, 170 and 173 in the counter control when the $v'$–1 conductor is connected to ground by the CB–1 circuit breaker, each of the actuated relays being held through its contact 161–3, 164–3, 167–3, 170–3 or 173–2 and the $v'$–2 conductor. When the $v'$–3 line is activated thereafter, one of the conductors in the $x''$ cable corresponding to the number of counter control relays actuated by the $y'$ cable is energized. For example, when the FIGS code comprising four perforations is sent to the punch unit, the counter control relays 161, 164, 170 and 173 are actuated by the $y'$–1, $y'$–2, $y'$–4 and $y'$–5 conductors. This completes a circuit from the $v'$–3 conductor in FIG. 17 through the normally closed contact 176–5, the $s''$–1 conductor and contacts 161–5 normally open, 164–5 normally open, 167–5 normally closed, 170–6 normally open, and 173–5 normally open, through the $x''$–4 conductor, the $x''$–7 conductor also being actuated from the $s''$–1 line.

Within the punch counter Q′, shown in FIG. 21, a group of ten count relays and two carry relays, along with a network of associated contacts, is arranged to accumulate in decimal fashion numbers received in succession through the $x''$ cable and to retain the last digit of the total until the relays are restored and the counter is reset to zero by actuation of the count-ten relay 213. Thus, when the $x''$–4 line is energized during punching of the figures code with the counter set at ten, a circuit is completed through the contacts 204–7, 207–7, 184–7, and 201–7 normally closed, and 213–7 normally open to pick the count-four relay 190, the hold coil of this relay being retained through the 190–3 normally open contact and a series of normally closed third contacts associated with the other counter relays and the normally closed carry contacts 217–2 and 217–3. If the counter relay actuated in this manner is higher than five, the carry relay 216 is energized through the contact 217–4 and any of the parallel normally open contacts 201–8, 204–8, 207–8, 210–8, and 213–8, the conductors $x''$–6 and $y'$–6 joined in FIG. 22, and through any normally open point of the series-parallel connected contacts 109–6 and 104–5 in FIG. 14, 122–2 and 123–2 in FIG. 17, 130–5 in FIG. 14, 145–6 in FIG. 18, and 199–8 in FIG. 14, or through the conductor $e''$, normally closed contact 322–2 in FIG. 15, the $e'$–3 line, either of the parallel normally closed contacts 223–3 and 226–2 in FIG. 13, the $f'$–6 conductor, normally closed contact 134–7 in FIG. 14, the $f''$–1 conductor, and the typewriter common contact in FIG. 12, which is energized with each key depression. Transfer of the contacts 216–1 and 216–2 actuates the relay 217 through any of the parallel counter contacts 201–8, 204–8, 207–8 210–8 and 213–8, and when the 217–1 contact closes, power is available from this circuit to energize the relay 216 hold coil. The actuated count relay is then held through the contact 216–3, the series-connected normally closed third contacts of the other count relays and the 216–4 contact until another count relay is picked. In order to make certain that a subsequent count relay is fully actuated before the preceding count relay is restored, the first contact of each count relay retains its pick coil through the $x''$–7 and $s''$–1 conductors until the end of the $v'$–3 line energization, the hold coil contacts being arranged in series to energize only the higher one of any two actuated count relays.

When the $x'$–6 conductor is energized at the end of each message as described below, the punch code corresponding to the checkable tape code number accumulated by the counter is transmitted to the punch unit through the conductors $x'$–1, $x'$–2, $x'$–3, $x'$–4 and $x'$–5. For example, if the checkable tape code number is a four, which is represented in the punch code by perforations in the second and fourth tape channels, the $x'$–2 and $x'$–4 conductors are energized through the contacts 190–12 and 190–13 and the $x'$–6 line.

If desired, in order to assure that no error has been made within the counter in accumulating the checkable tape code, another identical counter (not shown) may be placed in parallel with the punch counter Q′ and at the end of the message the two may be compared to determine agreement of the totals, any difference between the two actuating an error relay to initiate error deletion as described below.

As a further check to assure that the tape is properly punched, the operation of each perforator in the tape punch transfers a corresponding contact in the group T–1, T–2, T–3, T–4, and T–5 shown in FIG. 19 and the condition of these contacts after each punch cycle is compared with that of the counter control relays 161, 164, 167, 170, and 173 in the manner described in detail in United States application Serial No. 556,643, filed December 30, 1955 (Docket 5002). Also, the punch code contacts in the typewriter keyboard are arranged to energize a redundant magnet RED in FIG. 19 through the $y''$–7 and $y'$–7 conductors, contacts 109–7 normally closed, 101–6 normally open, and 104–6 normally closed in FIG. 14, the $t'$–24 line, contact 145–5 in FIG. 18, the $t'$–6 conductor, contact 134–6 in FIG. 14, and the $f''$–2 line each time a code having an even number of perforations is transmitted to the punch unit, thus energizing an odd number of magnets regardless of the punch code. This procedure is also described in detail in United States application Serial No. 556,643, filed December 30, 1955 (Docket 5002).

As an example, assume that the FIGS code has been sent to the punch, energizing the relays 161, 164, 170, and 173 and transferring the contacts T–1, T–2, T–4 and T–5 and the redundant contact R–1, the redundant magnet being energized in this case from the 104–5 normally open contact through the $t'$–21 conductor, normally closed contact 125–1 in FIG. 18, the $t'$–25 line, normally open contact 104–6, and the 101–6 and 109–7 contacts in FIG. 14. If the figures code has been properly transmitted to the punch and the correct perforators have been actuated, a circuit is completed from the CB–3 circuit breaker through the contact T–1, normally open, conductor $y''$–12, contacts 161–4 and 164–4 normally open in FIG. 22, the $y''$–13 conductor, contacts T–2 normally open and T–3 normally closed, the $y''$–19 line, contact 167–4 normally closed and 170–4 normally open, the $y''$–11 conductor, contacts T–4 and T–5 normally open, conductor $y''$–14, contact 173–3 normally open, the $y''$–15 line, normally open contact R–1, normally closed contacts NP–2 and N–2, conductor $y''$–9 and contacts 161–2 and 164–1, normally open, 167–2 normally closed, 170–2 and 173–1 normally open, conductors $s''$–2, normally closed contact 176–9 in FIG. 17, the $s'$–19 conductor and the normally closed contact 125–9 in FIG. 18 to energize the code check relay 197. This relay is held through the 197–1 normally open contact and the $v'$–6 conductor, and if for any reason the code check relay has not been actuated after each punch cycle when the $v'$–6 conductor is energized, an error relay 196 is picked through the 197–1 and 145–2 normally closed contacts, to initiate an error deletion procedure described below.

*End of Message*

After each message has been entered in the tape by either of the two methods described above, the carriage return key in the keyboard unit A′ is depressed, completing a circuit through the $f''$–4 conductor, the contact 134–11 normally closed in FIG. 14, the conductor $r'$–8, contact 113–3 in FIG. 17, the $s'$–11 line, the 196–4 contact in FIG. 18, the $t'$–20 conductor, normally open contact 101–8 in FIG. 14, the conductor $r'$–16, normally closed contact 121–5 in FIG. 17, the $p'$–2 conductor, contacts 267–2, 271–2, and 275–2 normally closed and 279–2 normally open in FIG. 16, the $m'$–3 conductor, a similar series of contacts representing a one in the tens counter, the $b''$–3 conductor, contact 239–3 normally closed or contacts 239–3 normally open and 240–3 normally open, and 283–2 normally closed in FIG. 13, depending on which method is utilized, and conductor $c''$–4 to energize a carriage return relay 122 in FIG. 17, the circuit being completed to ground through the $v'$–1 conductor when the circuit breaker CB–1 closes. Inasmuch as the above circuit is completed only if each of the counters stands at one, the carriage return relay 122 is energized only when the precoder and encoder check code totals agree, verifying the message, the relay 122 being held through the contacts 122–1 normally open and 123–1 normally closed, the conductor $r'$–3 the contact 199–6 normally closed in FIG. 14, the $t'$–3 line, and contacts 125–7 and 196–2 normally closed in FIG. 18 until the relay 123 is actuated.

Meanwhile, the step control relays 226 and 240 are actuated, if the method switch is open, through the carriage return contact, the $f''$–4 line, contact 134–11 in FIG. 14, the $r'$–8 and $c''$–5 conductors connected in FIG. 17 and contact 223–2 in FIG. 13. It will be noted that these relays are held during method two operation with the method switch closed until the notch relay contact 125–6 in FIG. 18 transfers on completion of the end of message code group entry. During any automatic operation of the encoder in order to prevent information from being entered before the operation is completed, the typewriter keyboard is locked through the $g''$–3 conductor and the 133–2 contact in FIG. 17, the interlock relays 133 and 345 being energized through any of the parallel contacts 129–5, 123–6 and 122–6 in FIG. 17, contacts 145–4 and 125–8 in FIG. 18 through the conductors $s'$–7 and $s'$–9, contacts 130–7, 199–7, and 101–10 normally open in FIG. 14 through the $t'$–4 and $t'$–22 lines, and through the normally closed contact 196–2.

In order to indicate the end of a verified message, the code group CR, FIGS, LF is automatically punched into the tape, followed by the checkable tape code, an edge notch, and the beginning of message FIGS code. When the contact 122–2 transfers, a circuit is completed through the contacts 123–8 and 122–3 normally open, the $r'$–20 conductor, and normally closed contacts 104–3 and 109–4 in FIG. 14 to activate the $y'$–4 line, causing the CR code, comprising a single perforation in the fourth tape channel, to be punched. When the $v'$–5 conductor is energized thereafter, the figures relay 104 is actuated through the contacts 122–4 and 123–4 and the $r'$–30 line and is held through the 104–11 contact, the $r'$–24 conductor, the contact 107–1 normally closed the $r'$–23 line and the 104–8 contact, causing the FIGS code to be punched into the tape, in the manner described above, during the next punch cycle.

Transfer of the 104–9 contact completes a circuit from the $v'$–4 conductor in FIG. 18 through the normally open 197–4 contact, the code check relay 197 being actuated when each punch operation has been properly completed as described above, through the $s'$–1 conductor, the normally open 122–5 contact in FIG. 17, and the $r'$–25 and $r'$–27 conductors joined by the 104–9 contact, to energize a line feed relay 123 and this is held through the 123–1 contact, the $r'$–3 conductor, contact 199–6 normally closed in FIG. 14, the $t'$–3 line, and contacts 125–7 and 196–2 normally closed in FIG. 18. Meanwhile, the figures case relay 107 is energized through the $r'$–28 conductor and contact 104–10 from the $v'$–4 line and is held through contact 107–1 normally open, conductor $r'$–23 and contact 104–8 until the figures relay is restored by opening of the 107–1 normally closed contact. As soon as the normally open 123–2 contact closes, power is available through the contact 123–3, the $r'$–4 conductor, the normally closed contact 199–2 in FIG. 14, and the contacts 153–2, 130–1, 101–2, 104–2 and 109–2 to energize the $y'$–2 line, causing the LF code to be punched into the tape in the next punch cycle, the carriage return relay 122 being restored by transfer of the contact 123–1.

When the code check relay 197 is actuated by punching of the LF code, a circuit is completed from $v'$–4 line in FIG. 18, through the 197–4 contact, conductor $s'$–1, and contacts 122–5 normally closed and 123–5 normally open in FIG. 17, to pick a read-out relay 199 in FIG. 14 through the $r'$–1 conductor, this relay being held through the normally open contact 199–6, conductor $t'$–3 and normally closed contacts 125–7 and 196–2 in FIG. 18. Power supplied to the $x'$–6 conductor through the 199–8 normally open contact then causes the accumulated checkable tape code to be read from the punch counter Q′ and transmitted to the punch unit through a group of normally open read-out contacts connecting the $x'$ cable with the $y'$ cable as shown in FIG. 14, the line feed relay 123 being restored by opening of the normally closed 199–6 contact. In this case, the redundant magnet in the punch unit is energized whenever the punch code has an even number of perforations through a counter relay contact, such as the contact 190–11, for example, the $x'$–7 conductor, contact 199–10 in FIG. 14, and the $x'$–6 circuit previously described.

After the checkable tape code has been recorded, a notch relay 125 in FIG. 18 is actuated through conductor $t'$–5, contact 199–9 in FIG. 14, the $r'$–2 line, normally closed contacts 123–5 and 122–5 in FIG. 17, conductor $s'$–1, contact 197–4, and the $v'$–4 conductor, and the relay is held through the $s'$–14 line, the contacts 107–3 and 112–3 normally closed in FIG. 17, conductor $s'$–2 normally open, contact 125–7 and the normally closed contact 196–2. Closing of the 125–4 contact energizes two reset relays 176 and 340 in FIG. 17 from the $v'$–6 line through the $s'$–17 conductor and these are held through the 176–3 and 113–2 contacts and the $v'$–6 conductor. Transfer of the 176–6 contact restores the units and tens counter relays by breaking the circuit through the $c''$–7 line connected to the $e'$–2 conductor in FIG. 13, contact 319–3 in FIG. 15 and the $g'$–5 conductor, while the punch counter is reset by actuation of the count-ten relay 213 through the $u'$–1 conductor, normally open contact 176–5 and the $v'$–3 conductor, the other count relays being dropped by opening of the normally closed 176–5 contact which prevents energization of the $s''$–1 line.

When the $v'$–5 conductor is energized with the notch relay 125 actuated, the FIGS relay 104 is picked through the $r'$–30 conductor, contact 121–3 normally closed in FIG. 17, the $s'$–4 line, and contact 125–5 in FIG. 18, causing the figures code to be punched into the tape. Meanwhile, transfer of the 125–3 contact completes the circuit to a notch punch magnet NP in FIG. 20 through the $w'$–5 and $t'$–26 lines to the $y'$–6 conductor in FIG. 14, causing a notch to be punched in the edge of the tape between the checkable tape code and FIGS columns when the punch clutch is energized through the $y'$–6 conductor as described above.

If the end of message contact in FIG. 12 has been closed to indicate termination of the encoder operation, a circuit is completed through the 329–4 contact in FIG. 13, the $a'$–16 and $a'$–15 conductors, contacts 336–5 and 239–7 and 226–5 normally closed and normally open, respectively, under method one, or normally open and normally closed, respectively, under method two, conductor $f'$–7, contact 101–9 in FIG. 14, and the $r'$–21 line to actuate an end of message relay 121. This relay is held through the 121–1 contact, conductor $r'$–22, contact 101–10 in FIG. 14, the $t'$–4 line, and contact 196–2 in FIG. 18 until the message relay 101 is restored. Transfer of the contact 121–3 causes a letters code to be punched into the tape instead of the beginning of message figures code, through the conductor $r'$–31 and when the notch contact 125–11 opens with the 176–10 contact held open, the message relays 101 and 344 are restored by transfer of the 121–4 contact. Meanwhile, an interlock relay 113 in FIG. 17 is actuated either through the parallel contacts 107–5 and 112–4 or through the lines $s'$–13 and $s'$–16 connected by the notch contact 125–10 when the notch relay is restored, and through either the contact 176–1 and the $v'$–6 conductor, or through the $r'$–26 conductor and either of the contacts 104–7 and 109–8, restoring the reset relays 176 and 340 by opening of the 113–2 contact. The hold coil of the relay 113 is energized through the 113–1 contact, the $r'$–22 conductor and contact 101–10 normally open, until the $v'$–1 conductor is disconnected, and the pick coil is retained through the contact 113–2 normally open, and the $r'$–26 conductor until the relays 104 and 109 are restored.

When the notch relay 125 is released by actuation of the figures case relay 107 or the letters case relay 112, the counters are tested for the reset condition through the $v'$–5 conductor, contact 125–5 normally closed, $s'$–3 conductor, and the normally open contacts 176–4 and 340–1 in FIG. 17. The contact 176–4 energizes the $u'$–3 conductor and, if the count-ten relay 213 in FIG. 21 is not actuated, a circuit is completed through the 213–9 contact and the $w''$ line to pick the error relay 196 in FIG. 18. Similarly, the $c''$–6 line is activated by the 340–1 contact, completing a circuit through the $b''$–1 conductor in FIG. 13, a series of normally closed units counter contacts 267–3, 271–3, 275–3 and 279–3 in FIG. 16, the $m'$–1 conductor and a similar series of contacts in the tens counter D. If any of these counter relays are actuated, the circuit is completed through one of the parallel normally open points of these contacts, the conductors $m'$–2 and $p'$–1, contact 340–2 in FIG. 17, the $c''$–9 and $a''$–6 lines in FIG. 13, to pick the error relay.

*Error Deletion*

As previously mentioned, failure of the counters to reset properly or incorrect punching of a code in the tape will energize the error relay 196 shown in FIG. 18, causing the typewriter keyboard to lock through the 196–2 normally open contact and the $a''$–11 and $a'$–20 conductors and, if desired, also giving a visual indication of the error to the encoder operator. Transfer of the contact 196–1 holds this relay through the 145–3 contact, the $a''$–4 line, normally closed contact 240–4 in FIG. 13, the $a''$–1 conductor and the 125–6 normally closed contact.

In order to restore the keyboard and eliminate the incorrect information from the tape, the operator depresses an error key shown in FIG. 12 to initiate an error deletion operation of the type described in detail in United States application Serial No. 555,531, filed December 27, 1955 (Docket 5077). This completes a circuit through the $f''$–3 line, contact 134–8 normally closed in FIG. 14, and the $t'$–7 conductor to energize a delete relay 145 in FIG. 18 and through the $f'$–10 line to actuate two error control relays 306 and 329 in FIG. 13. Transfer of the 145–3 contact holds the delete relay through the $a''$–4 conductor, the normally closed contact 240–4, conductor $a''$–1, and the normally closed 125–6 contact in FIG. 18 until the notch relay 125 is actuated, the error control relays being held through the contact 329–1, the $a'$–19 line, and the normally closed carriage return contact. When the contact 145–6 transfers the notch magnet in FIG. 19 is energized through the contacts 145–9, 152–4, 156–1, and 125–2 normally closed and the $w'$–5 conductor, while the 145–8 contact energizes a notch read magnet through the $w'$–6 line, permitting two contacts NR–1 and NR–2 to energize the lines $w'$–1 and $w'$–2, respectively, from the CB–3 circuit breaker when they sense a notch in the edge of tape. These contacts are positioned longitudinally with respect to the tape and are spaced by one column so that the NR–1 contact detects a notch first when the tape is moving backward in the punch unit and the NR–2 contact senses it when the tape has been moved backward one more column.

In order to transport the tape backwardly in the tape punch, transfer of the 145–2 normally open contact in FIG. 18 energizes the no feed magnet NF in FIG. 19 through the $w'$–3 line, normally closed contact 197–1, and the $v'$–6 line until the contact 197–1 transfers on successful completion of the notch punch, when the no feed magnet is energized through the contacts 145–1, 156–5, 152–2 normally closed or 148–2 normally open, 197–2, the $s'$–12 conductor, 176–7 normally closed in FIG. 17 and the $s'$–5 line. At the same time, a reverse magnet REV is energised through the $w'$–4 line, the contact 197–3, the $a''$–8 conductor, contacts 245–11, 235–4, 232–8, and 249–3 normally closed in FIG. 13, and the $a''$–9 line to the 197–2 contact, a reverse-1 relay 148 being actuated at the same time through the 152–2 contact and held through the 148–3 contact, the $t'$–8 line and the contact 153–6 in FIG. 14, until the tape has been reversed to the beginning of the message in which the error occurred. After the reverse-1 relay has been actuated energization of the $v'$–5 conductor causes a reverse-2 relay 152 to be picked through the contacts 148–8 and 156–6 and this relay is held through the 152–1 and 156–4 contacts until a stop relay 156 is picked at the beginning of the erroneous tape message.

Meanwhile, actuation of the reverse magnet reverses the tape one column from the notch and with the notch read contacts N–1 and N–2 in FIG. 19 transferred by the notch read magnet, the code check circuit described above is completed by the CB–3 circuit breaker to energize the code check relay 197. This process is repeated during each subsequent punch cycle, reversing the tape column by column until the NR–1 contact detects the beginning of the message edge notch. When this occurs, energization of the $w'$–1 line actuates a read-1 relay 141 in FIG. 18 and this is held through the 141–1 and 197–4 contacts and the $v'$–4 conductor when the code check signal is received. This signal also picks a memory-1 relay 143 when the 141–3 contact closes through the $t'$–15 line, the 153–9 contact in FIG. 14 and the $t'$–14 conductor, the memory relay being held through the 143–1 and 148–4 normally open contacts and the $t'$–8 line.

On the next cycle, a read-2 relay 142 is picked through the $w'$–2 conductor when the NR–2 contact detects the notch and is held through the 142–1 and 197–4 contacts and the $v'$–4 conductor, causing a forward relay 153 in FIG. 14 to be energized through the 142–3 contact and the $t'$–13 conductor and held through the 153–8 contact, the $f'$–8 and $a''$–1 conductors joined in FIG. 13, and the 125–6 contact normally closed. Transfer of the 153–6 contact releases the hold coil of the reverse-1 relay 148, but this relay is retained through its pick coil and contacts 148–2 normally open, 156–5 normally closed, 145–1 and 197–1 until the $v'$–6 conductor is deenergized, moving the tape backward one more column.

With the reverse-2 relay 152 energized and the reverse-1 relay 148 inactive, the no-feed magnet NF is not energized during the next $v'$–6 cycle and the tape is advanced one column, causing the NR–2 contact to detect the notch, thereby picking the read-2 relay 142 through the $w'$–2 line, the hold coil being energized through the 142–1 contact as before. Transfer of the 142–2 contact with the reverse-1 relay 148 restored actuates a memory-2 relay 144 through the normally closed 156–2 and 148–5 contacts. During the next cycle the tape is advanced another column and the NR–1 contact senses the edge notch, actuating the read-1 relay 141 through the $w'$–1 conductor to complete a circuit through the contacts 141–2, 152–3 normally open and 148–6 picking a stop relay 156 which is held through the $t'$–18 line, contact 153–11 in FIG. 14, conductor $t'$–17, and the normally open 156–4 contact until the forward relay 153 is restored at the end of the error deletion operation.

With the forward relay 153 and the delete relay 145 actuated, the tape punch advances the tape column by column in the forward direction to the notch previously punched at beginning of the error deletion process, overpunching the perforations in each column with the five perforation tape feed code transmitted to the punch through the $y'$ and $y''$ cables, normally open contacts 153–1, 153–2, 153–4 and 153–5, the $t'$–2 line, and contact 145–6 normally open in FIG. 18. Detection of this notch by the notch read contact NR–2 actuates the read-2 relay 142 and the memory-1 relay 143 is energized through the contacts 142–2 and 156–2 normally open. With the relays in this condition actuation of the read-1 relay 141 by the NR–1 contact on the next cycle picks the notch relay 125 through the $v'$–4 conductor, contacts 197–4, 141–2, 152–3 normally closed and 156–3, releasing the forward relay 153 when the 125–6 contact opens. Transfer of the 153–11 contact restores the stop relay 156 and the relays 176 and 340 in FIG. 17 are energized through the $v'$–6 conductor, the 125–4 contact and the line $s'$–17 to reset the counters in the manner described above. Also, the FIGS relay 104 in FIG. 14 is energized by the $v'$–5 conductor through the normally open 125–5 contact, the $s'$–4 line, contact 121–3 normally closed in FIG. 17, and conductor $r'$–30, causing the beginning of message notch FIGS code to be punched into the tape on the next cycle in preparation for re-entry of the same message.

It will be noted that this error deletion cycle is carried out properly even if one of the notch read contacts NR–1 and NR–2 fails to function. For example, if the notch at the beginning of the record is not detected during the tape reversal by the NR–1 contact, the forward relay 153 is energized through the 142–3 contact, while if the NR–2 contact does not operate, this relay operates through the 141–4 and 143–3 contacts. Similarly, the stop relay 156 may be activated either through the 141–2 contact or through the 142–4 and 144–3 contacts and the notch relay 125 has alternate circuits through the 141–2 contact or the contacts 142–4 and 143–4.

It will be observed that the presence of any total other than eleven in the counters C′ and D′ energizes the $m'$–4 conductor through one of the contacts 267–2, 271–2, and 275–2 normally open, and 279–2 normally closed in FIG. 16 and similar contacts in the tens counter, connected in parallel through the $b''$–4 conductor, actuating two relays 250 and 263 in FIG. 13 to indicate a verifying error along with the error relays 306 and 329, the error relay 196 in FIG. 18 being energized through the 250–2 contact and the $a''$–6 line. As previously mentioned, if this occurs the encoder operator compares the typewritten document on the encoder carriage with the original record to determine the source of the error and, if the typed document is correct, indicating that the precoder total is in error, a supersede key in FIG. 12 is depressed. This action releases the error relays 196, 250 and 263 which are held through the $a''$–10 line, the contact 145–3 normally closed in FIG. 18, the $a''$–4 and $a'$–1 lines connected in FIG. 13, the supersede key, conductors $f''$–6 and $f'$–8 joined in FIG. 14, the $a''$–1 line and the contact 125–6 in FIG. 18, and when the normally open supersede contact closes, a circuit is completed through the $b'$–1 line, normally closed contact 328–1 in FIG. 15, conductor $e'$–7, contacts 305–5, 235–7, 240–3 normally open, and 283–2 in FIG. 13, and conductor $c''$–4 to actuate the carriage return relay 122 in FIG. 17 and cause the end of message code to be automatically entered into the tape in the manner described above when the operator again depresses the carriage return key in FIG. 12, the error relays 306 and 329 being restored when the carriage return contact opens and, after the keyboard has been released, the encoder operator proceeds with the next message.

It will be observed that depression of the supersede key will not enter the end of message code group in cases where the error is not a verifying error since it is bypassed by the normally closed 240–4 contact unless the step control relays are actuated. Also, it will be noted that a supersede interlock relay 283 is energized through the 239–1 normally open and 240–1 normally closed contacts whenever the verifying error relays 250 and 263 are picked if the step control and method relays are not actuated, thus preventing the carriage return relay 122 from being energized through the 283–2 contact. This relay is held through the contact 283–1, the $a''$–3 line and the step control hold circuit previously described until the erroneous message has been deleted, and may also be picked through either of the parallel normally open contacts 305–4 and 306–1 and the normally open contact 239–1, if the step control relays are not actuated under method two.

If the inaccuracy is in the encoding operation as determined by a proofreading of the typewritten copy, the error key is depressed to initiate the error deletion operation described above and the message is copied into the encoder again.

Although the invention has been described herein with reference to a specific embodiment, many variations and modifications thereof will occur to those skilled in the art without departing from the spirit of the invention. For example, the encoder might be arranged to verify information punched into cards rather than paper tape or a check code system based on three-digit numbers might be utilized. Accordingly, the invention is not intended to be restricted in scope except as defined by the following claims:

We claim:

1. Apparatus for generating a check code total for an information message which is a function of the information characters and their position of occurrence in the message comprising means for receiving the message information character by character, signal generating means responsive to the entry of each character for generating signals representing a predetermined check code number corresponding to the character having at least two digits, counter means responsive to these signals for accumulating the check code numbers corresponding to the information characters entered into the receiving means in sequence, and digit rearranging means interposed between the signal generating means and the counter means adapted to alter the order of the digits in certain check code numbers in a predetermined manner according to the position of occurrence of the corresponding characters in the message.

2. Apparatus according to claim 1 including display means for displaying the check code total accumulated by the counters.

3. Apparatus according to claim 1 wherein the counter means is adapted to add the check code numbers to produce a check code total.

4. Apparatus according to claim 3 wherein the signal generating means generates signals representing two-digit check code numbers.

5. Apparatus according to claim 4 wherein the digit rearranging means is adapted to transpose the digits of the code number corresponding to alternate characters in the message.

6. Apparatus according to claim 4 wherein the counter means is adapted to add the check code numbers without carrying to produce a two-digit check code total.

7. Apparatus for recording an information message comprising means for receiving message information character by character, recording means responsive to the receiving means for entering the information on a recording medium, signal generating means responsive to the entry of each character in the receiving means for generating signals representing a predetermined check code number corresponding to the character having at least two digits, counter means for accumulating the check code numbers corresponding to the information characters in the recorded message to produce a record check code total, digit rearranging means interposed between the signal generating means and the counter means for altering the order of the digits of certain code numbers in a predetermined manner according to the sequence of entry of the corresponding characters in the receiving means, and means for comparing the record check code total with a predetermined check code total.

8. Apparatus according to claim 7 wherein the receiving means is a typewriter keyboard.

9. Apparatus according to claim 8 including error detection means responsive to differences between the record and the predetermined check code totals as determined by the comparing means.

10. Apparatus according to claim 9 including superseding means for releasing the error detection means if the message has been recorded correctly.

11. Apparatus according to claim 9 including means responsive to the error detection means for eliminating an incorrectly recorded message.

12. Apparatus according to claim 8 including record check means for determining whether the recorded message information corresponds with the information entered into the receiving means.

13. Apparatus according to claim 8 wherein the signal generating means is adapted to generate signals representing two-digit code numbers.

14. Apparatus according to claim 13 wherein the counter means is adapted to accumulate the check code numbers without carrying.

15. Apparatus according to claim 13 wherein the digit rearranging means transposes the digits of the code numbers corresponding to alternate characters in the information message.

16. Apparatus for recording an information message comprising means for receiving message information character by character, a tape perforator responsive to the receiving means for entering the message information in a tape according to a predetermined punch code, signal generating means responsive to the entry of each information character in the receiving means for generating signals representing a predetermined check code number corresponding to the character having at least two digits, counter means for accumulating the check code numbers corresponding to the information characters in the recorded message to produce a record check code total, digit rearranging means interposed between the signal generating means and the counter means for altering the order of the digits of certain code numbers in a predetermined manner according to the sequence of entry of the corresponding characters in the receiving means, and means for comparing the record check code total with a predetermined check code total.

17. Apparatus according to claim 16 wherein the receiving means is a typewriter keyboard.

18. Apparatus according to claim 16 including error detection means responsive to differences between the record and the predetermined check code totals as determined by the comparing means.

19. Apparatus according to claim 18 including superseding means for releasing the error detection means if the message has been recorded correctly.

20. Apparatus according to claim 19 including means responsive to the error detection means for eliminating an incorrectly recorded message.

21. Apparatus according to claim 16 including record check means for determining whether the recorded message information corresponds with the information entered into the receiving means.

22. Apparatus according to claim 16 wherein the signal generating means is adapted to generate signals representing two-digit code numbers.

23. Apparatus according to claim 22 wherein the counter means is adapted to accumulate the check code numbers without carrying.

24. Apparatus according to claim 22 wherein the digit rearranging means transposes the digits of the code numbers corresponding to alternate characters in the information message.

References Cited in the file of this patent

UNITED STATES PATENTS

| | | |
|---|---|---|
| 2,781,971 | Knutsen | Feb. 19, 1957 |
| 2,857,100 | Franck et al. | Oct. 21, 1958 |
| 2,943,787 | Cartwright | July 5, 1960 |

UNITED STATES PATENT OFFICE
CERTIFICATE OF CORRECTION

Patent No. 3,064,885 November 20, 1962

Raymond A. Barbeau et al.

It is hereby certified that error appears in the above numbered patent requiring correction and that the said Letters Patent should read as corrected below.

Column 6, line 32, for "2T" read -- 1T --; column 7, line 61, strike out "a", second occurrence; column 31, lines 38, 48 and 52, for claim reference numeral "8", each occurrence, read -- 7 --.

Signed and sealed this 7th day of May 1963.

SEAL)
Attest:

ERNEST W. SWIDER
Attesting Officer

DAVID L. LADD
Commissioner of Patents